(12) United States Patent
Fine et al.

(10) Patent No.: US 12,388,957 B2
(45) Date of Patent: Aug. 12, 2025

(54) DETECTING AND USING LIGHT REPRESENTATIVE OF A SAMPLE

(71) Applicant: Alentic Microscience Inc., Halifax (CA)

(72) Inventors: Alan Marc Fine, Prospect (CA); Hershel Macaulay, Cambridge, MA (US); Laurent Kreplak, Halifax (CA)

(73) Assignee: Alentic Microscience Inc., Halifax (CA)

( * ) Notice: Subject to any disclaimer, the term of this patent is extended or adjusted under 35 U.S.C. 154(b) by 0 days.

(21) Appl. No.: 18/662,064

(22) Filed: May 13, 2024

(65) Prior Publication Data

US 2025/0016288 A1  Jan. 9, 2025

Related U.S. Application Data

(63) Continuation of application No. 17/981,228, filed on Nov. 4, 2022, now Pat. No. 12,022,236, which is a
(Continued)

(51) Int. Cl.
| | | |
|---|---|---|
| H04N 7/18 | (2006.01) | |
| G02B 21/00 | (2006.01) | |
| B01L 3/00 | (2006.01) | |

(52) U.S. Cl.
CPC ........... *H04N 7/18* (2013.01); *G02B 21/0008* (2013.01); *B01L 3/502761* (2013.01); *B01L 2200/027* (2013.01)

(58) Field of Classification Search
CPC . H04N 7/18; G02B 21/0008; B01L 3/502761; B01L 2200/027
See application file for complete search history.

(56) References Cited

U.S. PATENT DOCUMENTS

| | | |
|---|---|---|
| 3,000,049 A | 9/1961 | Terry |
| 3,447,863 A | 6/1969 | Patterson |
| (Continued) | | |

FOREIGN PATENT DOCUMENTS

| | | |
|---|---|---|
| CA | 2778837 | 5/2011 |
| CN | 102713720 A | 10/2012 |
| (Continued) | | |

OTHER PUBLICATIONS

Abrams et al., "Direct detection of activated platelets and platelet-derived microparticles in humans," Blood, Jan. 1990, 75(1):128-138.
(Continued)

*Primary Examiner* — James M Pontius
(74) *Attorney, Agent, or Firm* — Fish & Richardson P.C.

(57) ABSTRACT

An imaging device includes light sensitive locations that are separately sensitive to light received at a surface with respect to a portion of a sample associated with the surface, the light sensitive locations having a resolution of 5 microns or smaller. There is a device to associate the portion of the sample with the surface. The imaging device and a distance of the portion of the sample to the light sensitive locations are such that usable useful image of the portion of the sample can be acquired directly by operation of the imaging device.
An imaging device includes light sensitive sources that are separately able to deliver light with respect to a portion of a sample associated with the surface. The light source locations having a resolution of 5 microns or smaller. There is a device to associate the portion of the sample with the surface. The imaging device and a distance of the portion of the sample to the light source locations are such that a useful image of the portion of the sample can be acquired directly by operation of the imaging device.

(Continued)

An imaging device can include both the light source locations and the light source locations and the light sensitive locations.

24 Claims, 45 Drawing Sheets

Related U.S. Application Data continuation of application No. 14/173,500, filed on Feb. 5, 2014, now abandoned.

(60) Provisional application No. 61/785,762, filed on Mar. 14, 2013, provisional application No. 61/761,467, filed on Feb. 6, 2013.

(56) References Cited

U.S. PATENT DOCUMENTS

| | | |
|---|---|---|
| 3,510,194 A | 5/1970 | Connelly |
| 3,551,023 A | 12/1970 | Brackett |
| 3,556,633 A | 1/1971 | Mutschmann et al. |
| 4,338,024 A | 7/1982 | Bolz et al. |
| 4,612,614 A | 9/1986 | Deindoerfer et al. |
| 4,658,471 A | 4/1987 | Nakanishi |
| 4,682,887 A | 7/1987 | Bellhouse et al. |
| 4,744,643 A | 5/1988 | Taylor |
| 4,758,083 A | 7/1988 | Bellhouse et al. |
| 4,845,809 A | 7/1989 | Pillifant |
| 4,882,284 A | 11/1989 | Kirchanski et al. |
| 4,950,455 A | 8/1990 | Smith |
| 4,963,498 A | 10/1990 | Hillman et al. |
| 4,993,056 A | 2/1991 | Lary |
| 5,039,487 A | 8/1991 | Smith |
| 5,059,398 A | 10/1991 | Kenney |
| 5,124,141 A | 6/1992 | Makler |
| 5,181,382 A | 1/1993 | Middlebrook |
| 5,218,211 A | 6/1993 | Cresswell et al. |
| 5,307,161 A | 4/1994 | Miyamoto |
| 5,365,114 A | 11/1994 | Tsurushima et al. |
| 5,383,472 A | 1/1995 | Devlin |
| 5,389,779 A | 2/1995 | Betzig et al. |
| 5,464,752 A | 11/1995 | Kortright et al. |
| 5,605,813 A | 2/1997 | Stevens et al. |
| 5,612,223 A | 3/1997 | Kim et al. |
| 5,627,041 A | 5/1997 | Shartle |
| 5,633,972 A | 5/1997 | Walt et al. |
| 5,653,939 A | 8/1997 | Hollis et al. |
| 5,739,527 A | 4/1998 | Hecht et al. |
| 5,851,489 A | 12/1998 | Wolf et al. |
| 5,858,189 A | 1/1999 | Williams |
| 5,880,830 A | 3/1999 | Schechter |
| 5,894,349 A | 4/1999 | Harris et al. |
| 5,932,428 A | 8/1999 | Dubrow et al. |
| 6,083,763 A | 7/2000 | Balch |
| 6,084,683 A | 7/2000 | Bruno et al. |
| 6,104,495 A | 8/2000 | Sieben et al. |
| 6,180,314 B1 | 1/2001 | Berndt |
| 6,221,687 B1 | 4/2001 | Abramovich |
| 6,259,104 B1 | 7/2001 | Baer |
| 6,280,586 B1 | 8/2001 | Wolf et al. |
| 6,285,018 B1 | 9/2001 | Aebi et al. |
| 6,297,025 B1 | 10/2001 | Sugihara et al. |
| 6,302,985 B1 | 10/2001 | Takahashi et al. |
| 6,312,960 B1 | 11/2001 | Balch et al. |
| 6,323,944 B1 | 11/2001 | Xiao |
| 6,330,106 B1 | 12/2001 | Greenwald |
| 6,387,707 B1 | 5/2002 | Seul et al. |
| 6,396,980 B1 | 5/2002 | Liu et al. |
| 6,411,434 B1 | 6/2002 | Eastman et al. |
| 6,432,720 B2 | 8/2002 | Chow |
| 6,441,359 B1 | 8/2002 | Cozier |
| 6,470,532 B2 | 10/2002 | Rude |
| 6,506,664 B1 | 1/2003 | Beyne et al. |
| 6,621,079 B1 | 9/2003 | Shao et al. |
| 6,690,464 B1 | 2/2004 | Lewis et al. |
| 6,723,290 B1 | 4/2004 | Wardlaw |
| 6,773,676 B2 | 8/2004 | Schembri |
| 6,784,982 B1 | 8/2004 | Blumenfeld et al. |
| 6,803,238 B1 | 10/2004 | Eggers |
| 6,844,150 B2 | 1/2005 | Weiss et al. |
| 6,867,851 B2 | 3/2005 | Blumenfeld et al. |
| 6,901,086 B2 | 5/2005 | Li |
| 7,009,172 B2 | 3/2006 | Publicover et al. |
| 7,023,563 B2 | 4/2006 | Li |
| 7,079,256 B2 | 7/2006 | Li |
| 7,088,116 B1 | 8/2006 | Lin |
| 7,142,571 B2 | 11/2006 | Li |
| 7,151,246 B2 | 12/2006 | Fein et al. |
| 7,153,720 B2 | 12/2006 | Augusto |
| 7,267,647 B2 | 9/2007 | Okada et al. |
| 7,280,222 B2 | 10/2007 | Li |
| 7,310,151 B2 | 12/2007 | Li |
| 7,326,930 B2 | 2/2008 | Crawely |
| 7,330,305 B2 | 2/2008 | Harris |
| 7,385,175 B2 | 6/2008 | Li et al. |
| 7,423,766 B1 | 9/2008 | Li |
| 7,425,460 B2 | 9/2008 | Pain |
| 7,443,507 B2 | 10/2008 | Ran |
| 7,466,409 B2 | 12/2008 | Scherer et al. |
| 7,476,787 B2 | 1/2009 | Thomas et al. |
| 7,518,731 B2 | 4/2009 | Li |
| 7,524,459 B2 | 4/2009 | Adams et al. |
| 7,626,695 B2 | 12/2009 | Betzig et al. |
| 7,651,598 B2 | 1/2010 | Shapiro et al. |
| 7,693,571 B2 | 4/2010 | Arnone et al. |
| 7,719,685 B2 | 5/2010 | Li |
| 7,727,752 B2 | 6/2010 | Klink et al. |
| 7,738,945 B2 | 6/2010 | Fauver et al. |
| 7,751,048 B2 | 7/2010 | Yang et al. |
| 7,773,227 B2 | 8/2010 | Yang et al. |
| 7,792,246 B2 | 9/2010 | Rodenburg et al. |
| 7,796,797 B2 | 9/2010 | Nakaya et al. |
| 7,850,916 B2 | 12/2010 | Wardlaw |
| 7,936,501 B2 | 5/2011 | Smith et al. |
| 7,951,345 B2 | 5/2011 | Lary |
| 7,982,883 B2 | 7/2011 | Cui et al. |
| 7,990,539 B2 | 8/2011 | Li |
| 8,004,692 B2 | 8/2011 | Li |
| 8,027,083 B2 | 9/2011 | Smith et al. |
| 8,081,303 B2 | 12/2011 | Levine et al. |
| 8,089,630 B2 | 1/2012 | Davis et al. |
| 8,120,783 B2 | 2/2012 | Li |
| 8,310,022 B2 | 11/2012 | Sargent et al. |
| 8,314,933 B2 | 11/2012 | Cui |
| 8,345,227 B2 | 1/2013 | Zahniser et al. |
| 8,446,667 B2 | 5/2013 | Smith et al. |
| 8,456,633 B2 | 6/2013 | Lewis et al. |
| 8,457,440 B1 | 6/2013 | Johnson |
| 8,477,294 B2 | 7/2013 | Zahniser et al. |
| 8,488,111 B2 | 7/2013 | Zahniser et al. |
| 8,506,909 B2 | 8/2013 | Sunwoldt |
| 8,741,232 B2 | 6/2014 | Baysal |
| 9,041,790 B2 | 5/2015 | Fine |
| 9,052,523 B2 | 6/2015 | Eastman et al. |
| 9,075,225 B2 | 7/2015 | Fine |
| 9,083,857 B2 | 7/2015 | Winkleman et al. |
| 9,133,507 B2 | 9/2015 | Testa et al. |
| 9,304,280 B2 | 4/2016 | Gulari et al. |
| 9,518,920 B2 | 12/2016 | Fine |
| 9,720,217 B2 | 8/2017 | Fine |
| 9,817,027 B2 | 11/2017 | Segura et al. |
| 9,989,750 B2 | 6/2018 | Fine et al. |
| 10,114,203 B2 | 10/2018 | Fine et al. |
| 10,345,564 B2 | 7/2019 | Fine et al. |
| 10,459,213 B2 | 10/2019 | Fine et al. |
| 10,502,666 B2 | 12/2019 | Fine et al. |
| 10,520,711 B2 | 12/2019 | Fine et al. |
| 10,620,234 B2 | 4/2020 | Fine |
| 10,746,979 B2 | 8/2020 | Fine |
| 10,768,078 B2 | 9/2020 | Fine |
| 10,866,395 B2 | 12/2020 | Fine et al. |
| 10,900,999 B2 | 1/2021 | Fine |
| 11,294,160 B2 | 4/2022 | Fine et al. |

(56) References Cited

U.S. PATENT DOCUMENTS

| | | |
|---|---|---|
| 12,022,236 B2 | 6/2024 | Fine et al. |
| 2001/0046702 A1 | 11/2001 | Schembri |
| 2001/0052930 A1 | 12/2001 | Adair et al. |
| 2002/0056807 A1 | 5/2002 | Narita |
| 2002/0147384 A1 | 10/2002 | Uchikubo |
| 2003/0007894 A1 | 1/2003 | Wang et al. |
| 2003/0008401 A1 | 1/2003 | Berndt |
| 2003/0073910 A1 | 4/2003 | Chance |
| 2003/0233028 A1 | 12/2003 | Tokuda et al. |
| 2003/0235924 A1 | 12/2003 | Adams et al. |
| 2004/0136593 A1 | 7/2004 | Chapoulaud |
| 2004/0171076 A1 | 9/2004 | Dejneka et al. |
| 2004/0219184 A1 | 11/2004 | Brown et al. |
| 2005/0007670 A1 | 1/2005 | Jiang et al. |
| 2005/0048498 A1 | 3/2005 | Woudenberg et al. |
| 2005/0190286 A1 | 9/2005 | Kaduchak et al. |
| 2005/0271548 A1 | 12/2005 | Yang et al. |
| 2006/0000429 A1 | 1/2006 | Stone et al. |
| 2006/0217594 A1 | 9/2006 | Ferguson |
| 2006/0223165 A1 | 10/2006 | Chang et al. |
| 2006/0239866 A1 | 10/2006 | Kenney |
| 2006/0263888 A1 | 11/2006 | Fritz et al. |
| 2007/0025709 A1 | 2/2007 | Gladnick |
| 2007/0032739 A1 | 2/2007 | Hashimshony et al. |
| 2007/0087442 A1 | 4/2007 | Wardlaw |
| 2007/0207061 A1 | 9/2007 | Yang et al. |
| 2007/0243117 A1 | 10/2007 | Wardlaw |
| 2007/0258096 A1 | 11/2007 | Cui et al. |
| 2008/0013900 A1 | 1/2008 | Harris |
| 2008/0095312 A1 | 4/2008 | Rodenburg et al. |
| 2008/0144029 A1 | 6/2008 | Li |
| 2008/0144899 A1 | 6/2008 | Varma et al. |
| 2008/0194012 A1 | 8/2008 | Lee |
| 2008/0213804 A1 | 9/2008 | Erickson et al. |
| 2008/0259443 A1 | 10/2008 | Smith et al. |
| 2008/0259444 A1 | 10/2008 | Smith et al. |
| 2008/0265177 A1 | 10/2008 | Connally |
| 2008/0285040 A1 | 11/2008 | Fourkas et al. |
| 2008/0319298 A1 | 12/2008 | Huys et al. |
| 2009/0028463 A1 | 1/2009 | Putman et al. |
| 2009/0072332 A1 | 3/2009 | Dekker et al. |
| 2009/0093970 A1 | 4/2009 | Lewy et al. |
| 2009/0105537 A1 | 4/2009 | Gat et al. |
| 2009/0109501 A1 | 4/2009 | Katsuya et al. |
| 2009/0163432 A1 | 6/2009 | Takamatsu et al. |
| 2009/0174936 A1 | 7/2009 | Olszak |
| 2009/0218527 A1 | 9/2009 | French et al. |
| 2009/0220125 A1 | 9/2009 | Ren et al. |
| 2009/0225319 A1 | 9/2009 | Lee et al. |
| 2009/0233329 A1 | 9/2009 | Rodriguez et al. |
| 2009/0258338 A1 | 10/2009 | Zhang et al. |
| 2010/0033561 A1 | 2/2010 | Hersee |
| 2010/0067827 A1 | 3/2010 | Ozcan et al. |
| 2010/0097599 A1 | 4/2010 | Lewis et al. |
| 2010/0178722 A1 | 7/2010 | de Graff |
| 2010/0191053 A1 | 7/2010 | Garcia et al. |
| 2010/0233191 A1 | 9/2010 | Buckley |
| 2010/0248300 A1 | 9/2010 | Yoshida et al. |
| 2010/0290049 A1 | 11/2010 | Yang et al. |
| 2010/0296094 A1 | 11/2010 | Yang et al. |
| 2010/0320515 A1 | 12/2010 | Fossum et al. |
| 2011/0001460 A1 | 1/2011 | Buthker |
| 2011/0014606 A1 | 1/2011 | Steinmetzer et al. |
| 2011/0037846 A1 | 2/2011 | Huang et al. |
| 2011/0063428 A1 | 3/2011 | Sonnenschein et al. |
| 2011/0070606 A1 | 3/2011 | Winkelman et al. |
| 2011/0096157 A1* | 4/2011 | Fine .................. G02B 21/0008 348/79 |
| 2011/0149280 A1 | 6/2011 | Juhl |
| 2011/0151502 A1* | 6/2011 | Kendall ................. G01N 21/27 435/39 |
| 2011/0164803 A1 | 7/2011 | Wang et al. |
| 2011/0181884 A1 | 7/2011 | Cui et al. |
| 2011/0190613 A1 | 8/2011 | Zhang et al. |
| 2011/0205535 A1 | 8/2011 | Soller |
| 2011/0211058 A1 | 9/2011 | McCollum et al. |
| 2011/0223590 A1 | 9/2011 | Chiou et al. |
| 2011/0234757 A1 | 9/2011 | Zheng et al. |
| 2011/0249109 A1 | 10/2011 | Fine |
| 2011/0254533 A1 | 10/2011 | Gong |
| 2012/0088230 A1 | 4/2012 | Givens et al. |
| 2012/0218379 A1 | 8/2012 | Ozcan et al. |
| 2012/0223217 A1 | 9/2012 | Zheng et al. |
| 2012/0223291 A1 | 9/2012 | Klem et al. |
| 2012/0224053 A1 | 9/2012 | Vykoukal et al. |
| 2012/0231533 A1 | 9/2012 | Holl et al. |
| 2013/0002847 A1 | 1/2013 | Zahniser et al. |
| 2013/0052331 A1 | 2/2013 | Kram et al. |
| 2013/0217065 A1 | 8/2013 | Neef et al. |
| 2014/0002662 A1 | 1/2014 | Lewis et al. |
| 2014/0152801 A1 | 6/2014 | Fine et al. |
| 2014/0268319 A1 | 9/2014 | Gulari et al. |
| 2015/0002834 A1 | 1/2015 | Fine et al. |
| 2015/0241377 A1 | 8/2015 | Yano |
| 2015/0241679 A1 | 8/2015 | Fine et al. |
| 2016/0041200 A1 | 2/2016 | Fine |
| 2016/0187235 A1 | 6/2016 | Fine et al. |
| 2016/0356999 A1 | 12/2016 | Fine |
| 2017/0075099 A1 | 3/2017 | Fine et al. |
| 2017/0322402 A1 | 11/2017 | Fine et al. |
| 2017/0357083 A1 | 12/2017 | Ozcan et al. |
| 2018/0284416 A1 | 10/2018 | Fine |
| 2019/0094509 A1 | 3/2019 | Fine |
| 2019/0242794 A1 | 8/2019 | Fine |
| 2019/0251897 A1 | 8/2019 | Toyama et al. |
| 2019/0293524 A9 | 9/2019 | Fine |
| 2019/0317309 A1 | 10/2019 | Fine |
| 2019/0324239 A1 | 10/2019 | Fine |
| 2019/0324258 A1 | 10/2019 | Fine |
| 2020/0174238 A1 | 6/2020 | Fine |
| 2020/0256889 A1 | 8/2020 | Fine |
| 2020/0371004 A1 | 11/2020 | Fine |
| 2020/0379234 A1 | 12/2020 | Fine |
| 2021/0063713 A1 | 3/2021 | Fine |
| 2021/0116475 A1 | 4/2021 | Fine |
| 2022/0206282 A1 | 6/2022 | Fine et al. |
| 2023/0164299 A1 | 5/2023 | Fine et al. |
| 2023/0228682 A1 | 7/2023 | Fine |

FOREIGN PATENT DOCUMENTS

| | | |
|---|---|---|
| CN | 105765440 | 7/2016 |
| CN | 105974571 A | 9/2016 |
| DE | 102011117228 | 5/2013 |
| EP | 0170565 | 2/1986 |
| EP | 1710565 | 10/2006 |
| EP | 1756260 | 2/2007 |
| EP | 2012114 | 1/2009 |
| EP | 2330215 A1 | 6/2011 |
| EP | 2494400 | 9/2012 |
| EP | 2554987 A1 | 2/2013 |
| EP | 2954310 | 12/2015 |
| EP | 3014330 | 5/2016 |
| EP | 3268737 | 1/2018 |
| JP | S58-182267 | 10/1983 |
| JP | 59048954 | 3/1984 |
| JP | S62-262001 | 11/1987 |
| JP | S63-229426 | 9/1988 |
| JP | S64-71172 | 3/1989 |
| JP | H03-502642 | 6/1991 |
| JP | 4316478 | 11/1992 |
| JP | 5219937 | 8/1993 |
| JP | 5243790 | 9/1993 |
| JP | H09-021963 | 1/1997 |
| JP | 1164215 | 3/1999 |
| JP | H11-064215 | 3/1999 |
| JP | 2000-146910 | 5/2000 |
| JP | 2000-333667 | 12/2000 |
| JP | 2001-078175 | 3/2001 |
| JP | 2002-525587 | 8/2002 |
| JP | 2004-503223 | 2/2004 |
| JP | 2006-003653 | 1/2006 |
| JP | 2006-133021 | 5/2006 |
| JP | 2007-536541 | 12/2007 |

(56) References Cited

FOREIGN PATENT DOCUMENTS

| | | |
|---|---|---|
| JP | 2008-501999 | 1/2008 |
| JP | 2008-192813 | 8/2008 |
| JP | 2009-065178 | 3/2009 |
| JP | 2009-515155 | 4/2009 |
| JP | 2010-11814 | 1/2010 |
| JP | 2011-513794 | 4/2011 |
| JP | 2011-515681 | 5/2011 |
| JP | 5059882 | 10/2012 |
| JP | 2013-507630 | 3/2013 |
| JP | 2013-509618 | 3/2013 |
| JP | 2015-215624 | 12/2015 |
| JP | 2018-028683 | 2/2018 |
| WO | WO 2000012123 | 3/2000 |
| WO | WO 2005121749 | 12/2005 |
| WO | WO 2008112416 | 9/2008 |
| WO | WO 2008136007 | 11/2008 |
| WO | WO 2006133360 | 9/2009 |
| WO | WO 2009111573 | 9/2009 |
| WO | WO 2009111577 | 9/2009 |
| WO | WO 2010148252 | 12/2010 |
| WO | WO 2011053631 | 5/2011 |
| WO | WO 2012019118 | 2/2012 |
| WO | WO 2012030313 | 3/2012 |
| WO | WO 2012064873 | 5/2012 |
| WO | WO 2012094523 | 7/2012 |
| WO | WO 2012174542 | 12/2012 |
| WO | WO 2013071352 | 5/2013 |
| WO | WO 2014121388 | 8/2014 |
| WO | WO 2014205576 | 12/2014 |
| WO | WO 2016141487 | 9/2016 |

OTHER PUBLICATIONS

Adams M, DeRose G, Quake SR, Scherer A. Fundamental approach for optoelectronic and microfluidic integration for miniaturizing spectroscopic devices . . . 2002:1-6. doi: 10.1117/12.469818.

Adams ML, Enzelberger M, Quake S, Scherer A. Microfluidic integration on detector arrays for absorption and fluorescence micro-spectrometers. Sensors and Actuators A: Physical. 2003; 104(1):25-31. doi: 10.1016/S0924-4247(02)00477-6.

Alexander, George A., et al., "BiodosEPR—2006 Meeting: Acute dosimetry consensus committee recommendations on biodosimetry applications in events involving uses of radiation by terrorists and radiation accidents", Science Direct, 2007 (25 pages).

Alkaisi MM, Blaikie RJ, McNab SJ, Cheung R, Cumming DRS. Sub-diffraction-limited patterning using evanescent near-field optical lithography. Appl Phys Lett. 1999;75(22):3560-3562. http://dx.doi.org/10.1063/1.125388. doi: 10.1063/1.125388.

Allier CP, Hiernard G, Poher V, Dinten JM. Bacteria detection with thin wetting film lensless imaging. Biomed Opt Express. 2010;1(3):762-770. doi: 10.1364/BOE.1.000762.

Alpha MED Scientific, Inc., "MED64: A low-noise multi-electrode array system for in vitro extracellular electrophysiology", MED64 product information, www.med64.com, (16 pages).

American Red Cross, "Planning Guidance for Response to a Nuclear Detonation", Jun. 2010 (135 pages).

Baranov, A.E. et al., "Use of Blood Cell Count Changes after Radiation Exposure in Dose Assessment and Evaluation of Bone Marrow Function", Institute of Biophysics, Ministry of the USSR, Moscow, USSR, 1990 (17 pages).

Baranov, AE., et al., "Chernobyl experience: biological indictors of exposure to ionizing radiation", Stem Cells, 13 Suppl 1:69-77, May 1995 (2 pages).

Barda Broad Agency Announcement for the Addvanced Research and Development of Chemical, Biological, Radiological, and Nuclear Medical Countermeasures, "Development of a Rapid, Point-of-Care Biodosimeter to Determine Absorbed Radiation Dose", White Paper for Research Areas 6.1 and 6.2 (Biodosimetry Diagnostics), Jun. 7, 2013 (13 pages).

Bayer, Manfred E. and John L. Sloyer, Jr., "The electrophoretic mobility of Gram-negative and Gram-positive bacteria: an electrokinetic analysis", Jan. 31, 1990 (8 pages).

Beese L, Feder R, Sayre D. Contact x-ray microscopy. A new technique for imaging cellular fine structure. Biophys J. 1986;49(1):259-268. doi: 10.1016/S0006-3495(86)83639-6.

Beiderman M, Tam T, Fish A, Jullien GA, Yadid-Pecht O. A low-light CMOS contact imager with an emission filter for biosensing applications. Biomedical Circuits and Systems, IEEE Transactions on. 2008;2(3):193-203. doi: 10.1109/TBCAS.2008.2001866.

Bishara W, Su T, Coskun AF, Ozcan A. Lensfree on-chip microscopy over a wide field-of-view using pixel super-resolution. Opt Express. 2010;18(11):11181-11191. http://www.opticsexpress.org/abstract.cfm?URI=oe-18-11-11181.

Cabello, Jorge, et al., "Digital autoradiography using room temperature CCD and CMOS imaging technology", Phys. Med. Biol. 52 (2007), 4993-5011 (19 pages).

Canadian office action for Canadian application 2938896 issued on Jul. 3, 2018 (20 pages).

Canadian Office Action for Canadian application 2938896, issued Jul. 23, 2019 (4 pages).

Canadian office action for Canadian application 2953620 issued Oct. 11, 2018 (7 pages).

Canadian office action for Canadian application 2953620 issued on Nov. 8, 2017 (10 pages).

Canadian Office Action from Canadian application 2778725 issued on Nov. 22, 2016 (4 pages).

Canadian office action from Canadian application 2778725, issued on Jun. 12, 2018 (23 pages).

Canadian Office Action issued in Canadian Application 2938896 issued on Apr. 8, 2020, 21 pages.

Canadian Office Action issued in Canadian application 2938896 issued on Jul. 11, 2017 (31 pages).

Certified PCT application No. PCT/JP2007/000401 filed Apr. 26, 2006 (22 pages).

Cetin, Arif E., et al., "Handheld high-throughput plasmonic biosensor using computational on-chip imaging", Light: Science & Applications, e122, doi: 10.1038/lsa.2014.3, 2014 (10 pages).

Chinese Office Action in CN Appln. No. 201910089876, dated Dec. 11, 2020, 17 pages with English Translation.

Chinese Office Action with English translation from Chinese application 201080059753.X issued on May 7, 2015 (5 pages).

Chinese office action with English translation from Chinese Application 201080059753.X issued on Nov. 17, 2014 (4 pages).

Chinese Office Action with English translation from Chinese application 201080059753.X issued on Sep. 15, 2015. (6 pages).

Chinese Office Action with English translation from Chinese application 201610217300.4 issued on Aug. 30, 2017 (7 pages).

Chinese office action with English translation from Chinese application 201610217300.4 issued on May 10, 2018 (15 pages).

Chinese office action with English translation from Chinese application 201610217300.4 issued on Oct. 12, 2018 (8 pages).

Chinese Office Action with English translation in Chinese Application No. 201910089876.0, dated Nov. 28, 2019, 10 pages.

Chinese office action with English translation issued in Chinese application 201480047483.9 issued on Oct. 8, 2018 (17 pages).

Chinese office action with English translation issued in Chinese application 201480047483.9 on Dec. 5, 2017 (15 pages).

Cook, G.M.W., "Glycoproteins in Membranes", Biol. Rev. (1968) 43, pp. 363-391, Jan. 1968 (29 pages).

Coskun AF, Sencan I, Su T, Ozcan A. Lensless wide-field fluorescent imaging on a chip using compressive decoding of sparse objects. Opt Express. 2010;18(10):10510-10523. http://www.opticsexpress.org/abstract.cfm?URI=oe-18-10-10510.

Cui X, Lee LM, Heng X, et al. Lensless high-resolution on-chip optofluidic microscopes for caenorhabditis elegans and cell imaging. Proceedings of the National Academy of Sciences. 2008. doi: 10.1073/pnas.0804612105.

D.C. Ng, Nakagawa T, Mizuno T, et al. Integrated in vivo neural imaging and interface CMOS devices: Design, packaging, and implementation. IEEE Sens J. 2008;8(1):121-130. http://pubget.com/paper/pgtmp_3c74d9653c84d6253dff533a781220fb. doi: 10.1109/JSEN.2007.912921.

(56) References Cited

OTHER PUBLICATIONS

Dattner Y, Yadid-Pecht O. Low light CMOS contact imager with an integrated poly-acrylic emission filter for fluorescence detection. Sensors (Basel). 2010;10(5):5014-5027. doi: 10.3390/s100505014; 10.3390/s100505014.
Decision of Rejection with English translation from Japanese application 2012-536989 issued on Mar. 2, 2015 (11 pages).
Eggers, M. et al., "A Microchip for Quantitative Detection of Molecules Utilizing Luminescent and Radioisotope Reporter Groups", 516 BioFeature, vol. 17, No. 3, 1994 (8 pages).
Elad, "A Fast Super-Resolution Reconstruction Algorithm for Pure Translational Motion and Common Space-Invariant Blur," IEEE Trans. Image Process., Aug. 2001, 10(8):1187-1193.
Entcheva, Emilia, et al, "Macroscopic optical mapping of excitation in cardiac cell networks with ultra-high spatiotemporal resolution", Progress in Biophysics & Molecular Biology, vol. 92, pp. 232-257, 2006 (26 pages).
Entcheva, Emilia, et al. "Fluorescence Imaging of Electrical Activity in Cardia Cells Using An All-Solid-State System", IEEE Transactions on Biomedical Engineering, vol. 51, No. 2, pp. 333-341, Feb. 2004 (9 pages).
Entcheva, Emilia, et al., "Contact Fluorescence Imaging of Reentry in Monolayers of Cultured Neonatal Rat Ventricular Myocytes", Department of Biomedical Engineering, The Johns Hopkins University School of Medicine, Baltimore, Maryland, Journal of Cardiovascular Electrophysiology, vol. 11, No. 6, pp. 665-676, Jun. 2000 (13 pages).
European Communication for EP application No. 10827423.4 issued Jun. 6, 2012 (2 pages).
European Communication from European application 14749668.1 issued on Nov. 7, 2016 (5 pages).
European Communication from European application 16760984.1 dated Nov. 5, 2018 (1 page).
European Communication issued in European application No. 10827423.4 on Dec. 11, 2017 (13 pages).
European Communication Pursuant to Article 94(3) EPC issued in EP Application No. 14817587.0, dated Apr. 29, 2020, 5 pages.
European Communication pursuant to Article 94(3) EPC issued in European Application 14817587.0 on Oct. 26, 2017 (5 pages).
European Communication Pursuant to Rules 161(2) & 162 EPC issued in European application 14817587.0 on Feb. 9, 2016 (2 pages).
European Communication Pursuant to Rules 70(2) and 70a(2) EPC issued in European application 14817587.0 on Feb. 14, 2017 (1 page).
European Extended Search Report from European application 16760984.1 dated Oct. 16, 2018 (9 pages).
European Search Report issued in European application 14749668.1 dated Oct. 24, 2016 (6 pages).
European Supplemental Search Report issued in European application 10827423.4 on Jul. 12, 2017 (19 pages).
Farsiu, Sina, et al., "Multiframe Demosaicing and Super-Resolution of Color Images", IEEE Transactions on Image Processing, vol. 15, No. 1, Jan. 2006 (19 pages).
Faulkner HML, Rodenburg JM. Movable aperture lensless transmission microscopy: A novel phase retrieval algorithm. Phys Rev Lett. 2004;93(2):023903. http://link.aps.org/doi/10.1103/PhysRevLett.93.023903.
Feder R, Costa JL, Chaudhari P, Sayre D. Improved detail in biological soft X-ray microscopy: Study of blood platelets. Science. 1981;212(4501):1398-1400.
Fischer UC, Zingsheim HP. Submicroscopic contact imaging with visible light by energy transfer. Applied Physics Letters. 1982;40(3):195-197. doi: 10.1063/1.93050.
Gabriel et al., "Inexpensive Integrated Device, Twelfth International Conference on Miniaturized Systems for Chemistry and Life Sciences" Oct. 12-16, 2008, San Diego, California, USA (2 pages).
Ghaemi et al., "Surface Plasmons Enhance Optical Transmission Through Subwavelength Holes," Phys. Rev. B, Sep. 1998, 58(11):6779-6782.
Glynne-Jones et al., "Acoustofluidics 9: Modelling and applications of planar resonant devices for acoustic particle manipulation," Lab Chip, 2012, 12(8):1417, 18 pages.
Goans, Ronald E., et al., "Early Dose Assessment Following Severe Radiation Accidents", Health Physics, 72(4):513-518, Apr. 1997, abstract (1 page).
Goans, Ronald E., et al., "Early Dose Assessment in Criticality Accidents", Health Physics Society, 2001 (4 pages).
Good, B.T., et al., "An effervescent reaction micropump for portable microfluidic systems", Lab On a Chip, Royal Society of Chemistry, vol. 6, No. 5, Jan. 1, 2006 (Jan. 1, 2006), pp. 659-666, XP002577744, ISSN: 1473-0197, DOI: 10.1O39/B601542E [retrieved on Mar. 20, 2006].
Greenbaum A, Luo W, Su TW, et al. Imaging without lenses: Achievements and remaining challenges of wide-field on-chip microscopy. Nat Methods. 2012;9(9):889-895. doi: 10.1038/nmeth.2114; 10.1038/nmeth.2114.
Gurkan U, Moon S, Geckil H, et al. Miniaturized lensless imaging systems for cell and microorganism visualization in point-of-care testing. Biotechnol J. 2011;6(2):138-149. http://europepmc.org/abstract/MED/2129880.
Guy et al., "The use of fluorescence enhancement to improve the microscopic diagnosis of falciparum malaria," Malar. J., Jul. 2007, 6(89):1-8.
Hardie et al., "Joint MAP Registration and High Resolution Image Estimation Using a Sequence of Undersampled Images," IEEE Trans. Image Process., 1997, 6(12):1621-1633.
Hebeda et al., "5-Aminolevulinic acid induced endogenous porphyrin fluorescence in 9L and C6 brain tumours and in the normal rat brain," Acta Neurochir., 1998, 140(5):503-13.
Heng X, Erickson D, Baugh LR, et al. Optofluidic microscopy—a method for implementing a high resolution optical microscope on a chip. Lab Chip. 2006;6(10):1274-1276. http://dx.doi.org/10.1039/B604676B. doi: 10.1039/B604676B.
Heng X, Erickson D, Psaltis D, Yang C. A new imaging method: Optofluidic microscopy . . . 2005:60030F-60030F. doi: 10.1117/12.632157.
Heng X, Hsiao E, Psaltis D, Yang C. An optical tweezer actuated, nanoaperture-grid based optofluidic microscope implementation method. Opt Express. 2007;15(25):16367-16375. http://www.opticsexpress.org/abstract.cfm?URI=oe-15-25-16367.
Hill et al., "Micromanipulation of cells and particles using ultrasonic fields," SPIE Newsroom, Sep. 2010, 3 pages.
International Preliminary Report on Patentability for corresponding PCT/CA2014/050610, dated Jan. 7, 2016.
International Preliminary Report on Patentability from corresponding PCT application No. PCT/US2010/054240 mailed May 10, 2012 (7 pages).
International Preliminary Report on Patentability mailed Aug. 20, 2015 from corresponding PCT Application No. PCT/CA2014/050070 (11 pages).
International Search Report and Written Opinion for corresponding PCT/CA2014/050610, dated Sep. 16, 2014.
International Search Report and Written Opinion from corresponding PCT application No. PCT/US2010/054240 mailed Dec. 27, 2010 (16 pages).
International Search Report and Written Opinion mailed Jul. 17, 2014 from corresponding PCT Application No. PCT/CA2014/050070 (4 pages).
Irani et al., "Improving resolution by image registration," CVGIP, Graphical Models and Image Preoscessing, May 1991, 53(3):231-239.
Isikman et al., "Lensfree computational microscopy tools for cell and tissue imaging at the point-of-care and in low-resource settings". Analytical Cellular Pathology, vol. 35 pp. 229-247, 2012.
Isikman SO, Bishara W, Mavandadi S, et al. Lens-free optical tomographic microscope with a large imaging volume on a chip. Proceedings of the National Academy of Sciences. 2011. doi: 10.1073/pnas.1015638108.
Isikman SO, Sencan I, Mudanyali O, Bishara W, Oztoprak C, Ozcan A. Color and monochrome lensless on-chip imaging of caenorhabditis elegans over a wide field-of-view. Lab Chip. 2010;10(9):1109-1112. http://dx.doi.org/10.1039/C001200A. doi: 10.1039/C001200A.

(56) References Cited

OTHER PUBLICATIONS

Ivashkevich, Alesia N. et al., "'H2AX foci as a measure of DNA damage: A computational approach to automatic analysis", Mutation Research 711, 49-60, 2011 (12 pages).

Japanese Notice of Reasons for Refusal in JP Application No. 2019111995, dated Mar. 16, 2020, 11 pages with English Translation.

Japanese Notice of Reasons for Rejection, with English Translation, for Japanese Application No. 2017-199014, dated Sep. 10, 2019, 9 pages.

Japanese Notice of Reasons for Rejection, with translation thereof, for JP Appl No. 2015-132271, dated Aug. 1, 2016. (12 pages).

Japanese Notice of Reasons for Rejection, with translation thereof, for JP Appl No. 2015-132271, dated Jun. 14, 2017. (17 pages).

Japanese Notice of Refusal in Japanese Application No. 2019014120, dated Jan. 14, 2020, with English translation, 11 pages.

Japanese Office Action in Japanese Application No. 2016-522155, dated Nov. 7, 2019, 41 pages with English Translation.

Japanese Office action issued in Japanese application 2016-522155 on Feb. 19, 2018 (7 pages).

Japanese office action with English translation from Japanese application 2017-199014 issued on Dec. 3, 2018 (20 pages).

Japanese Office Action with English translation issued in Japanese application 2015-556353 on Nov. 27, 2017 (14 pages).

Japanese Office action with English translation issued in Japanese application 2016-522155 on Oct. 29, 2018 (8 pages).

Ji, Honghao, Abshire PA, Urdaneta M, Smela E. CMOS contact imager for monitoring cultured cells. Circuits and Systems, 2005 ISCAS 2005 IEEE International Symposium on. 2005:3491-3494 vol. 4. doi: 10.1109/ISCAS.2005.1465381.

Ji, Honghao, et al., "Contact Imaging: Simulation and Experiment", IEEE Transactions on Circuits and Systems—I: Regular Papers, vol. 54, No. 8, Aug. 2007 (13 pages).

Ji, Honghao, Sander D, Haas A, Abshire PA. A CMOS contact imager for locating individual cells. Circuits and Systems, 2006 ISCAS 2006 Proceedings 2006 IEEE International Symposium on. 2006:4 pp. doi: 10.1109/ISCAS.2006.1693345.

Ji, Honghao, Sander D, Haas A, Abshire PA. Contact imaging: Simulation and experiment. Circuits and Systems I: Regular Papers, IEEE Transactions on. 2007;54(8):1698-1710. doi: 10.1109/TCSI.2007.902409.

JP Notice of Reasons for Refusal in Japanese Appln. No. 2020081897, dated Jun. 10, 2021, 8 pages with English Translation.

Kapishnikov et al., "Aligned hemozoin crystals in curved clusters in malarial red blood cells revealed by nanoprobe X-ray Fe fluorescence and diffraction," Proc. Natl. Acad. Sci. USA, Jun. 2012, 109(28):11184-11187.

Kim et al., "LED and CMOS image sensor based hemoglobin concentration measurement technique". Sensors and Actuators B, vol. 157, pp. 103-109, 2011.

Kiuchi, Masato and Akiyoshi Chayahara, "Titanium nitride for transparent conductors", Appl. Phys. Lett. 64(8), Feb. 21, 1994 (3 pages).

Kobayashi T, Tamura H, Hatanaka Y, et al. Functional neuroimaging by using an implantable CMOS multimodal device in a freely-moving mouse. Biomedical Circuits and Systems Conference (BioCAS), 2011 IEEE. 2011:110-113. doi: 10.1109/BioCAS.2011.6107739.

Koenig, Kristi L., et al., "Medical Treatment of Radiological Casualties: Current Concepts", Disaster and Terrorism/Review Article, Jan. 20, 2005 (10 pages).

Lange D, Storment CW, Conley CA, Kovacs GTA. A microfluidic shadow imaging system for the study of the nematode caenorhabditis elegans in space. Sensors Actuators B: Chem. 2005; 107(2):904-914. doi: 10.1016/j.snb.2004.12.039.

Lawrence et al., "Birefringent Hemozoin Identifies Malaria," Am. J. Clin. Pathol., Sep. 1986, 86(3):360-363.

Lee et al., "Color capable sub-pixel resolving optofluidic microscope and its application to blood cell imaging for malaria diagnosis". PLOS ONE, vol. 6(10):e23427, 2011.

Lee L, Cui X, Yang C. The application of on-chip optofluidic microscopy for imaging giardia lamblia trophozoites and cysts. Biomed Microdevices. 2009;11(5):951-958. http://dx.doi.org/10.1007/s10544-009-9312-x. doi: 10.1007/s10544-009-9312-x.

Lee M, Yaglidere O, Ozcan A. Field-portable reflection and transmission microscopy based on lensless holography. Biomed Opt Express. 2011;2(9):2721-2730. doi: 10.1364/BOE.2.002721; 10.1364/BOE.2.002721.

Lee SA, Zheng G, Mukherjee N, Yang C. On-chip continuous monitoring of motile microorganisms on an ePetri platform. Lab Chip. 2012; 12(13):2385-2390. doi: 10.1039/c21c40090a; 10.1039/c21c40090a.

Lee, Seung Ah, et al., "Supplementary Information for: Sub-pixel resolving optofluidic microscope for on-hip cell imaging", Supplementary Material (ESI) for Lab on a Chip, The Royal Society of Chemistry, 2012 (4 pages).

Leosson et al., "Long-range surface plasmon polariton nanowire waveguides for device applications," Optics Express, 2006, 14(1):314-319.

Liu, Yingkai, et al., "Cell-lab on a chip: a CMOS-Based Microsystem for Culturing and Monitoring Cells", Proceedings of the 26th Annual International Conference of the IEEE EMBS, San Francisco, CA, pp. 2534-2537, Sep. 1-5, 2004 (4 pages).

Lorenz KS, Salama P, Dunn KW, Delp EJ. Digital correction of motion artefacts in microscopy image sequences collected from living animals using rigid and nonrigid registration. J Microsc. 2012; 245(2):148-160. doi: 10.1111/j.1365-2818.2011.03557.x; 2012.

Lu, Steven N., et al., "Optical Mapping of Anatomical Reentry in Monolayers of Cultured Neonatal Rat Cardiac Myocytes", Proceedings of the First Joint BMES/EMBS Conference, Serving Humanity, Advancing Technology, Oct. 13-16, 1999 (1 page).

Maiden AM, Rodenburg JM, Humphry MJ. Optical ptychography: A practical implementation with useful resolution. Opt Lett. 2010;35(15):2585-2587. http://ol.osa.org/abstract.cfm?URI=ol-35-15-2585.

Maiden AM, Rodenburg JM. An improved ptychographical phase retrieval algorithm for diffractive imaging. Ultramicroscopy. 2009; 109(10):1256-1262. doi: 10.1016/j.ultramic.2009.05.012.

Manaresi N, Romani A, Medoro G, et al. A CMOS chip for individual cell manipulation and detection. Solid-State Circuits, IEEE Journal of. 2003;38(12):2297-2305. doi: 10.1109/JSSC.2003.819171.

McCorkle R, Angilello J, Coleman G, Feder R, LA Placa SJ. Flash X-ray microscopy. Science. 1979;205(4404):401-402. doi: 10.1126/science.205.4404.401.

Medoro et al., "A lab-on-a-chip for Cell Detection and Manipulation", IEEE Sensors, 2003, 3(3):317-325.

Metcalfe, "Platelet Antigens and Antibody Detection," Vox Sanguinis, Jun. 2004, 87(Suppl 1):S82-S86.

Milanfar P (2010) Super-Resolution Imaging (CRC Press, Boca Raton, FL).

Moon et al., "Lensless imaging for Point of Care Testing," 31st Annual International Conference of the IEEE EMBS, Minneapolis, Minnesota, USA, Sep. 2-6, 2009, 6376-6379.

Moon S, Keles HO, Ozcan A, et al. Integrating microfluidics and lensless imaging for point-of-care testing. Biosensors and Bioelectronics. 2009;24(11):3208-3214. doi: 10.1016/j.bios.2009.03.037.

Moscelli N, van den Driesche S, Witarski W, Pastorekova S, Vellekoop MJ. An imaging system for real-time monitoring of adherently grown cells. Sensors and Actuators A: Physical. 2011; 172(1):175-180. doi: 10.1016/j.sna.2011.05.010.

Mudanyali et al., "Compact and cost-effective lensless telemedicine microscopy for global health applications". IEEE Global Humanitarian Technology Conference, pp. 62-65, 2011.

Mudanyali O, Tseng D, Oh C, et al. Compact, light-weight and cost-effective microscope based on lensless incoherent holography for telemedicine applications. Lab Chip. 2010;10(11):1417-1428. http://dx.doi.org/10.1039/C000453G. doi: 10.1039/C000453G.

Mudanyali, Onur, et al., "Lensless On-Chip Imaging of Cells provides a new tool for high-throughout cell-biology and medical diagnostics", Journal of Visualized Experiments, 2009 (3 pages).

(56) References Cited

OTHER PUBLICATIONS

Mudayali, Onur, et al., "Compact, light-weight and cost-effective microscope based on lensless incoherent holography for telemedicine applications", Lab on a Chip, 2010 (20 pages).
Mustafa Mir et al., "Blood testing at the single cell level using quantitative phase and amplitude microscopy", Biomedical Optics Express, vol. 2, No. 12; Dec. 1, 2011.
Nakayama, Yasuhiro, "Varied Effects of Thoracic Irradiation on Peripheral Lymphocyte Subsets in Lung Cancer Patients", Internal Medicine vol. 34, No. 10, Oct. 1995 (7 pages).
Ng DC, Tamura H, Mizuno T, et al. An implantable and fully integrated complementary metal-oxide semiconductor device for in vivo neural imaging and electrical interfacing with the mouse hippocampus. Sensors and Actuators A: Physical. 2008;145-146(0):176-186. doi: 10.1016/j.sna.2007.11.020.
Ng DC, Tokuda T, Nakagawa T, et al. A new neural imaging approach using a CMOS imaging device. Conf Proc IEEE Eng Med Biol Soc. 2006; 1:1061-1064. doi: 10.1109/IEMBS.2006.260316.
Ng, D, Tokuda T, Shiosaka S, Tano Y, Ohta J. Implantable microimagers. Sensors. 2008;8(5):3183-3204. http://www.mdpi.com/1424-8220/8/5/3183.
Ng, David, et al., "Integrated In Vivo Neural Imaging and Interface CMOS Devices: Design, Packaging, and Implementation", IEEE Sensors Journal, vol. 8, No. 1, pp. 121-130, Jan. 2008 (10 pages).
Office Action in Canadian Appln. No. 2938896, dated May 29, 2024, 4 pages.
Office Action in Canadian Appln. No. 2938896, dated Sep. 16, 2022, 4 pages.
Office Action in European Application No. 14817587.0, dated May 2, 2022, 4 pages.
Office Action in European Appln. No. 14749668.1, dated Oct. 6, 2022, 6 pages.
Office Action in Japanese Application No. 2023-18481, dated Nov. 24, 2023, 8 pages (with English Translation).
Office Action in Japanese Appln. No. 2020-151937, dated Aug. 1, 2022, 6 pages (with English translation).
Office action with English translation from Chinese Application No. 201080059753.X issued Dec. 25, 2013 (19 pages).
Office Action with English translation from Japanese application 2015-556353 mailed on Feb. 18, 2019 (5 pages).
Office Action with English translation from Japanese application 2015-556353 mailed on Jul. 23, 2018 (8 pages).
Office action with English translation issued Apr. 2, 2014 in Japanese application 2012-536989 (12 pages).
Oh C, Isikman SO, Khademhosseinieh B, Ozcan A. On-chip differential interference contrast microscopy using lensless digital holography. Opt Express. 2010; 18(5):4717- 4726. http://www.opticsexpress.org/abstract.cfm?URI=oe-18-5-4717.
Ohta J, Tagawa A, Minami H, et al. A multimodal sensing device for fluorescence imaging and electrical potential measurement of neural activities in a mouse deep brain. Engineering in Medicine and Biology Society, 2009 EMBC 2009 Annual International Conference of the IEEE. 2009:5887-5890. doi: 10.1109/IEMBS.2009.5334461.
OmniVision, "The World's First ¼-inch 5-Megapixel SoC Image Sensor with OmniBSI™ Technology", OV5642, version 1.1, Dec. 2009 (2 pages).
Optofluidics, "Optofluidic microscope shrinks to fit on a chip", optics.org/ole, Oct. 2008 (2 pages).
Ozcan, Aydogan et al.,: "Ultra-wide-field lens-free monitoring of cells on-chip", Lab On a Chip, vol. 8, No. 1, Jan. 1, 2008 (Jan. 1, 2008), p. 98, XP055051174, ISSN: 1473-0197, DOI: 10.1039/B713695A.
Ozcan, Aydogan: Lensfree on-chip imaging for telemedicine applications, Optical MEMS and Nanophotonics, 2009 IEEE/LEOS International Conference on, IEEE, Piscataway, NJ, USA, Aug. 17, 2009 (Aug. 17, 2009), pp. 59-60, XP031570125, ISBN: 978-1-4244-2382].

Pang S, Han C, Kato M, Sternberg PW, Yang C. Wide and scalable field-of-view talbot-grid-based fluorescence microscopy. Opt Lett. 2012;37(23):5018-5020. doi: 10.1364/OL.37.005018.
Prakash SB, Nelson NM, Haas AM, et al. BioLabs-on-A-chip: Monitoring cells using CMOS biosensors. Life Science Systems and Applications Workshop, 2006 IEEE/NLM. 2006:1-2. doi: 10.1109/LSSA.2006.250426.
Psaltis D, Quake SR, Yang C. Developing optofluidic technology through the fusion of microfluidics and optics. Nature. 2006;442(7101):381-386. http://dx.doi.org/10.1038/nature05060.
Reale L, Bonfigli F, Lai A, et al. X-ray microscopy of plant cells by using LiF crystal as a detector. Microsc Res Tech. 2008;71(12):839-848. http://europepmc.org/abstract/MED/18785247.
Response to Canadian Office action dated Jul. 3, 2018 in Canadian application 2938896 filed on Dec. 24, 2018 (37 pages).
Response to Canadian office action for Canadian application 2953620 filed on Apr. 13, 2018 (12 pages).
Response to Canadian office action in Canadian application 2778725, filed on Sep. 25, 2018 (29 pages).
Response to Canadian Office Action submitted in Canadian application 2938896 on Jan. 11, 2018 (125 pages).
Response to Chinese Office Action in Chinese application 201610217300.4 issued on Aug. 30, 2017, filed on Jan. 9, 2018 (12 pages).
Response to Chinese office action is Chinese application 201610217300.4 filed on Jan. 9, 2018 (12 pages).
Response to Chinese office action is Chinese application 201610217300.4 filed on Jun. 6, 2018 (12 pages).
Response to Chinese office action is Chinese application 201610217300.4 filed on Oct. 29, 2018 (6 pages).
Response to Chinese office action with English translation for Chinese application 201480047483.9 filed on Apr. 16, 2018 (14 pages).
Response to European Communication dated Jun. 6, 2012 in European application No. 10827423.4, filed Dec. 10, 2012 (15 pages).
Response to European Communication from European application 14749668.1 submitted on Feb. 21, 2017 (29 pages).
Response to European Communication in European application No. 10827423.4 filed on Apr. 5, 2018 (21 pages).
Response to European Communication pursuant to Article 94(3) EPC in European Application 14817587.0 filed on Apr. 30, 2018 (10 pages).
Response to European Communication Pursuant to Rules 161(2) & 162 EPC issued in European application 14817587.0 submitted on Jun. 28, 2016 (5 pages).
Response to European Communication Pursuant to Rules 70(2) and 70a(2) EPC issued in European application 14817587.0 submitted on Aug. 18, 2017 (14 pages).
Response to Japanese Notice of Reasons for Rejection, with English translation thereof, for JP Appl No. 2015-132271, filed on Jan. 31, 2017 (29 pages).
Response to Japanese Office action issued in Japanese application 2016-522155 on May 14, 2018 (14 pages).
Response to Japanese Office action with English translation issued in Japanese application 2015-556353 submitted on Feb. 27, 2018 (8 pages).
Response to Office action with English translation from Chinese Application No. 201080059753.X filed Jul. 9, 2014 (12 pages).
Response to Office action with English translation from Chinese application No. 201080059753.X filed on Feb. 2, 2015 (13 pages).
Response to Office Action with English translation from Japanese application 2015-556353 filed on Sep. 28, 2018 (9 pages).
Response with English translation to Chinese office action issued in Chinese application 201480047483.9 on Oct. 8, 2018, filed on Dec. 24, 2018 (16 pages).
Response with English translation to Japanese Office action filed in Japanese application 2012-536989 filed on Sep. 30, 2014 (29 pages).
Richard C, Renaudin A, Aimez V, Charette PG. An integrated hybrid interference and absorption filter for fluorescence detection in lab-on-a-chip devices. Lab Chip. 2009;9(10):1371-1376. doi: 10.1039/b819080a; 10.1039/b819080a.

(56) References Cited

OTHER PUBLICATIONS

Rodenburg JM, Hurst AC, Cullis AG. Transmission microscopy without lenses for objects of unlimited size. Ultramicroscopy. 2007;107(2-3):227-231. doi: 10.1016/j.ultramic.2006.07.007.
Rojas-Palma, Carlos, "Triage, Monitoring and Treatment Handbook," 2009 (290 pages).
Sadrozinski, Harmut F, et al., "The Particl Tracking Silicon Microscope PTSM", Nov. 15, 2003 (5 pages).
Salama K, Eltoukhy H, Hassibi A, El-Gamal A. Modeling and simulation of luminescence detection platforms. Biosens Bioelectron. 2004;19(11):1377-1386. doi: 10.1016/j.bios.2003.12.031.
Sander D, Dandin M, Honghao Ji, Nelson N, Abshire P. Low-noise CMOS fluorescence sensor. Circuits and Systems, 2007 ISCAS 2007 IEEE International Symposium on. 2007:2007-2010. doi: 10.1109/ISCAS.2007.378431.
Seo S, Su T, Tseng DK, Erlinger A, Ozcan A. Lensfree holographic imaging for on-chip cytometry and diagnostics. Lab Chip. 2009;9(6):777-787. http://dx.doi.org/10.1039/B813943A. doi: 10.1039/B813943A.
Seo, Sungkyu, et al., "High-Throughput Lens-Free Blood Analysis on a Chip", Anal. Chem. 82, 4621-4627, 2010 (7 pages).
Singh RR, Ho D, Nilchi A, Genov R, Gulak PG. A hybrid thin-film/CMOS fluorescence contact imager. Circuits and Systems, 2009 ISCAS 2009 IEEE International Symposium on. 2009:2437-2440. doi: 10.1109/ISCAS.2009.5118293.
Singh RR, Ho D, Nilchi A, Gulak PG, Yau P, Genov R. A CMOS/Thin-film fluorescence contact imaging microsystem for DNA analysis. Circuits and Systems I: Regular Papers, IEEE Transactions on. 2010;57(5):1029-1038. doi: 10.1109/TCSI.2010.2043990.
Singh RR, Leng L, Guenther A, Genov R. A hybrid CMOS-microfluidic contact imaging microsystem . . . 2009:739712-739712. doi: 10.1117/12.827862.
Stummer et al., "Intraoperative Detection of Malignant Gliomas by 5-Aminolevulinic Acid-Induced Porphyrin Fluorescence," Neurosurgery, Mar. 1998, 42(3):518-26.
Stybayeva et al., "Lensfree holographic imaging of antibody microarrays for high-throughput detection of leukocyte numbers and function". Analytical Chemistry, vol. 82(9): 3736-3744, 2010.
Su TW, Seo S, Erlinger A, Ozcan A. High-throughput lensfree imaging and characterization of a heterogeneous cell solution on a chip. Biotechnol Bioeng. 2009;102(3):856-868. doi: 10.1002/bit.22116; 10.1002/bit.22116.
Su, Ting-wei et al, "High Throughout Lensfree Imaging and Characterization of a Heterogeneous Cell Solution on a chip", Biotechnology and Bioengineering, Sep. 8, 2008 (13 pages).
Su, Ting-Wei et al: "24: OPN 2008 Towards Wireless Health: On-Chip Cytometry", December Lensless 16,21-25, Dec. 30, 2008 (Dec. 30, 2008), XP055419182, Retrieved from the Internet: URL:https://www.osapublishing.org/DirectPDFAccess/472D83FE-B727-F2F7-7A63B2F4FBF0B3AD_175086/opn-19-12-24.pdf?da=1&id=175086&seq=0&mobile=no [retrieved on Oct. 25, 2017].
Sukhovatkin et al., "Colloidal Quantum-Dot Photodetectors Exploiting Multiexciton Generation," Science, Jun. 2009, 324(5934):1542-1544.
Supplemental Search Report from European application 14817587.0 issued on Jan. 26, 2017 (9 pages).
Swartz, Harold, M., et al., "A Critical Assessment of Biodosimetry Methods for Large-Scale Incidents", vol. 98, No. 2, Feb. 2010 (14 pages).
Tam T, Jullien GA, Yadid-Pecht O. A CMOS contact imager for cell detection in bio-sensing applications. Circuits and Systems, 2007 ISCAS 2007 IEEE International Symposium on. 2007:813-816. doi: 10.1109/ISCAS.2007.378030.
Tekalp et al., "High-Resolution Image Reconstruction for Lower-Resolution Image Sequences and Space-Varying Image Restoration," IEEE International Conference on Acoustics, Speech, and Signal Processing, San Francisco, CA, Mar. 23-26, 1992, pp. iii-169-172.
Tokuda T, Ng DC, Yamamoto A, Kagawa K, Nunoshita M, Ohta J. A CMOS optical/potential image sensor with 7.5µm pixel size for on-chip neural and DNA spot sensing. Engineering in Medicine and Biology Society, 2005 IEEE-EMBS 2005 27th Annual International Conference of the. 2005:7269-7272. doi: 10.1109/IEMBS.2005.1616189.
Tseng D, Mudanyali O, Oztoprak C, et al. Lensfree microscopy on a cellphone. Lab Chip. 2010; 10(14):1787-1792. http://dx.doi.org/10.1039/C003477K. doi: 10.1039/C003477K.
USPTO Transaction history, application as filed for U.S. Appl. No. 12/913,639.
USPTO Transaction history, application as filed for U.S. Appl. No. 13/095,175.
USPTO Transaction history, application as filed for U.S. Appl. No. 14/314,743.
USPTO Transaction history, application as filed for U.S. Appl. No. 14/698,532.
USPTO Transaction history, application as filed for U.S. Appl. No. 14/710,046.
USPTO Transaction history, application as filed for U.S. Appl. No. 15/066,065.
USPTO Transaction history, application as filed for U.S. Appl. No. 15/360,724.
USPTO Transaction history, application as filed for U.S. Appl. No. 15/642,434.
USPTO Transaction history, application as filed for U.S. Appl. No. 15/995,598.
USPTO Transaction history, application as filed for U.S. Appl. No. 16/113,578.
USPTO Transaction history, application as filed for U.S. Appl. No. 16/367,791.
Vaurijoux, Aurelie, et al., "Biological Dosimetry of Ionizing Radiation", Laboratory Of Biological Dosimetry, www.intechopen.com, Feb. 12, 2012 (21 pages).
Voluntary amendment filed with English translation of Chinese Application No. 201080059753.X filed Feb. 7, 2013 (17 pages).
Voluntary amendment with English translation filed in CN Application 201480047483.9 on Jun. 27, 2016 (21 pages).
Wang A, Gill P, Molnar A. Light field image sensors based on the talbot effect. Appl Opt. 2009;48(31):5897-5905. http://ao.osa.org/abstract.cfm?URI=ao-48-31-5897.
Waselenko, Jamie K., "Medical Management of the Acute Radiation Syndrome: Recommendations of the Strategic National Stockpile Radiation Working Group", Annual Internal Medicine, 2004 (19 pages).
Watson et al., "Video-rate confocal endoscopy," J. Microsc., Jul. 2002, 207(Pt 1):37-42.
Webster, J.R., et al., "Monolithic Electrophoresis Device with Integrated Fluorescence Detector", Anal. Chem. 1622-1626, 2001 (5 pages).
Williams, Jacqueline P., "Animal Models for Medical Countermeasures to Radiation Exposure", National Institute of Health, Apr. 2010 (35 pages).
Xiao et al., "Enhanced transmission through arrays of subwavelength holes in gold films coated by a dielectric layer," J. Eur. Opt. Soc., 2007, 2(07009), 11 pages.
YongKeum Park et al., "Spectroscopic phase microscopy for quantifying hemoglobin concentrations in intact red blood cells", Opt Lett. Dec. 1, 2009; 34(23): 3668-3670.
Zheng et al., "Miniaturized Ultrathin Slab Gel Electrophoresis with Thermal Lens Microscope Detection and Its Application to Fast Genetic Diagnosis," Anal. Chem., Sep. 1991, 71(21):5003-5008.
Zheng G, Cui X, Yang C. Surface-wave-enabled Darkfield aperture for background suppression during weak signal detection. Proceedings of the National Academy of Sciences. 2010. doi: 10.1073/pnas.0912563107.
Zheng G, Lee SA, Antebi Y, Elowitz MB, Yang C. The ePetri dish, an on-chip cell imaging platform based on subpixel perspective sweeping microscopy (SPSM). Proceedings of the National Academy of Sciences. 2011. doi: 10.1073/pnas.1110681108.

(56) References Cited

OTHER PUBLICATIONS

Zheng G, Lee SA, Yang S, Yang C. Sub-pixel resolving optofluidic microscope for on-chip cell imaging. Lab Chip. 2010;10(22):3125-3129. http://dx.doi.org/10.1039/C0LC00213E. doi: 10.1039/C0LC00213E.

Zheng, et al., "Supporting Information", SI Text, www.pnas.org/cgi/doi/10.1073/pnas.1110681108, 2011, 3 pages.

Zheng, Guoan, et al., "Scanning Projective Microscopy for 2D and 3D imaging", Electrical Engineering, California Institute of Technology, 2011 (5 pages).

\* cited by examiner

DETECTING AND USING LIGHT REPRESENTATIVE OF A SAMPLE

This application is a continuation of U.S. non-provisional patent application Ser. No. 17/981,228, filed Nov. 4, 2022, which is a continuation of U.S. non-provisional patent application Ser. No. 14/173,500, filed Feb. 5, 2014, which is entitled to the benefit of the priority of the filing dates of U.S. provisional patent application 61/761,467, filed Feb. 6, 2013, and U.S. 61/785,762, filed Mar. 14, 2013. All of the applications named in this paragraph are incorporated here by reference in their entireties.

This description relates to detecting and using light representative of a sample.

In a typical optical microscope, light that passes through a sample is delivered to the eye of a user, or film, or a sensor through lenses that form an image that is representative of the sample.

In other approaches, light representative of a sample can be detected and used to form an image of the sample without lenses by placing the sample on or near a detector, for example, an integrated circuit, that includes an arrangement of light sensitive elements. Signals generated by the detector can be processed to derive an image.

SUMMARY

In general, in an aspect, an imaging device includes light sensitive locations that are separately sensitive to light received at a surface with respect to a portion of a sample associated with the surface, the light sensitive locations having a resolution of 5 microns or smaller. There is a device to associate the portion of the sample with the surface. The imaging device and a distance of the portion of the sample to the light sensitive locations are such that usable useful images of the portion of the sample can be acquired directly by operation of the imaging device.

Implementations may include any of the following features or any two or more of them in combination. The light sensitive locations have a resolution of 3 microns or smaller. The light sensitive locations have a resolution of 2 microns or smaller. The light sensitive locations have a resolution of 1 micron or smaller. The distance of the light sensitive locations to the portion of the sample is less than a wavelength of light used in operation of the imaging device. The distance of the light sensitive locations to the portion of the sample is less than half of a wavelength of light used in operation of the imaging device.

In general, in an aspect, an imaging device includes light source locations that are separately able to deliver light with respect to a portion of a sample associated with the surface. The light source locations have a resolution of 5 microns or smaller. There is a device to associate the portion of the sample with the surface and with a light detector to receive light from the light source locations and the sample, The imaging device and a distance of the portion of the sample to the light source locations are such that a useful image of the portion of the sample can be acquired directly by operation of the imaging device.

Implementations may include any of the following features or any two or more of them in combination. The light source locations have a resolution of 3 microns or smaller. The light source locations have a resolution of 2 microns or smaller. The light source locations have a resolution of 1 micron or smaller. The distance of the light source locations to the portion of the sample is less than a wavelength of light used in operation of the imaging device. The distance of the light source locations to the portion of the sample is less than half of a wavelength of light used in operation of the imaging device.

Implementations may include any of the following features or any two or more of them in combination. The light sensitive locations include light-sensitive portions of pixels of the imaging device. The imaging device is back-illuminated, is free of micro lenses and color filters and is the most superficial layer of the pixels, other than a molecular passivation layer of no more than a few nanometers. The light source locations include LEDs. The LEDs comprise organic LEDs and there is a transparent electrode layer between the sample and light emitting portions of pixels represented by the LEDs. The sample is in direct contact with light emitting surfaces of the light source locations. The distance of the portion of the sample to the surface is zero. The distance of the portion of the sample to the surface is greater than zero. The distance of the portion of the sample to the surface is no more than about 10 mm. The distance of the portion of the sample to the surface is not more than about 5 µm.

An integrated circuit bears the surface and contains the imaging device. The imaging device includes CMOS light sensitive elements. The imaging device includes LEDs. The imaging device includes CCD light sensitive elements. The arrangement includes a two-dimensional array. At least some of the locations of the imaging device have a center to center spacing of no more than 500 nm. At least some of the locations of the imaging device have a center to center spacing of no more than 5 micrometers. There is a source of light for the imaging device or a detector of light from the imaging device. There is a source of broadband light for the light sensitive locations, the wavelength components of the broadband light being dispersed along a dimension of the imaging device. An absorbance spectroscopy element processes wavelength-dependent information from the imaging device. The sample is homogeneous and a single image from the imaging device is sufficient for absorbance spectroscopy processing. The sample is heterogeneous and flows past the imaging device, multiple images are captured by the imaging device, and the absorbance spectroscopy element processes the images together.

There is a light amplifier. The light amplifier includes a microchannel plate image intensifier at the surface. The light amplifier includes an electron bombarded CMOS image sensor or CCD image sensor. The sensor is free of a front window. There is a photocathode between the sample and the surface. The photocathode has a sharply tuned spectral responsiveness. There is a thin film filter between the sample and the light sensitive locations. The thin-film filter has a thickness less than 4 microns. The thin-film filter has spectral characteristics that are not uniform across the imaging device. The thin-film filter has different transmission wavelengths for different regions of the imaging device. The different regions include one or no more than a few pixels. A computational element further processes the image.

There is also a device to associate the portion of the sample with the surface. The device to associate the portion of the sample with the surface includes a surface arranged to be spaced apart from the surface with which the sample is associated. The device to associate the portion of the sample with the surface includes a chamber that encompasses at least a portion of the surface with which the portion of the sample is associated and is to contain the portion of the sample. The chamber also encloses an overflow space adjacent to the sample space. The device includes elements for flowing of the portion of the sample past the surface. The device includes elements for causing units of interest in the portion of the sample to tend to be located closer to the surface than other elements of the portion of the sample.

There is an analytical element to analyze the image. There are circuit elements to control the imaging device to produce the signals or data from which the image is formed. There are additional elements to form a self-contained imaging device. The elements include at least one of a power source, data storage, a processor, software, an operating system, a communication facility, and a user interface. The imaging device is commercially available.

The device to associate the portion of the sample with the surface includes a lid. The lid is transparent to light. The lid includes a bottom surface arranged to touch the sample. The lid is disposable and includes spots of binding units that are to be aligned with the light sensitive locations of the imaging device. The lid is suspended from an aperture in a balloon, the perimeter of which is attached at or near the imaging device. The balloon forms a gasket to contain the sample. The binding units include at least one of antibodies, aptamers, reagents, ligands, enzymes, enzyme substrates, peptide toxins, fluorescent sensors or probes. The fluorescence, color or other optical signal from each of the spots is detected principally only by the light sensitive locations directly beneath the spot or light sensitive locations directly adjacent to those light sensitive locations. The spots of binding units include spots of graduated sensitivities. The spots are calibrated for use in performing quantitative measurements on molecular analytes in a portion of the sample.

The spots of binding units are deposited directly onto the pixels and aligned with the light sensitive locations of the imaging device. The binding units comprise at least one of antibodies, aptamers, reagents, ligands, enzymes, enzyme substrates, peptide toxins, fluorescent sensors, or probes.

Fluorescent, color or other optical signal from each of the spots is detected principally only by the light sensitive locations directly beneath the spot or light sensitive locations directly adjacent to those light sensitive locations. The spots of binding units comprise spots of graduated sensitivities. The spots are calibrated for use in performing quantitative measurements on molecular analytes in a portion of the sample. The pixels on which the spots are placed are separated by blank pixels to avoid crosstalk.

The bottom surface of the lid and the surface with which the portion of the sample is associated are parallel. The bottom surface of the lid and the surface with which the portion of the sample is associated are not parallel. There is a gap between the bottom surface of the lid and the associated surface is thicker at one end than the other. A sample flow path oriented from the thicker portion of the gap to the thinner portion of the gap. The thinner end of the gap is thin enough to permit only single units in the sample to be present. The bottom surface of the lid is convex relative to the surface associated with the portion of the sample. The lid is to be tilted about the convex bottom surface to steer the point of contact along the surface. The device to associate the portion of the sample with the surface includes a mechanism to apply a force to the sample toward the surface. The lid is arranged to have a variable distance from the surface. The lid moves relative to a support to achieve the variable distance The lid or support or both have features to reduce tilting of the lid relative to the surface. The features include at least one of vanes and grooves.

There is a mechanism to lower the lid smoothly and maintain its bottom parallel to the surface. The mechanism comprises one or more of gravity, magnetism, springs, motors, piezoelectric materials, parallelogram flexures, sidewall friction, and dashpots. There is a mechanism to measure the volume of the sample space in the chamber. The mechanism comprises at least one of absorbance using a known concentration of dye, counting of microbeads added in known concentration, and trigonometry with markers/spots on the bottom surface of the chamber lid illuminated from different positions.

The device to associate the portion of the sample with the surface is arranged to define a sample space. The sample space includes a precisely known volume at the surface. The portion of the sample contains sample units and the sample space extends from the surface by a distance that corresponds to a size of the sample units. The device to associate the portion of the sample with the surface includes a flow inlet and a flow outlet.

There is a heater, a cooler, or another temperature controller for the portion of the sample. There is an incubation device. There are one or more electrodes to contact the portion of the sample. There is an illuminator. The illuminator is to deliver collimated light toward the surface. The illuminator is to deliver light from one or more point sources. The illuminator comprises optical fiber. The illuminator is to deliver light at specific wavelengths using LEDs or lasers. The illuminator comprises red, green, and blue sources, and the image comprises a full color image obtained by combining three monochrome images derived from light provided respectively by the red, green, and blue sources. The illuminator is to deliver dark field illumination to the portion of the sample. The illuminator is to deliver light according to a temporal profile. The illuminator includes a multi-point illuminator and anamorphic reflectors or an anamorphic prism to collimate light toward the surface.

There is a treatment of or on the surface. The treatment includes a layer on the surface. The treatment includes a protective material. The treatment includes an abrasion resistance material. The treatment includes spectral filtering. The treatment includes polarization filtering. The treatment includes a light guide array having one guide associated with each of the light sensitive locations. The treatment includes a microlens array having one lens associated with each of the light sensitive locations. The treatment includes a non-textured surface. The treatment includes silanization. The treatment includes one or more parylenes. The treatment increases adhesion of the sample or ligands or other probes. The treatment includes scintillants. The treatment increases a spectral range of the imaging device.

The imaging device includes a photosensitive layer. The photosensitive layer includes a coating of quantum dots or other fluorescent or luminescent particles on a silicon CMOS readout array. The photosensitive layer emits electrons that are to be read by the CMOS circuit. The photosensitive particles have activation wavelengths in the emission band, but not in the excitation band, of selected fluorescent or luminescent probes. The device is to receive backside illumination.

There is a disposable component and a re-usable component that is to be reused with successive units of the disposable component. There is a disposable component to be used with a re-usable component and to be replaced by another unit of the disposable component to be used with the re-usable component. There is a spacing feature to establish a spacing relative to the surface. The spacing feature includes micro beads. The micro beads are associated with the sample. The micro beads are part of the device that associates the portion of the sample with the surface. The micro beads are associated with the surface.

The imaging device is mounted on a tool. The tool is elongated to fit within an enclosed space. The tool includes an endoscopic medical tool. The surface projects from the tool. The tool includes an illuminator.

A layer on the surface is to receive light at an edge of the layer and propagate it to a vicinity of the light sensitive locations. A pipette is to contain the sample in a chamber at the surface. The chamber is of a precise volume. The pipette includes a compressible bulb or piston on the chamber and an inlet tube opening into the chamber. There are two or more of such surfaces and imaging devices and two or more pipettes to contain samples in chambers at the surfaces of such imaging devices. The samples are accessible to the pipettes from a common supply.

The layer is to conduct surface plasmon illumination to the portion of the sample. The layer includes a totally internally reflective layer on the surface to provide illumination as an evanescent wave to the portion of the sample. Two or more of the imaging devices are arranged next to one another to provide a larger arrangement of light source locations or light sensitive locations or both. An acoustic resonator is to cause units of interest in the portion of the sample to move within the sample relative to the surface. The acoustic resonator is directly above the imaging device and is annular. The acoustic resonator is not directly above the imaging device, and the device that associates the portion of the sample with the surface enables a laminar flow of the acoustically-focused sample onto the surface. A micropore optic is to conduct light to the portion of the sample. The light source locations include separately controllable light sources that can be discriminated by the light sensitive locations to increase the resolution of the image. The light sensitive locations include single electron field effect transistors.

There is a transparent layer of gold on the surface, and linkers attached to the gold using thiol chemistry. There is a transparent parylene layer on the surface, and linkers attached to the parylene after functionalization using amine or other chemistry. Zero or one molecule is bound to the surface at each of the light sensitive or light source locations.

In general, in an aspect, a device is configured to enable a sample of a person or animal who is the subject of health care to be placed at a surface of a device, the surface being associated with a dense array of light sensitive locations or light emitting locations or both. There are electronics to cause information about the sample to be captured at a resolution of 5 microns or smaller by the device using light and to be provided for use in health care of the person or animal.

Implementations may include any of the following features or any two or more of them in combination. A processor is to process the information captured about the sample to generate results associated with units contained in the sample. The processor enables visualization of the sample. The processor identifies the units contained in the sample. The processor classifies units contained in the sample. The processor enumerates units contained in the sample. The processor measures units contained in the sample. The measurement is of at least one of volume, size, shape, length, luminescence, fluorescence, scattering, birefringence, or other optical property, a spectral property of the optical density or luminescence.

The sample includes cells. The sample includes blood cells. The sample includes a cytological specimen. The sample includes protozoa. The sample includes bacteria. The sample includes parasites. The sample includes particles. The sample includes urinary crystals. The sample includes urinary casts. A processor is to perform chemical analysis using the information captured about the sample.

In general, in an aspect, a device is configured to enable a surface of the device to be placed on or in the vicinity of tissue or material of a person or animal who is a subject of health care at a location. The surface is associated with a dense array of light sensitive locations or light emitting locations or both, and electronics is to cause information about the sample to be captured by the device using light at the location and to be provided for use in the health care.

Implementations may include any of the following features or any two or more of them in combination. A communication facility is for transmission of the information to a remote location for analysis of the information. The information includes an image of a blood sample, and there is an analysis device, located with or located remotely from the electronics. The device is to enumerate blood cells of specific types. A. The device is configured to enable a surface of the device to be placed into contact with tissue or cells at a surgical site of the person or animal during a surgical procedure. The tissue or cells remain part of the person or animal. The tissue or cells have been excised from the person or animal. A processor is to enable visualization of the tissue or cells during the surgical procedure using the information captured about the sample. A communication facility to send the information to a remote location to permit a practitioner at the remote location to view or determine the condition of the tissue or cells. The tissue or material is part of the person. The tissue or material has been removed from the person during the surgical procedure.

Information about the sample is caused to be captured dynamically by the device using light at the location. Dynamic aspects of the sample are monitored. Microcirculation is monitored. The quality of images captured dynamically is improved by at least one of the following: reading only subparts of the images captured by the device; capturing images using periods of lighting that are shorter than image capture cycles of the device; capturing images using light of wavelengths that are absorbed by units of the sample, to enhance contrast; or using alternating wavelengths of light for successive images that are captured. Dynamic changes in blood oxygenation are monitored. Light is used to excite fluorescence and at least one of the following is monitored: dynamic changes in tissue metabolism, ion levels, membrane electrical potential, redox state, cellular energetics. There is a mechanism that enables illumination to be provided from alongside the surface of the device or from points interspersed across the surface, at least partly through tissue of the person. The surface of the device projects from the apparatus. The device is on a probe. A small light source or light sources is or are on the probe in the vicinity of the device. A mechanism is to provide a contrast agent to the tissue or material. The contrast agent includes a vital stain or an antibody or another ligand with molecular specificity. The antibody is coupled to a fluorescent molecule or bound to an enzyme that can produce a colored product, or is otherwise made detectable. The light includes transmitted light. The light includes fluorescence or luminescence. The fluorescence is based on immuno-labeling of sample units of the sample to differentiate cell types based on surface antigens. The images based on the fluorescence are displayed to a clinician during a surgical procedure on the person or animal.

In general, in an aspect, a sample of a person or animal who is the subject of health care is placed at a surface of a device, the surface being associated with a dense array of light sensitive locations or light emitting locations or both.

Information at a resolution of 5 microns or smaller is derived about the sample from the device using light. A cell type is detected using antibodies or other specific binding molecules directed against surface antigens of cells of the cell type in the sample.

Implementations may include any of the following features or any two or more of them in combination. A degree of competence of an immune system of the person or animal is detected. The cell type comprises helper T lymphocytes. The cell type comprises granulocytes. The cell type comprises B lymphocytes. The cell type comprises blast cells. The cell type comprises hematopoietic cells. The cell type comprises B lymphocytes expressing kappa or lambda immunoglobulin light chains. The cell type comprises erythrocytes. The erythrocytes bear blood group A antigen. The erythrocytes bear group B antigen. The ethrocytes bear both group A antigen and group B antigen. The levels of T lymphocytes are monitored to assess appropriateness or effectiveness of therapy for AIDS. The sample comprises non-coupled marker beads.

In general, in an aspect, a sample of a person or animal who is the subject of health care is placed at a surface of a device. Information is derived about the sample at a resolution of 5 microns or smaller from the device using light, and a blood count or other cell enumeration analysis is generated from the derived information.

Implementations may include any of the following features or any two or more of them in combination. The blood count analysis includes a complete blood count (CBC) analysis. The blood count analysis includes an absolute leukocyte count or an absolute erythrocyte count. The blood count analysis is for rare or ambiguous cell types.

In general, in an aspect, a sample of a person who is the subject of health care is placed at a surface of a device, the surface being associated with a dense array of light sensitive locations or light emitting locations or both. Image information about the sample is derived from the device at a resolution of 5 microns or smaller, and a parasitic disease is diagnosed using the derived image information.

Implementations may include any of the following features or any two or more of them in combination. The sample of the person or animal includes at least one of feces, urine, sputum, blood, or tissue. The disease includes malaria. The disease includes trypanosomiasis. The disease includes leishmaniasis. The disease is diagnosed using pattern recognition. The disease is diagnosed using stains. The disease is diagnosed using fluorescence. The disease is diagnosed using antibody labeling. The disease is diagnosed using birefringence. The parasitic disease includes an intestinal parasitic diseases and the sample includes stool. The intestinal parasitic disease includes giardiasis. The intestinal parasitic disease includes amebiasis. The intestinal parasitic disease includes cryptosporidiosis and others caused by spore-forming protozoa. The intestinal parasitic disease includes balantidiasis. The intestinal parasitic disease includes diseases caused by helminths such as *Ascaris lumbricoides* (roundworm), *Trichuris trichiura* (whipworm), *Ancylostoma duodenale*, and *Necator americanus* (hookworms).

In general, in an aspect, a sample of a person is placed at a surface of a device, the surface being associated with a dense array of light sensitive locations or light emitting locations or both. Information is derived about the sample from the device at a resolution of 5 microns or smaller, and the derived information is used to perform an assay of a cell function.

Implementations may include any of the following features or any two or more of them in combination. The sample is placed and the information is derived at a point-of-care. The sample is placed and the information is derived in a research context. The cell function assay is for a blood cell or other type of cell. The cell function includes a neutrophil activation and the information is derived using myeloperoxidase staining or scattering of oblique or dark field illumination. The cell function includes activation of lymphocytes or platelets detected using fluorescence detection of calcium transients or increased expression of surface antigens such as CD69. The cell function includes platelet activation detected based on increased size of platelet clumps as revealed by fluorescent-labeled or bead-labeled anti-platelet antibody.

In general, in an aspect, a sample of a person or animal who is the subject of health care is placed at a surface of a device, the surface being associated with a dense array of light sensitive locations or light emitting locations or both. Information about the sample is derived from the device at a resolution of 5 microns or smaller. Cytogenetics is performed using the derived information.

Implementations may include any of the following features or any two or more of them in combination. The information is derived using fluorescence in situ hybridization or hybridization to polynucleotide microarrays, and the cytogenetics includes screening for genetic abnormalities or alleles of diagnostic or risk-factor utility.

In general, in an aspect, a sample of a person or animal who is the subject of health care is placed at a surface of a device. Information is derived about the sample from the device. Massively parallel biochemical analysis of the sample is performed.

Implementations may include any of the following features or any two or more of them in combination. The sample includes serum or plasma. The sample includes whole blood. The sample includes cerebrospinal fluid. The analysis is based on fluorescence involving ligands that include one or more of antibodies, aptamers, peptide toxins, or polynucleotides. The different antibodies, aptamers, enzymes or peptide toxins, plus fluorescent ligands are spotted on respective light sensitive locations of the device. The information is derived using fluorescence in situ hybridization or hybridization to polynucleotide microarrays, and the cytogenetics include screening for genetic abnormalities or alleles of diagnostic or risk-factor utility. The pH or ions or metabolites or proteins are detected at respective light sensitive locations of the device using bound fluorescent pH or ion sensors or metabolite sensors or protein sensors. The metabolites include one or more of glucose, cholesterol, estrogens, testosterone, creatinine, and bilirubin. The information is derived using sensors for $Ca^{2+}$, $Mg^{2+}$, $Na^+$, $K^+$, $H^+$, or $Cl^-$.

In general, in an aspect, there is an endoscopic apparatus that includes an endoscope device, the surface being associated with a dense array of light sensitive locations or light emitting locations or both. There is an imaging device on the endoscope. The imaging device includes a surface to be placed, by manipulation of the endoscope, on internal tissue of a person or animal who is the subject of health care. There are electronics to cause image information about the sample to be captured at a resolution of 5 microns or smaller by the device using light at the internal tissue and to be provided for use in diagnostics with respect to the person or animal. The imaging device includes a small-area sensor at a tip of the endoscope.

In general, in an aspect, a non-blood fluid, cellular, particulate, or other biochemical sample is placed at a surface of a device, the surface being associated with a dense array of light sensitive locations or light emitting locations or both. Information is derived about the sample from the device at a resolution of 5 microns or smaller. The sample is analyzed based on the derived information.

Implementations may include any of the following features or any two or more of them in combination. The sample includes urine. The sample includes cerebrospinal fluid. The sample includes feces. The sample includes peritoneal fluid. The sample includes bone marrow aspirate. The sample includes wastewater, drinking water, or swimming water.

In general, in an aspect, a disposable imager includes a device configured to enable a sample to be placed at a surface of the device, the surface being associated with a dense array of light sensitive locations or light emitting locations or both. There are electronics to cause information about the sample to be captured at a resolution of 5 microns or smaller by the device using light. There is a mechanism to contain the sample at the surface of the device. A coupler is to connect and disconnect the disposable imager with a processing unit to process the captured information. The coupler enables the disposable imager to be removed from the processing unit and replaced by another disposable imager.

Implementations may include any of the following features or any two or more of them in combination. There is a processing unit. The processing unit includes at least one of a controller, an illuminator, and a display. The processing unit with the disposable imager is self-contained. The processing unit with the disposable imager includes an accessory to a host device. The host device includes a phone, a tablet, a laptop, a workstation or other computing device. The mechanism to contain the sample includes a chamber. The sample is applied to the surface of the device, the surface being associated with a dense array of light sensitive locations or light emitting locations or both. Information about the sample is captured and sent to the processing unit for processing. A mechanism is closed to contain the sample, after applying the sample to the surface. The sample is applied from a pipette. The sample is applied from a pipette to a loading area of the sample-containing mechanism. The applying of the sample includes allowing the sample to spread by capillarity across the surface. The sample is applied to the surface of the device at one location of the surface and the capillarity is inhibited by surface tension at another location of the surface. An illuminator is placed into a position to illuminate the sample. The disposable imager is removed and discarded or refurbished.

In general, in an aspect, a processing unit is configured to be coupled to a coupler of a disposable imager. The disposable imager includes a device configured to enable a sample to be placed at a surface of the device, the surface being associated with a dense array of light sensitive locations or light emitting locations or both. There are electronics to cause information about the sample to be captured at a resolution of 5 microns or smaller by the device using light. A mechanism is to contain the sample at the surface of the device. A coupler is to connect and disconnect the disposable imager with the processing unit to process the captured information. The coupler enables the disposable imager to be removed from the processing unit and replaced by another disposable imager.

In general, in an aspect, a chamber for a disposable imager includes a device having a surface at which a liquid sample is to be placed, the surface being associated with a dense array of light sensitive locations or light emitting locations or both. The chamber is attached to and configured to define a sample space at the surface of the disposable imager. The sample space has a predefined height above the surface. The chamber has a filling port at which the sample is to be delivered and that defines a flow path from the filling port to the sample space. The height of the sample space is small enough to enable capillarity to cause the fluid to spread across the sample space. The chamber is injection molded.

In general, in an aspect, a portion of a sample is associated with a surface. The sample contains units each of which may emit or reflect light toward the surface depending on a characteristic of the unit. The surface is associated with a dense array of light sensitive locations or light emitting locations or both. The light is caused to be emitted or reflected from each of the units. The light is emitted or reflected by the units at light sensitive locations on the surface. Each location is sensitive to light emitted or reflected by one or more but fewer than all of the units in the sample. The characteristics of at least some of the units are determined based on responses of the light sensitive locations to the light emitted or reflected from the units.

Implementations may include any of the following features or any two or more of them in combination. The light is emitted by fluorescence of the units. The light is emitted by luminescence of the units. The light is caused to be emitted by plasmon excitation.

In general, in an aspect, a sample is associated with a surface of a device that includes light sensitive locations or light source locations or both, the surface being associated with a dense array of light sensitive locations or light emitting locations or both. Force is applied to units contained in the sample, and information is derived at a resolution of 5 microns or smaller about the units while the force is being applied.

Implementations may include any of the following features or any two or more of them in combination. The information derived about the units contained in the ample includes information about at least one of the following: buoyant density, mass, movement, or zeta potential. The force applied to the units includes at least one of acoustic force or an electric field.

In general, in an aspect, a bio-molecular sample is associated with a surface of an imaging device. The imaging device includes one or both of light sensitive locations that are separately sensitive to light received at the surface with respect to the portion of the sample or light source locations that are separately able to deliver light with respect to the portion of the sample. The sample is biochemically analyzed based on information derived from the imaging device using light.

Implementations may include any of the following features or any two or more of them in combination. The sample is associated with the surface by incorporating the sample in a gel. The sample includes proteins or nucleic acids. The biochemical analysis includes determining a molecular mass based on migration of units of the sample in response to an electric field. The biochemical analysis includes at least one of gel electrophoresis or isoelectric focusing. The bio-molecular sample includes cells that have bound DNA-binding fluorescent dyes. A ploidy of the cells is estimated. Actively dividing cells are visualized. The bio-molecular sample includes cells and the method includes monitoring cell dynamics including at least one of locomotion, chemotaxis, contractility, and shape change.

In general, in an aspect, a tip of a pipette is placed into a sample, a volume of the sample is drawn into the pipette.

Implementations may include any of the following features or any two or more of them in combination. The drawing of a volume includes manipulating a spring-loaded piston. The discharging includes adding supplemental fluids to a sample being imaged. The supplemental fluids include stains, contrast agents, anticoagulants, microbeads, or other materials and combinations of them.

In general, and in an aspect, an apparatus includes two or more capillaries. A first one of the capillaries contains a plug at a first distance from an outlet end of the first capillary. The first capillary contains a first predetermined volume of fluid. The first predetermined volume is determined by an inner diameter of the capillary and the first distance. A second one of the capillaries contains a plug at a second distance from an outlet end of the second capillary. The second capillary contains a second predetermined volume to receive a corresponding second predetermined volume of blood to be drawn into the second capillary through the outlet end by capillary action. There is a mechanism to push the first predetermined volume of fluid and the second predetermined volume of blood out of the first capillary and the second capillary at the same time.

Implementations may include any of the following features or any two or more of them in combination. The two capillaries are of the same length. The mechanism includes a manually operated plunger. A flexible hydrophobic polymeric sleeve contains the two capillaries. The first predetermined volume and the second predetermined volume are different. The first predetermined volume and the second predetermined volume are the same. One or the other of both of the plugs are hydrophobic. One or the other of both of the plugs are gas permeable.

There is a mechanism for generating and displaying to a physician or other user composite images obtained with by operation of the imaging device the devices.

In general, in an aspect, a sample is place at a surface of a device, the surface being associated with a dense array of light sensitive array of light sensitive locations or light emitting locations or both. Image information about the sample is derived from the device at a high spatial resolution using light. The sample is inspecting using a scanning probe microscope, and the inspection by the scanning probe microscope is aided by the information derived from the imaging device. The positioning of the scanning probe relative to the sample may be aided by the information derived from the imaging device.

Among the advantages of these and other aspects, features, and implementations are one or more of the following. Lensless microscopes, and devices incorporating them, can be very small, lightweight and inexpensive. Requiring no moving parts, alignment or adjustment, they can be insensitive to vibration or temperature changes, and very easy to use even by unskilled operators with minimal training. By virtue of their small size and mass, they can be very portable, and can be operated in small, confined, or otherwise inaccessible places, or incorporated in other apparatus or production lines.

These and other aspects, features, and implementations, and combinations of them, can be expressed as methods, apparatus, systems, components, means and steps for performing functions, program products, business methods, and in other ways.

These and other aspects, features, and implementations will become apparent from the following description and from the claims.

DESCRIPTION

FIGS. 17, 18, 19, and 20 are top, side section, side section, and top views of elements useful to detect and use light representative of a sample.

Figure 23:
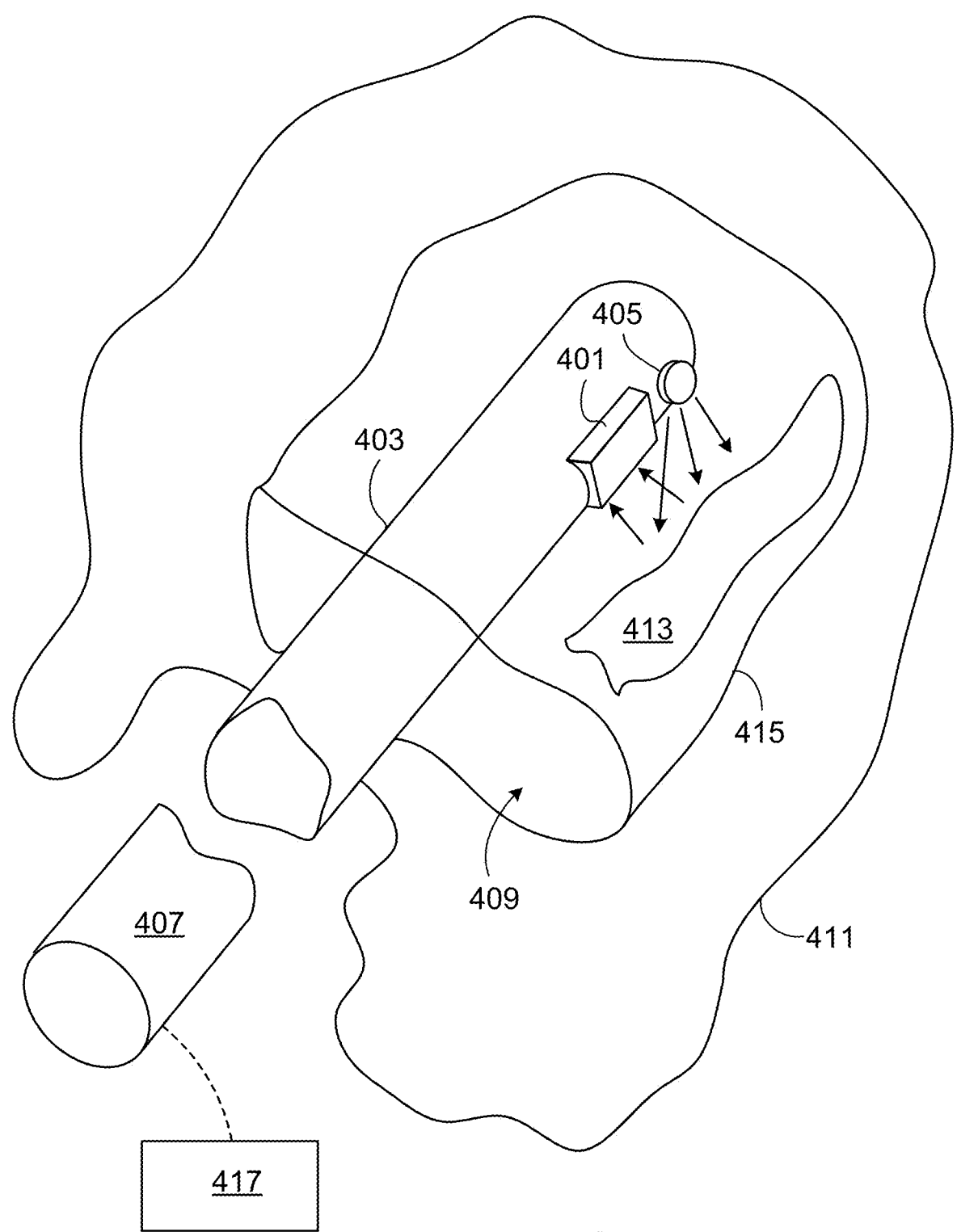

FIG. 23 is a schematic perspective view of a tool to detect and use light representative of a sample within a closed space.

Figure 24:
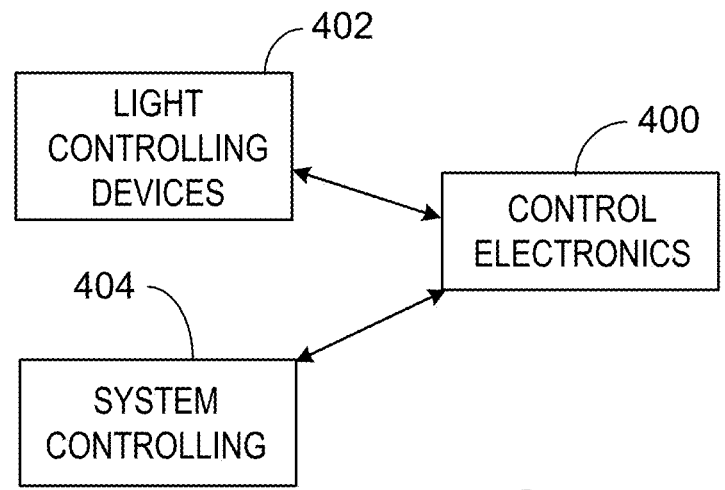
Figure 36:
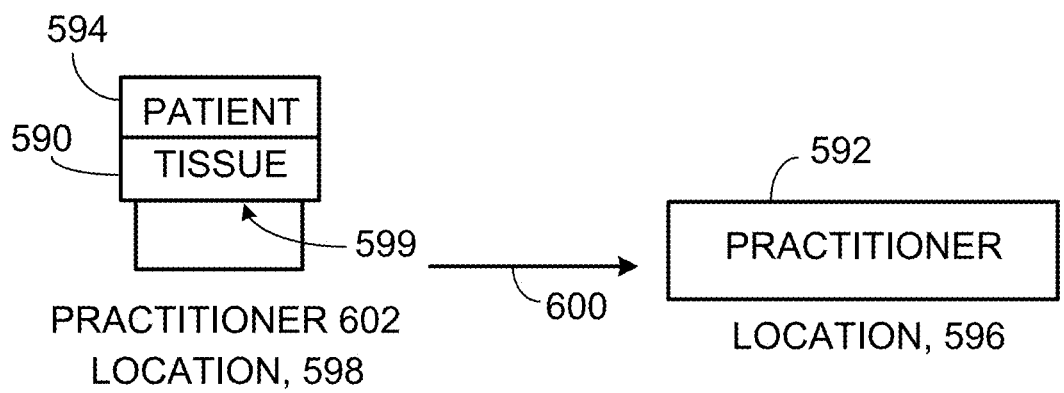

FIGS. 24 and 36 are block diagrams.

Figure 32:
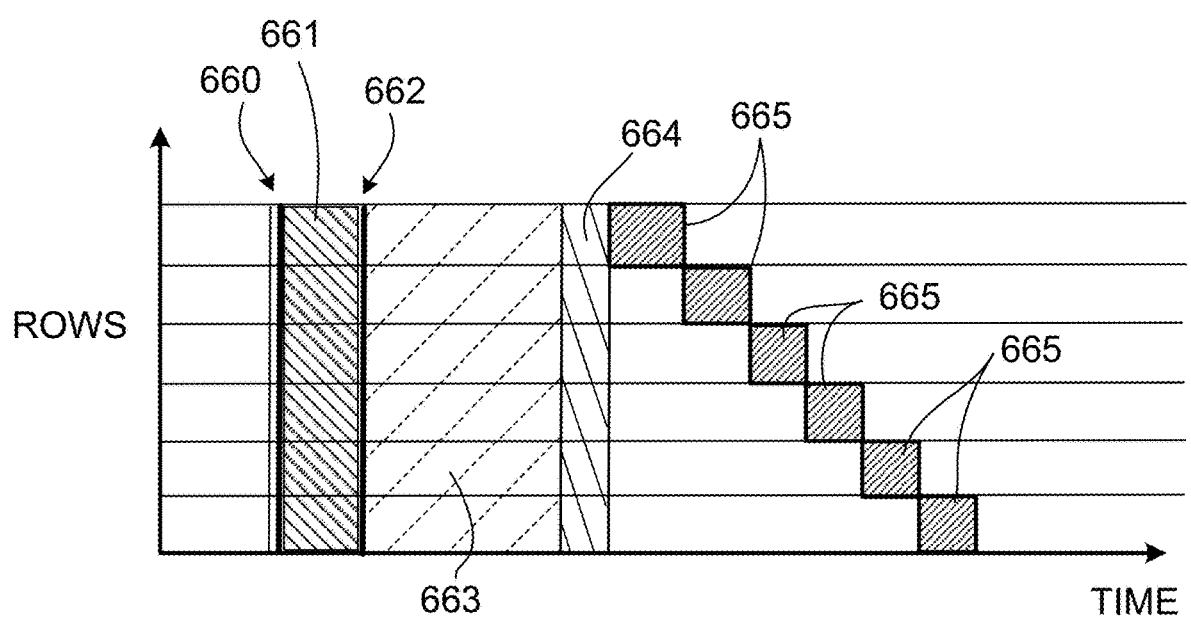

FIG. 32 is a timing diagram.

Figure 33:
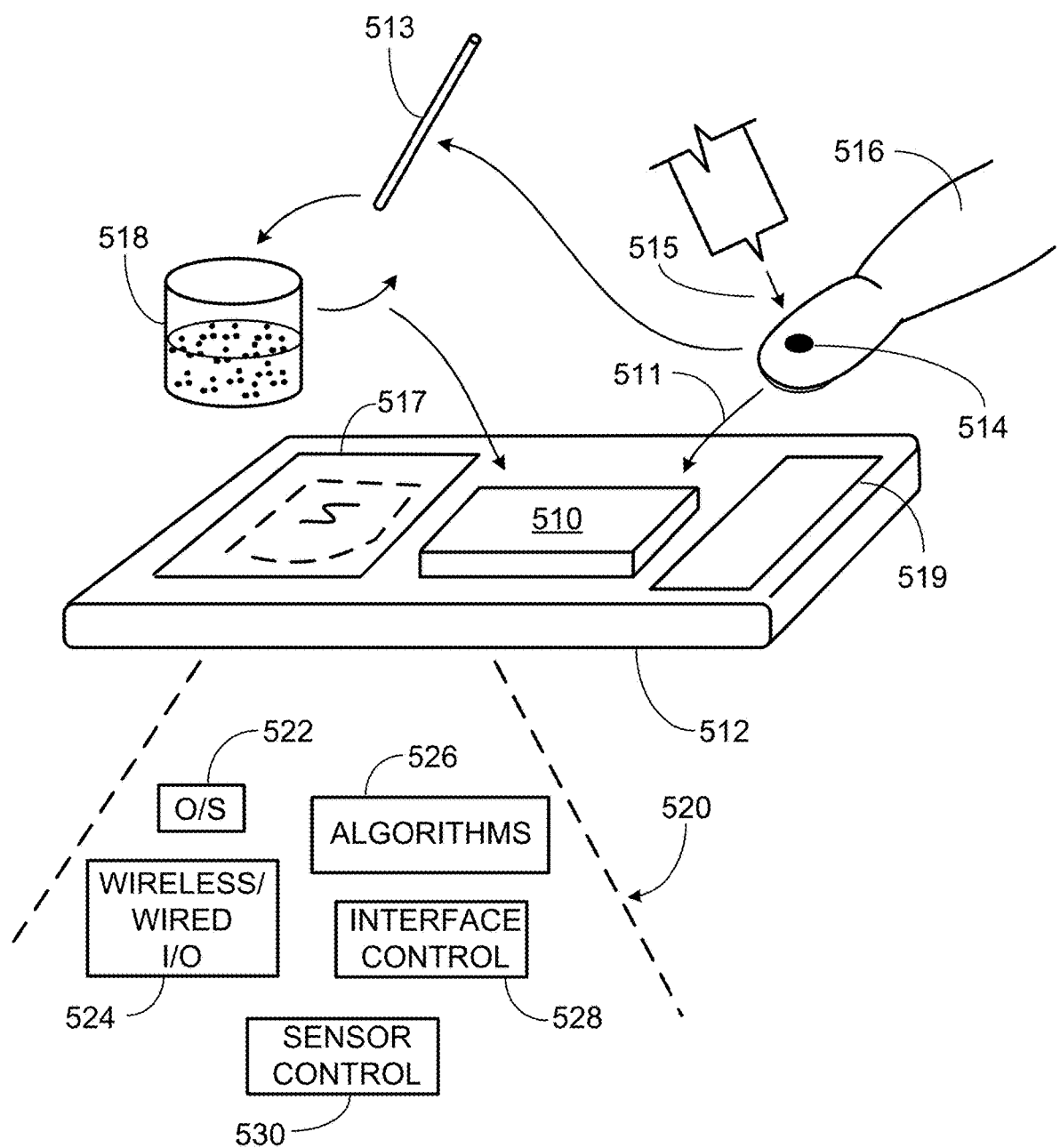

FIG. 33 is a schematic perspective view of a blood count system.

Figure 34:
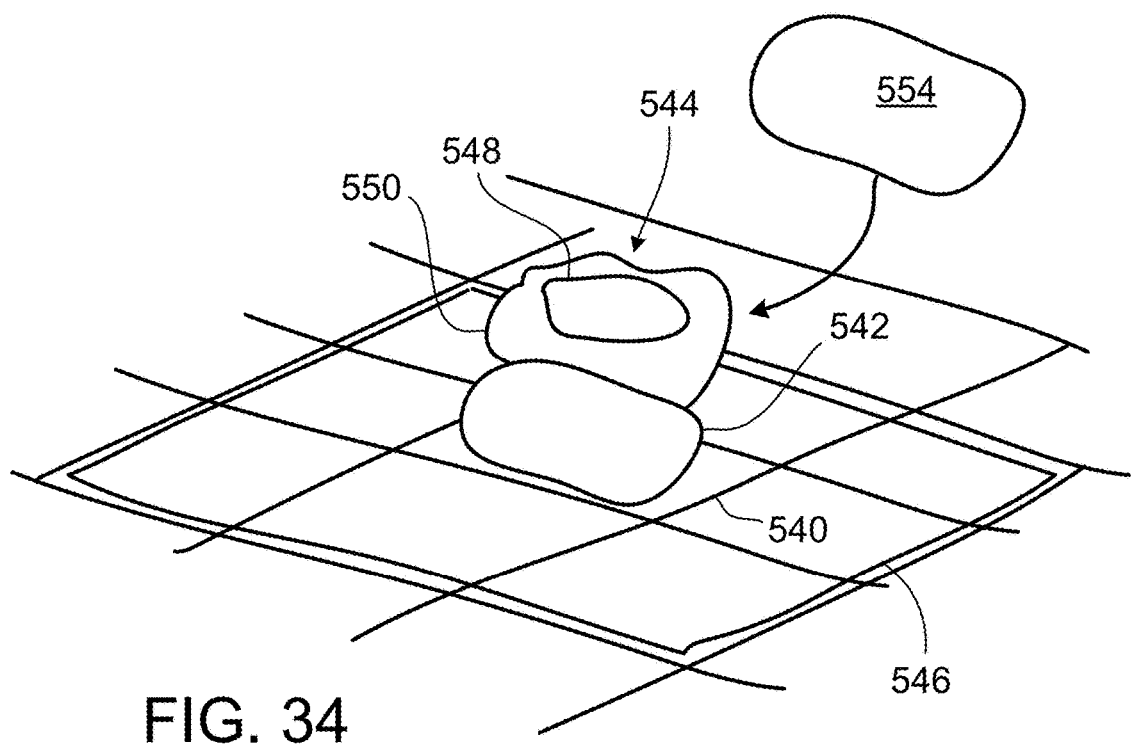

FIG. 34 is a schematic perspective view of an operating mode for detecting and using light representative of a sample.

Figure 35:
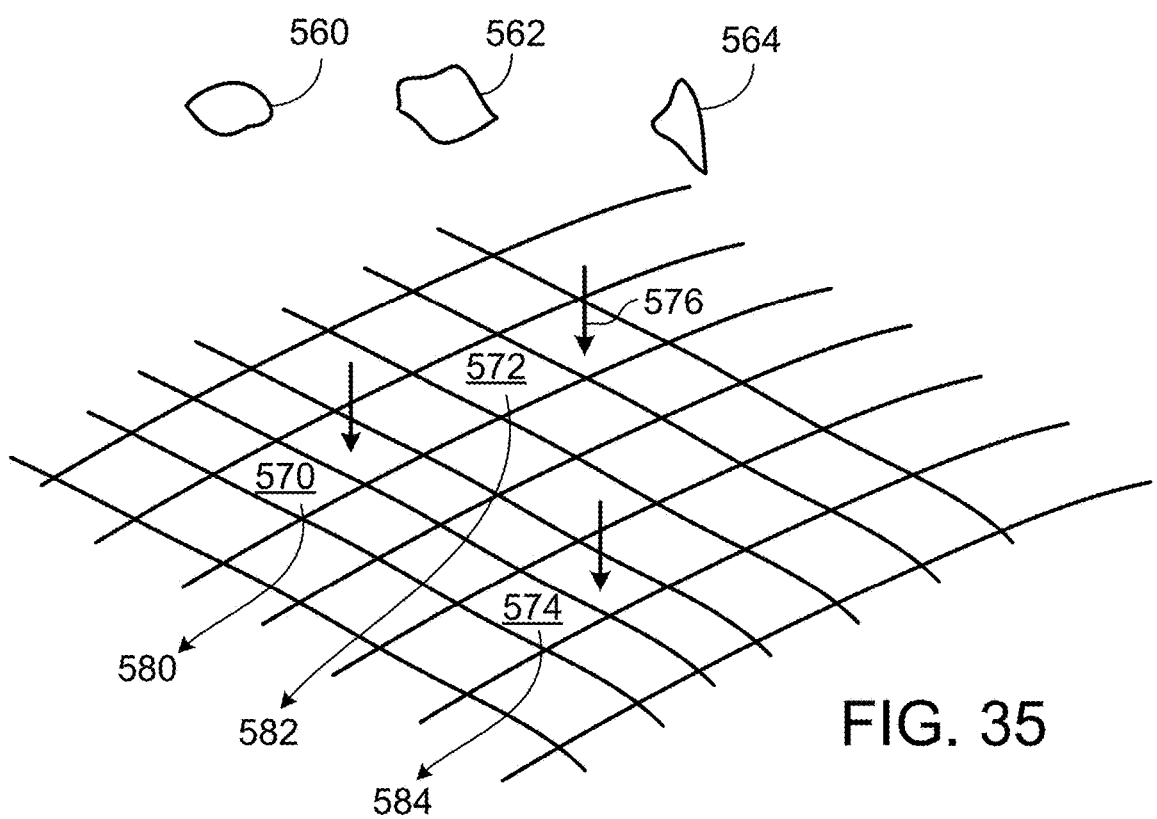

FIG. 35 is a schematic view of components to detect and use light representative of a sample.

Figure 37:
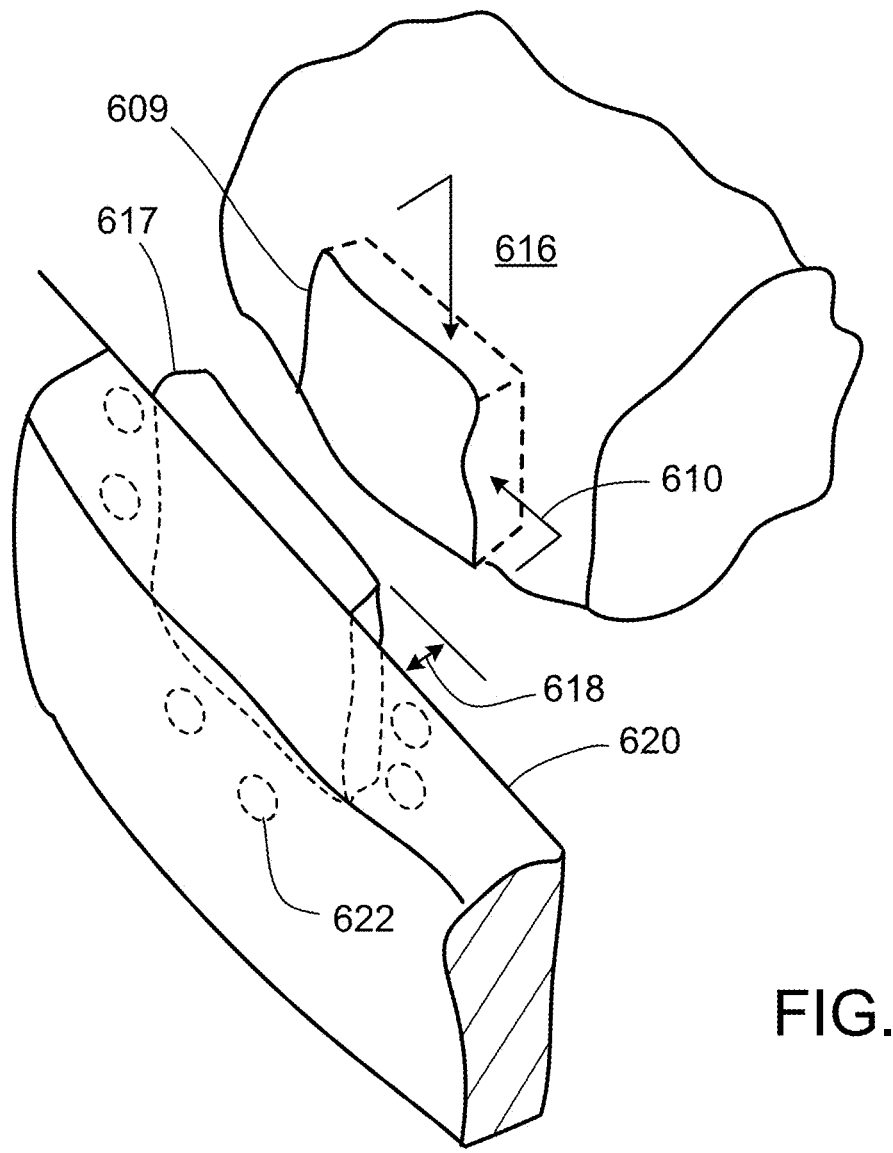

FIG. 37 is a schematic perspective view of elements to detect and use light representative of a sample of tissue in situ.

Figure 39:
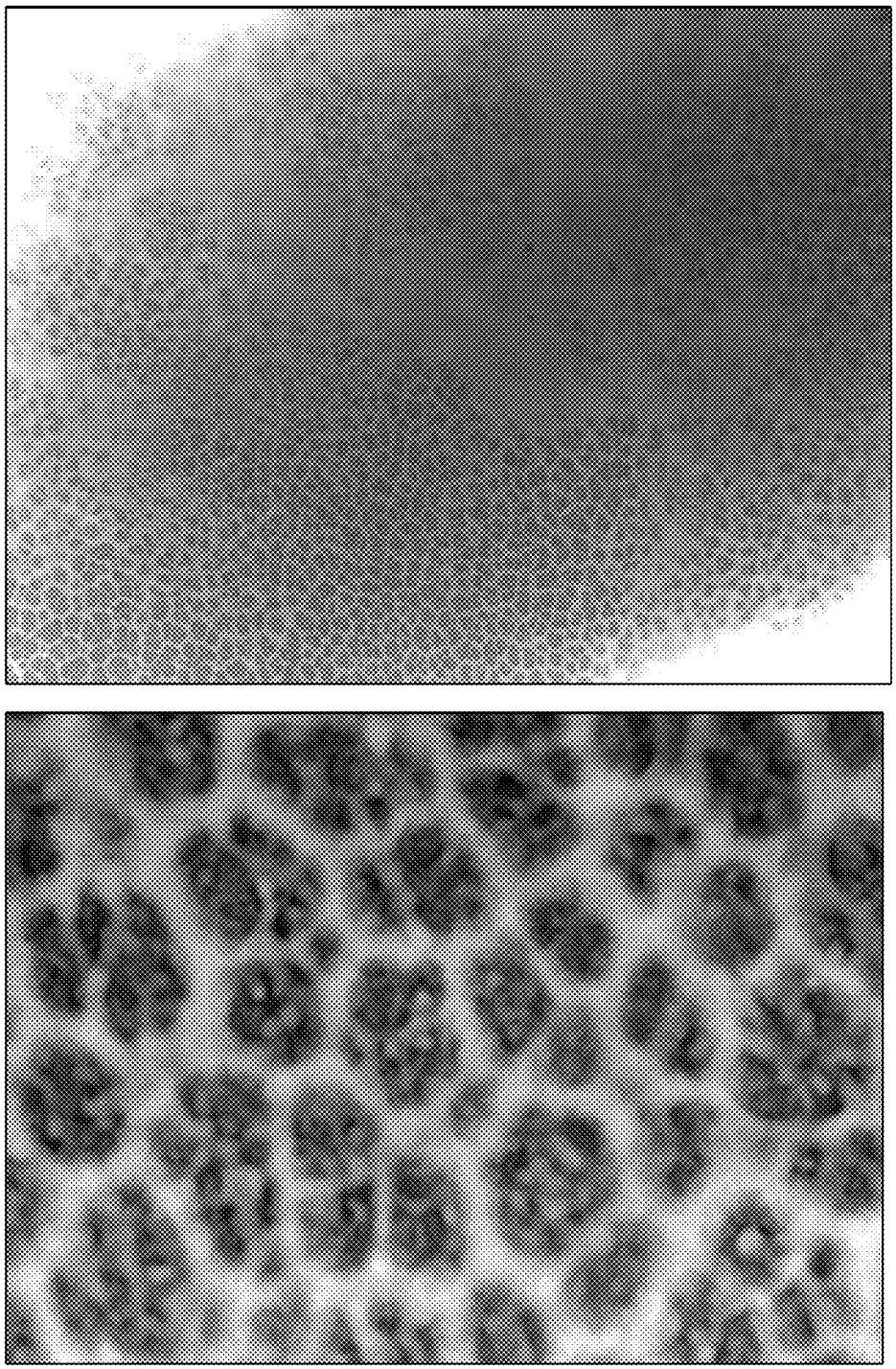

FIG. 39 is two images of a lung with collapsed alveoli.

Figure 42:
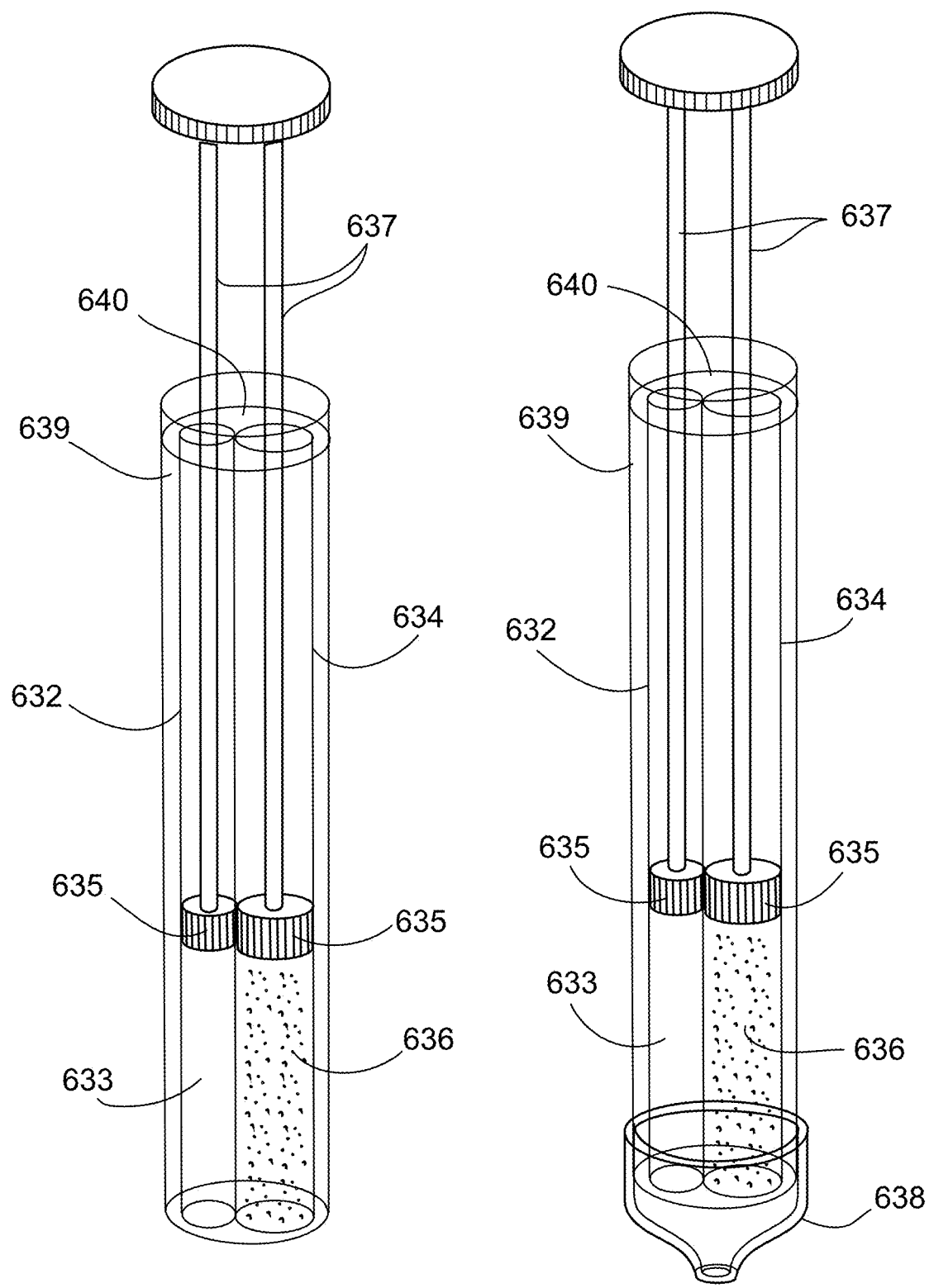

FIG. 42 is a schematic view of a pipette.

Figure 43:
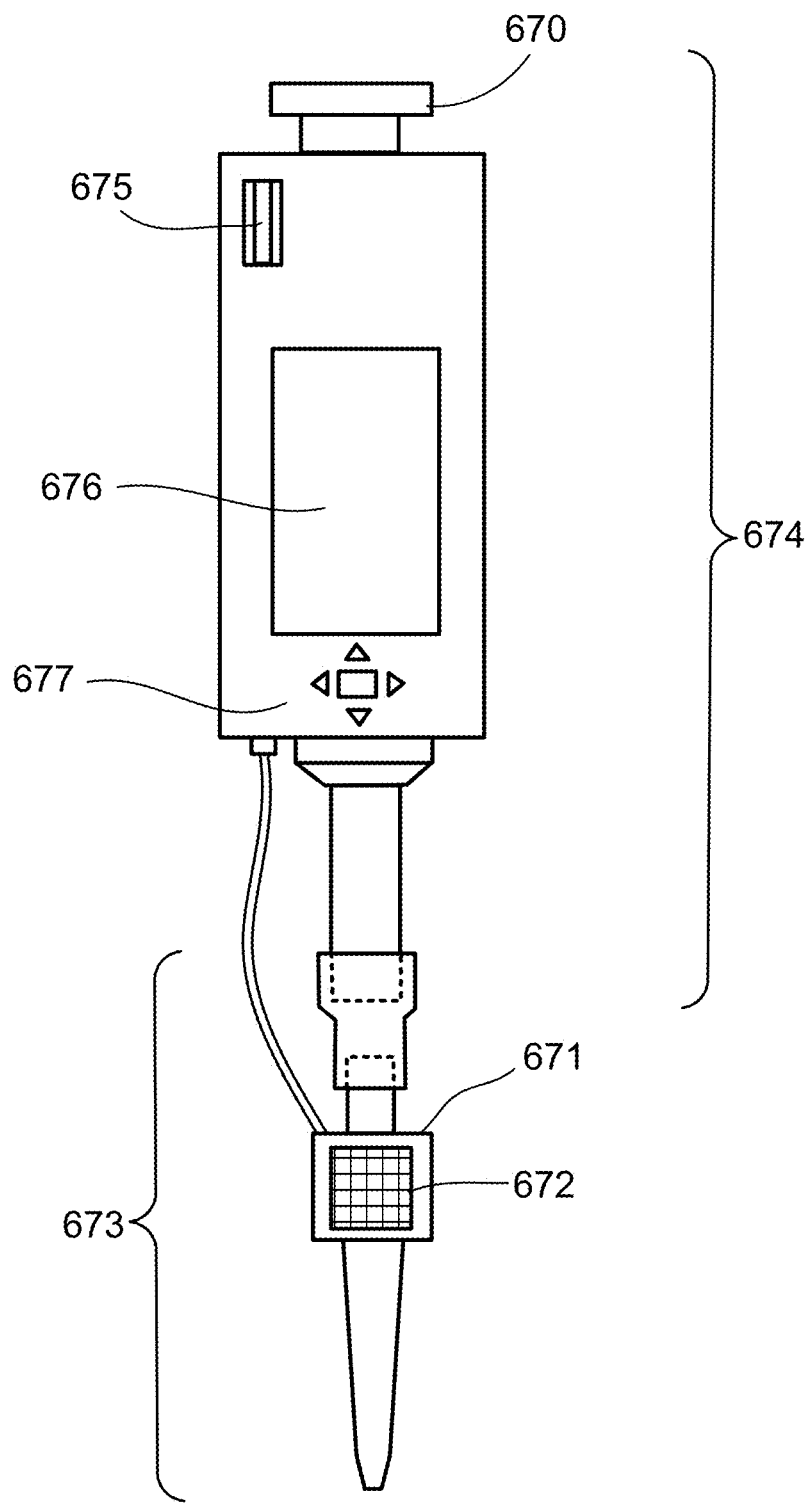

FIG. 43 is a side view of a pipette and sensor.

Figure 44:
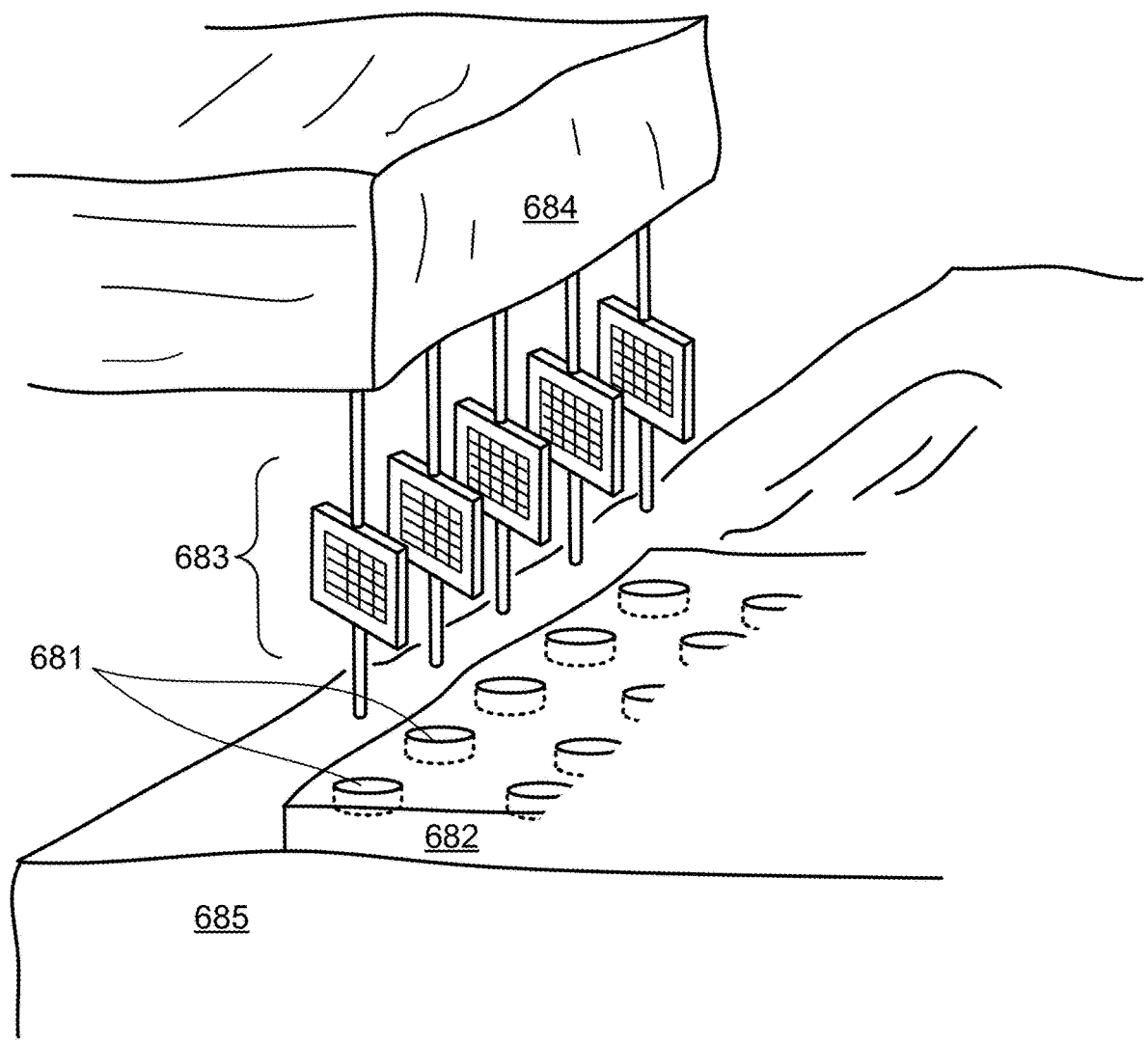

FIG. 44 is a perspective view of ganged pipettes with sensors.

Figure 48:
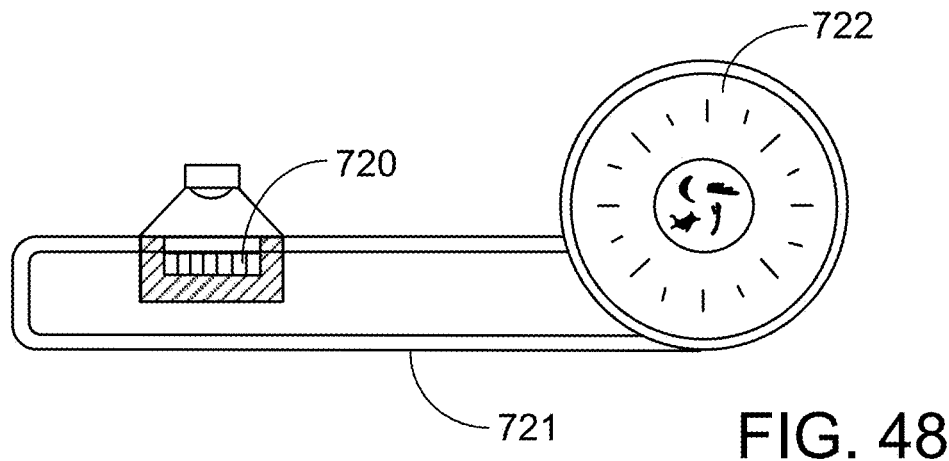

FIG. 48 is a schematic view of an aircraft application.

Figure 49:
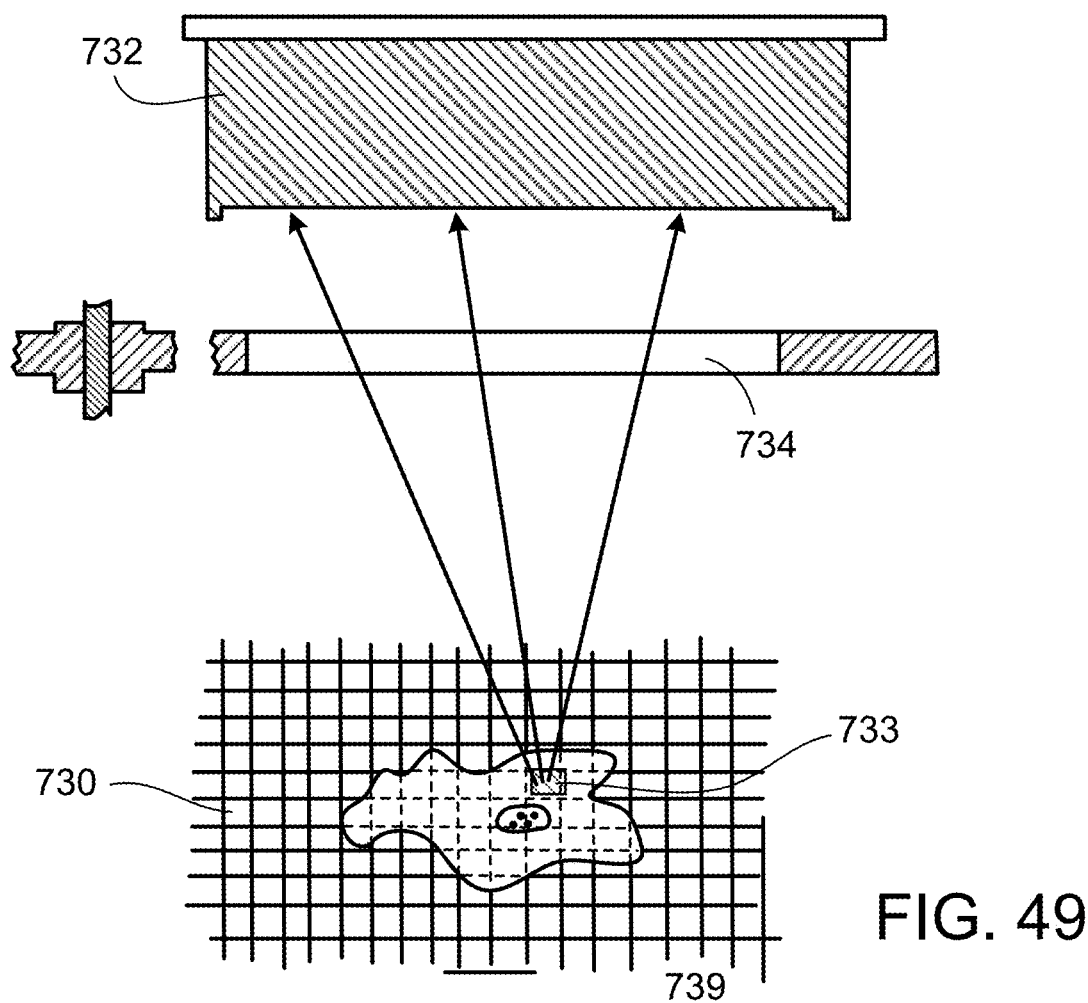

FIG. 49 is a schematic perspective view of a dense array of small light sources.

Figure 50:
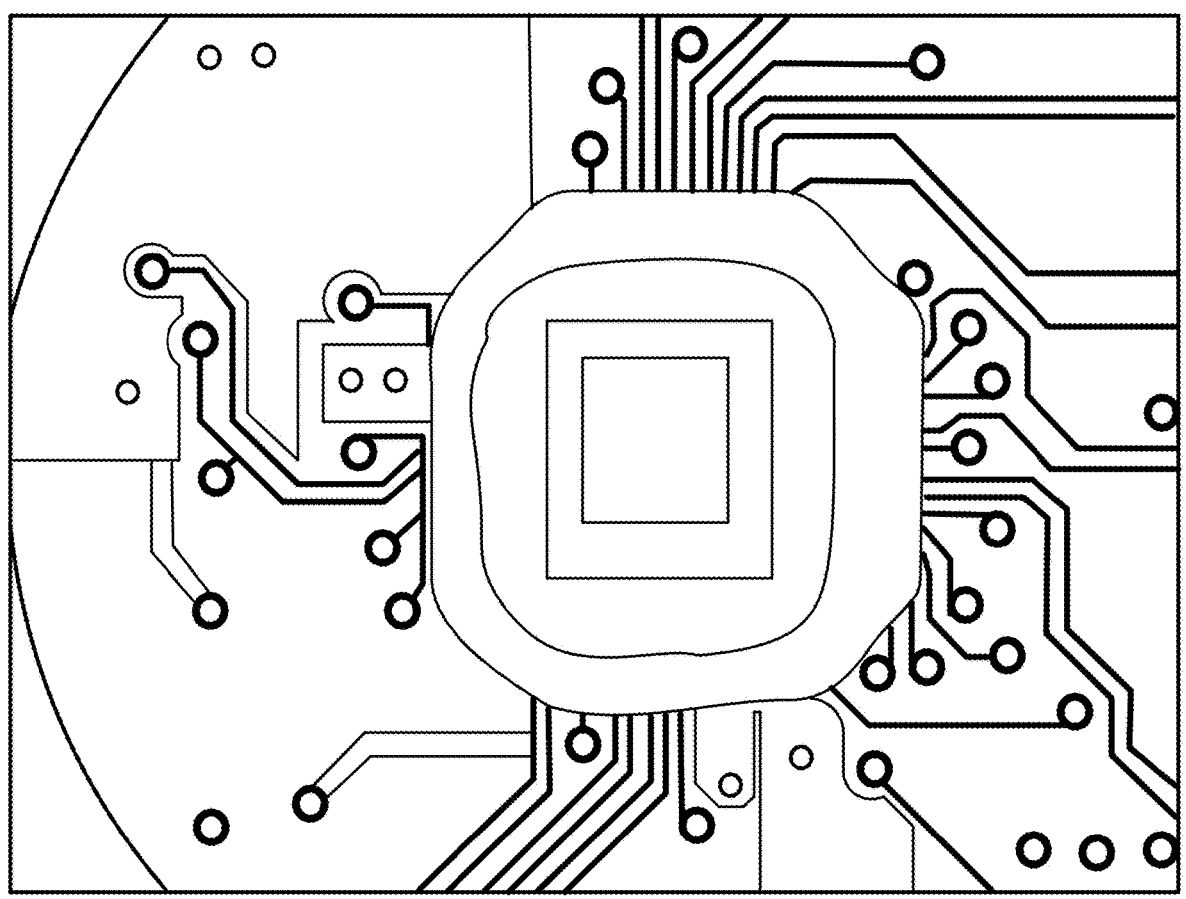

FIG. 50 is a top view of a sensor and an encapsulation element.

Figure 51:
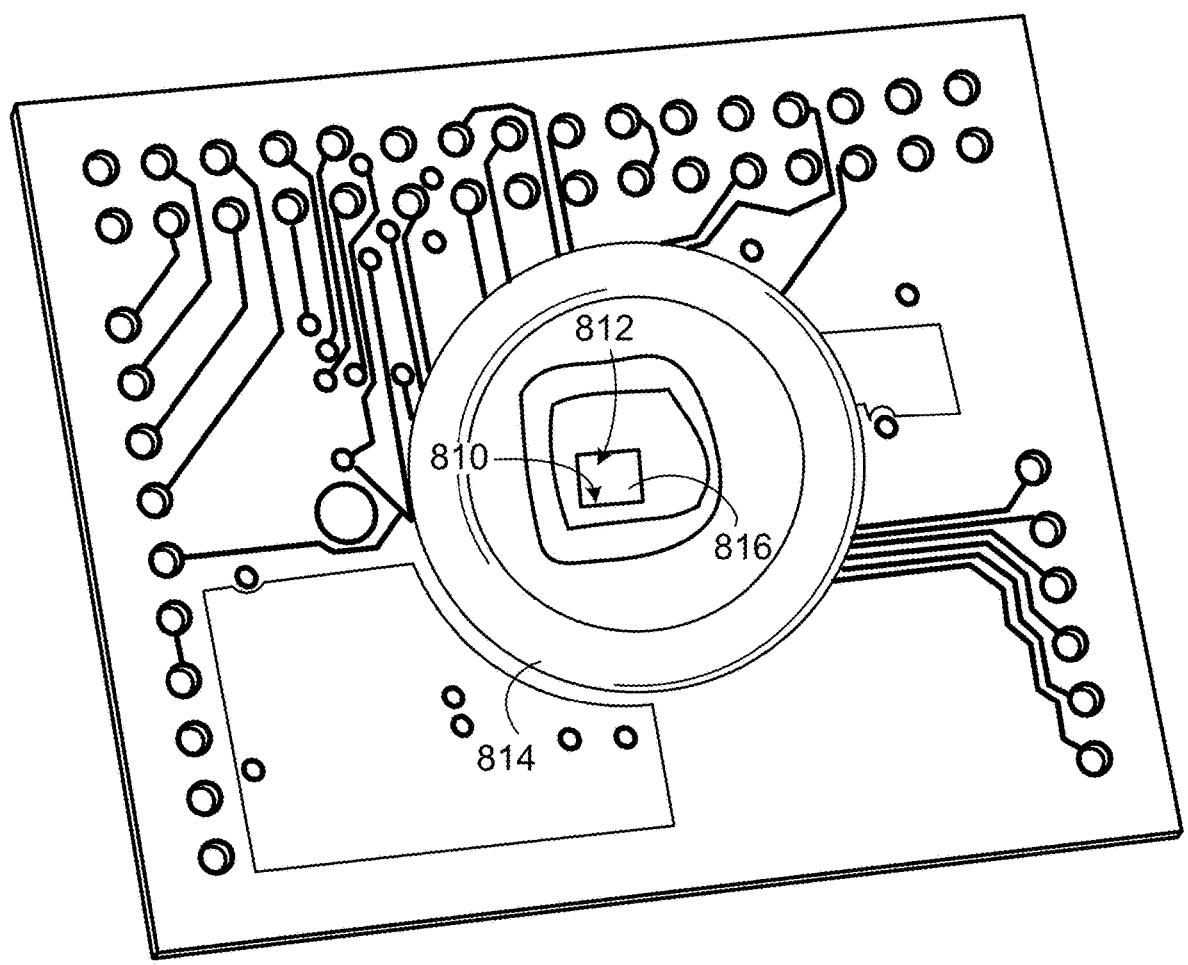
Figure 52:
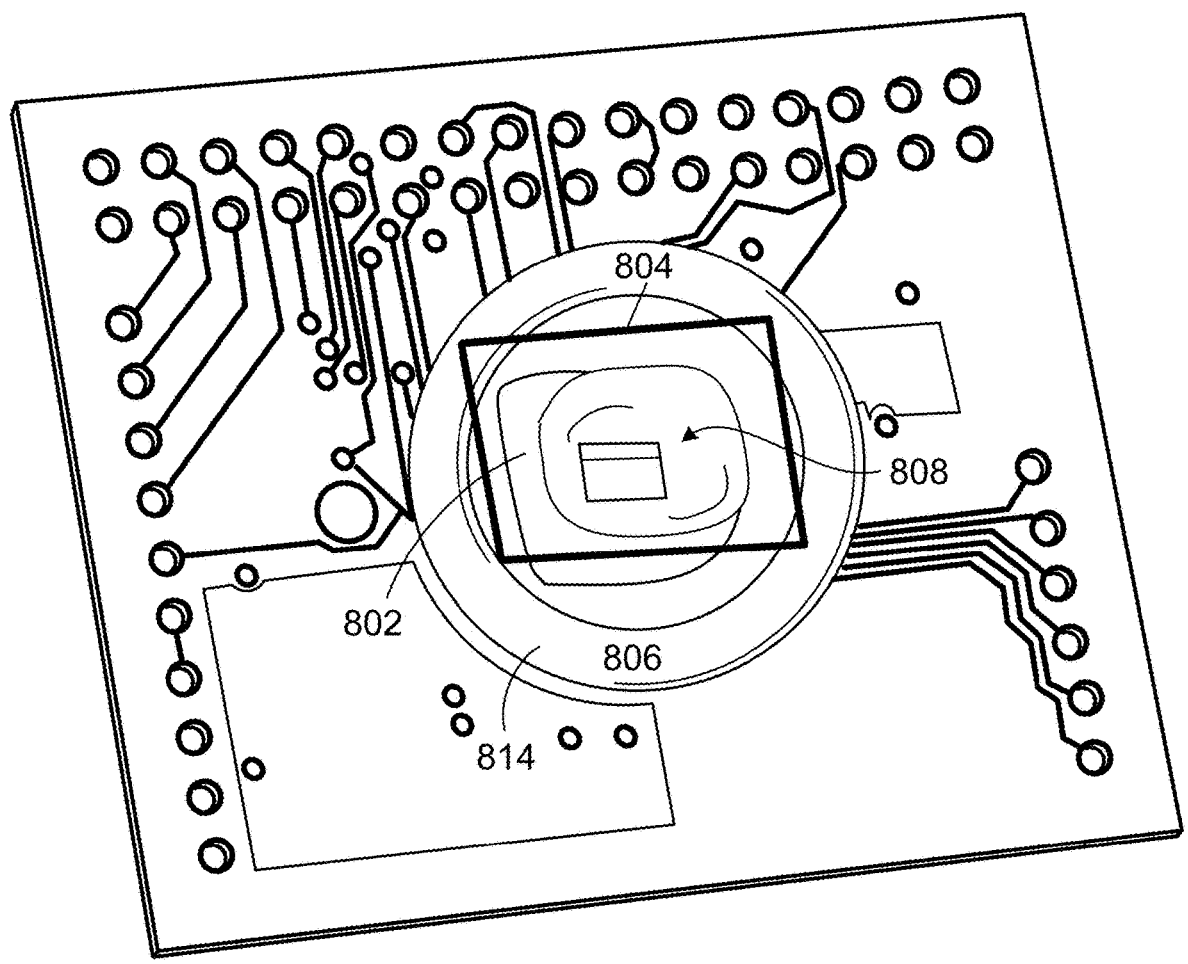

FIGS. 51 and 52 are perspective views of a sensor and an encapsulation element, without and with a lid respectively.

Figure 53:
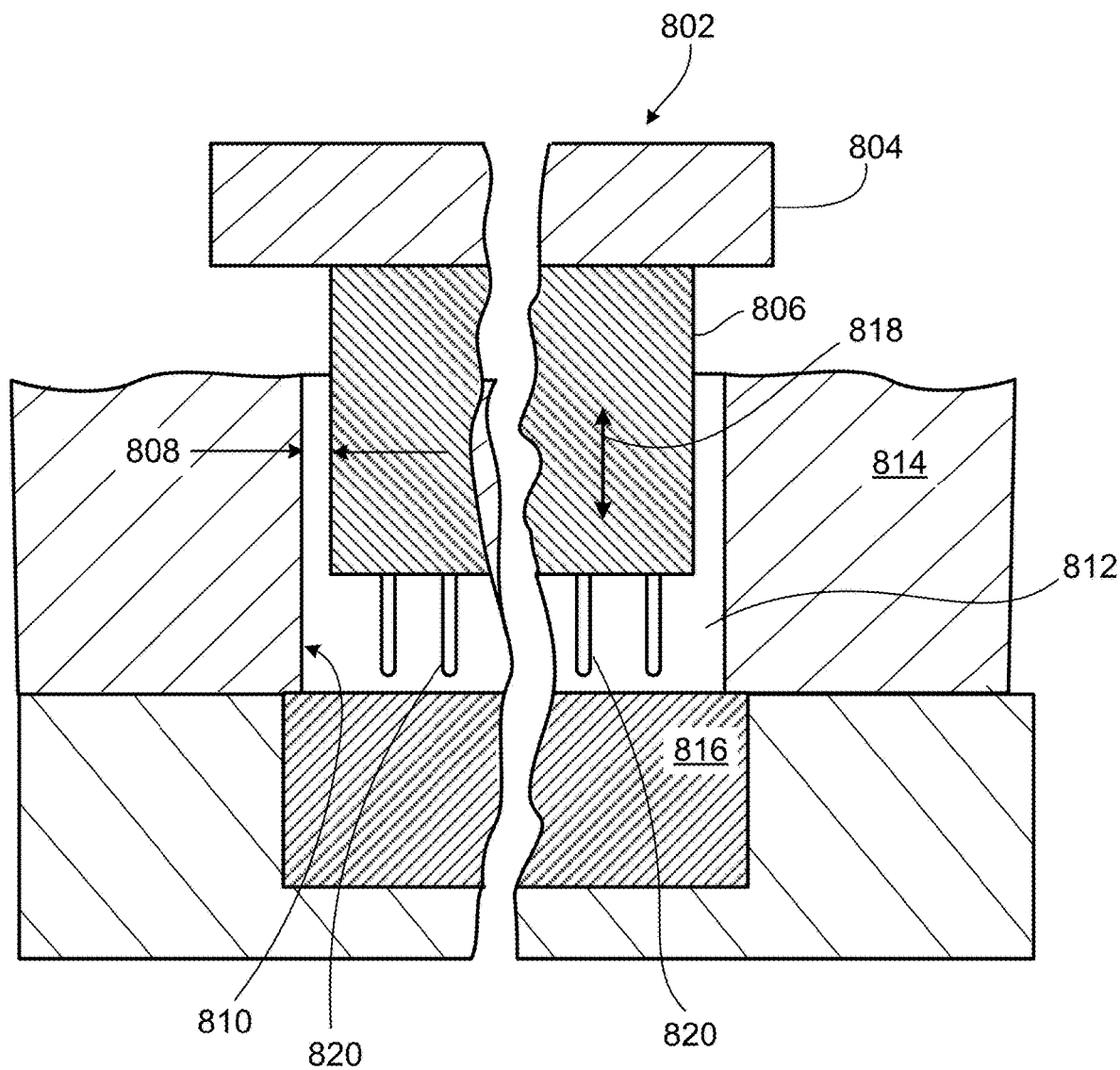

FIG. 53 is a sectional broken-apart side view of an encapsulation element and a lid.

Figure 54:
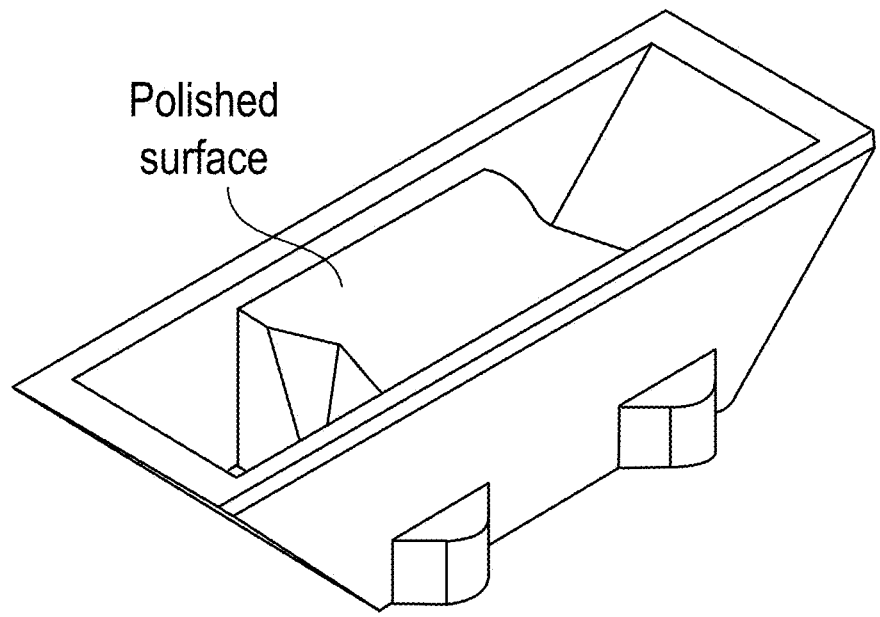
Figure 55:
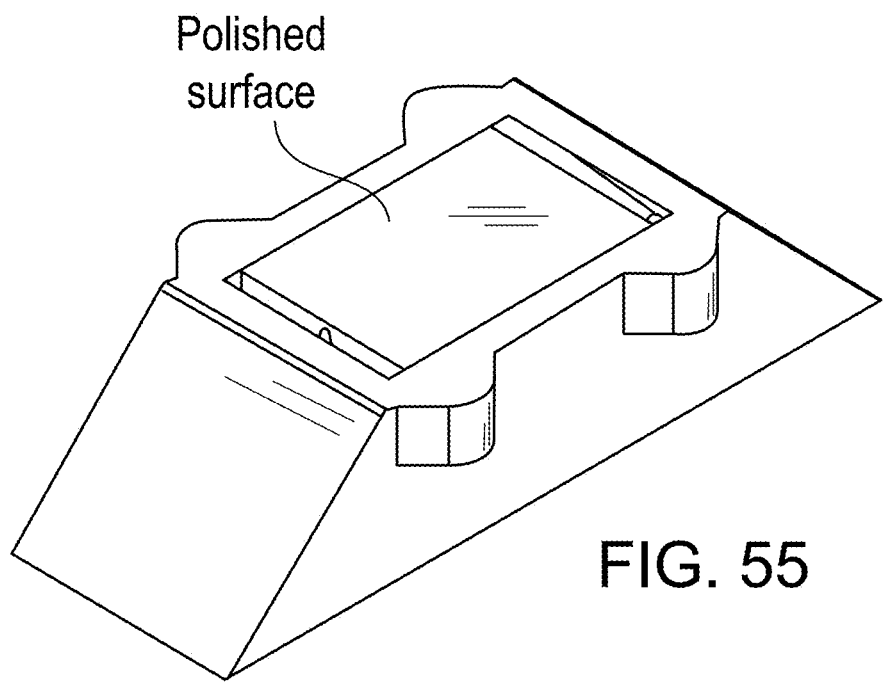

FIGS. 54 and 55 are top and bottom perspective views of a lid.

Figure 56:
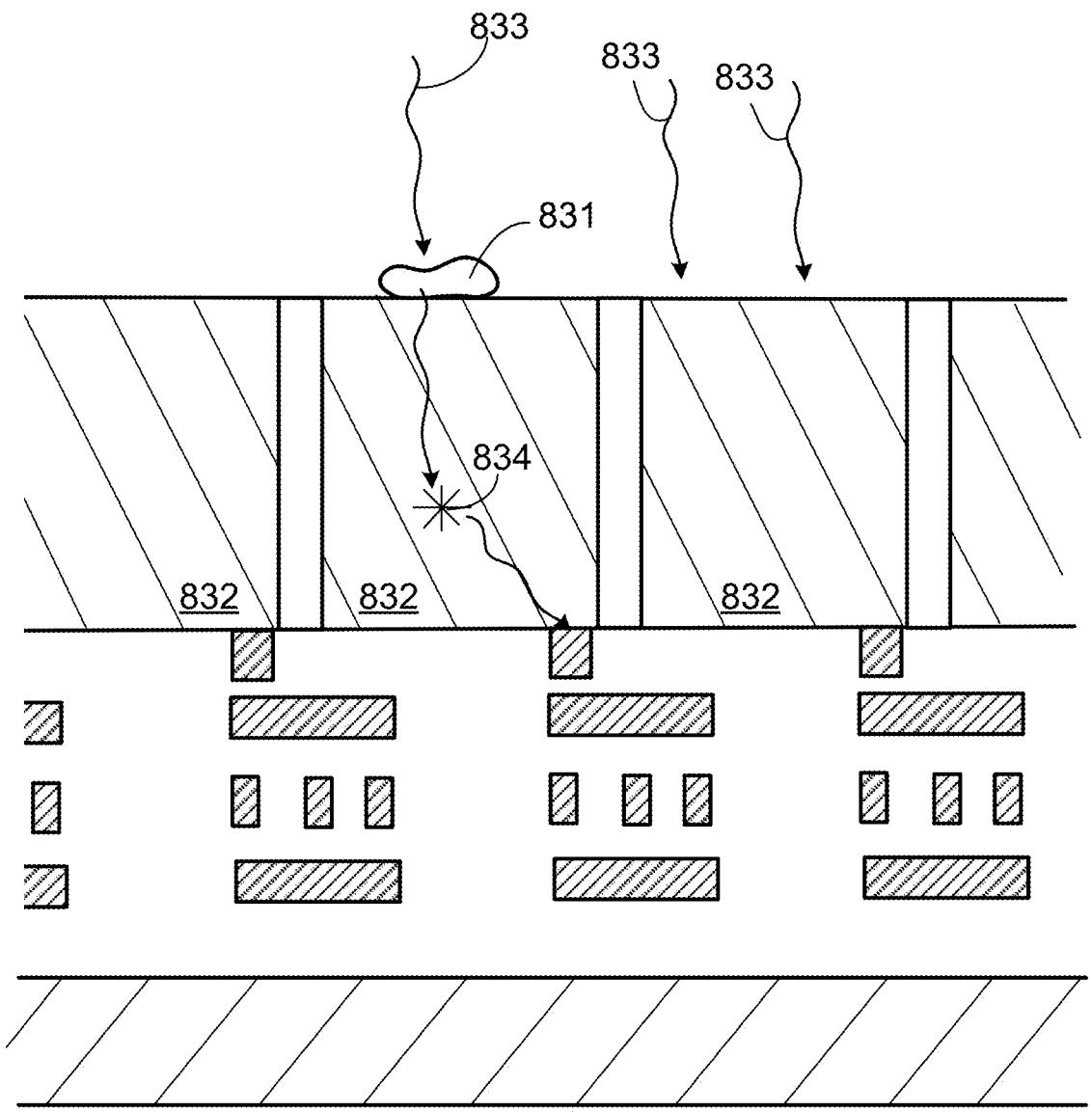

FIG. 56 is a sectional side view of a back-illuminated image sensor.

Figure 57:
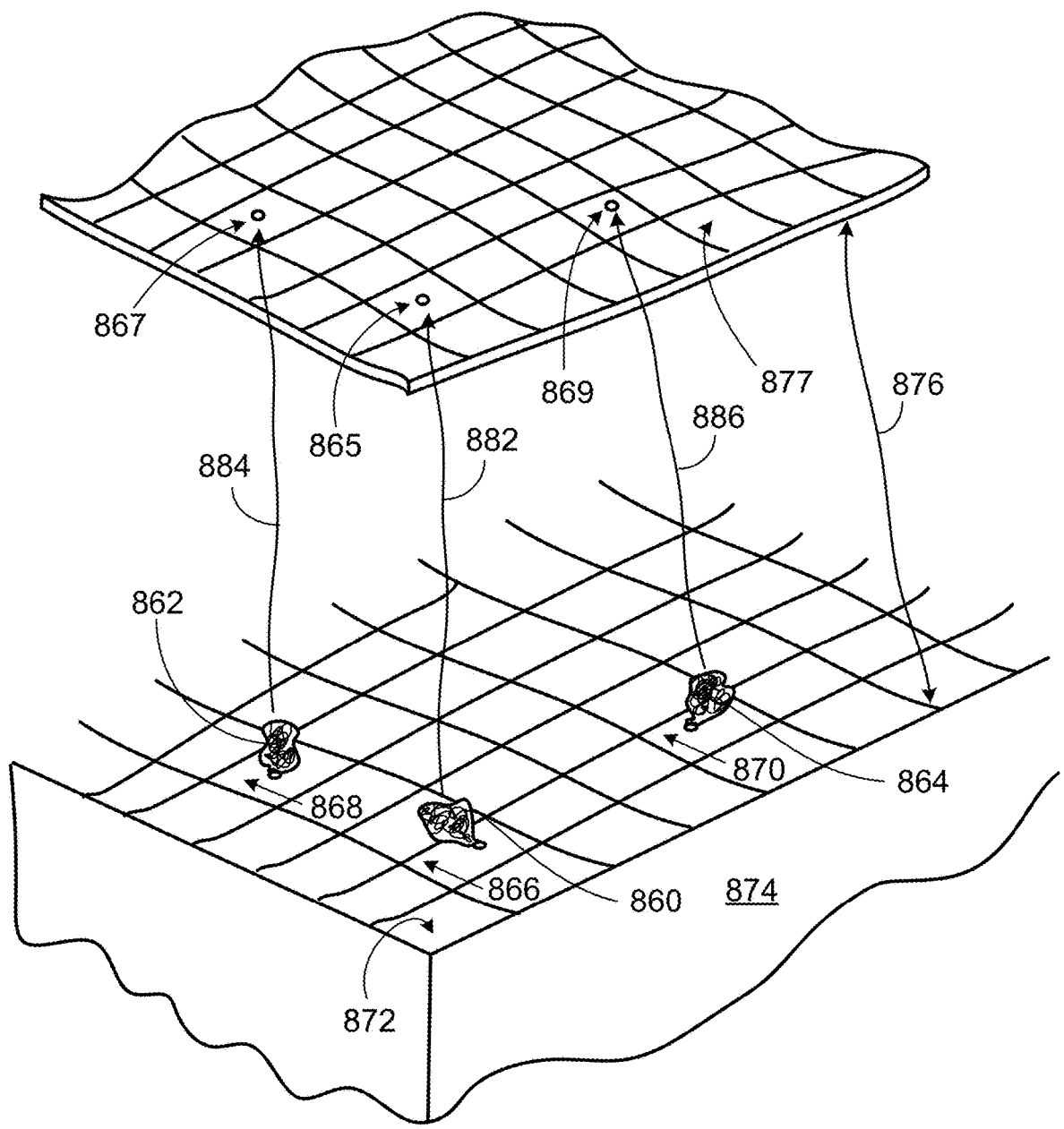

FIG. 57 is a schematic perspective view of a lid and a sensor surface.

Figure 59:
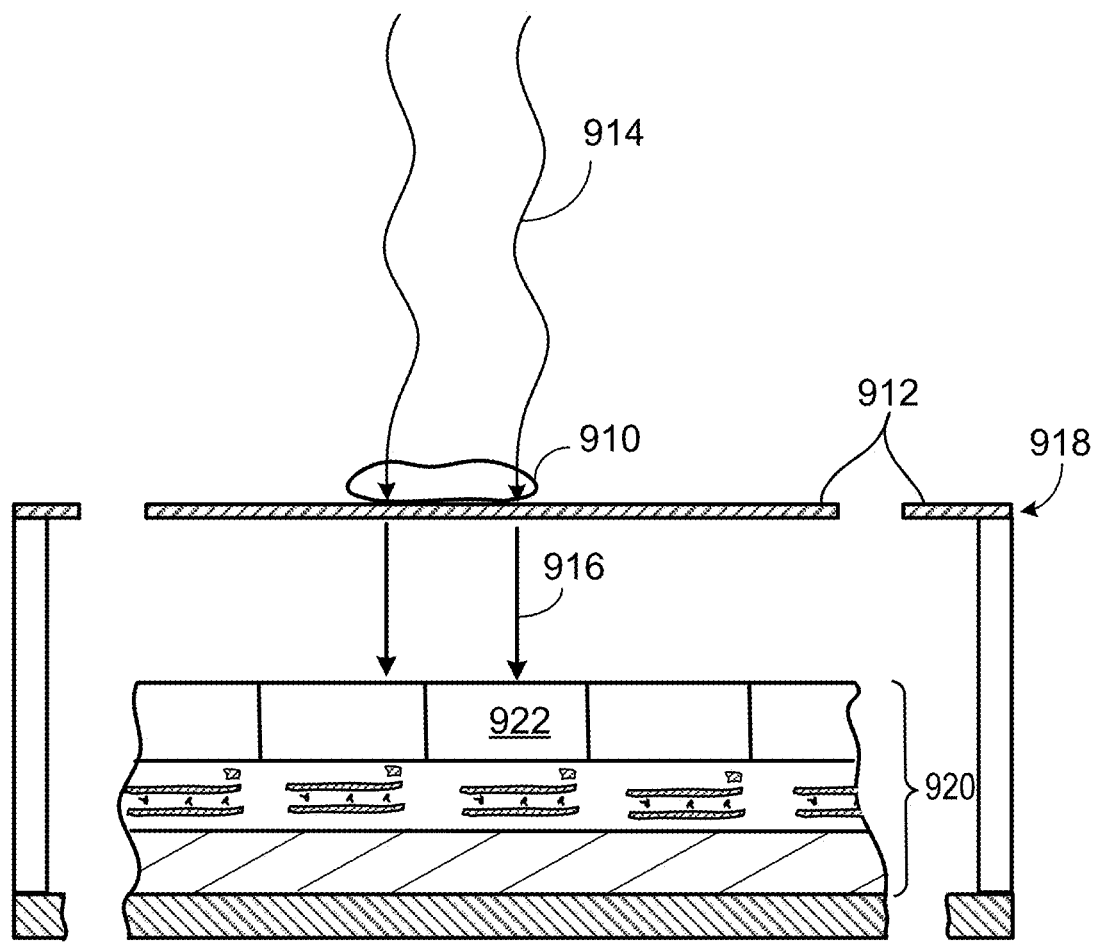

FIG. 59 is a schematic sectional side view of a light amplification arrangement.

Figure 60:
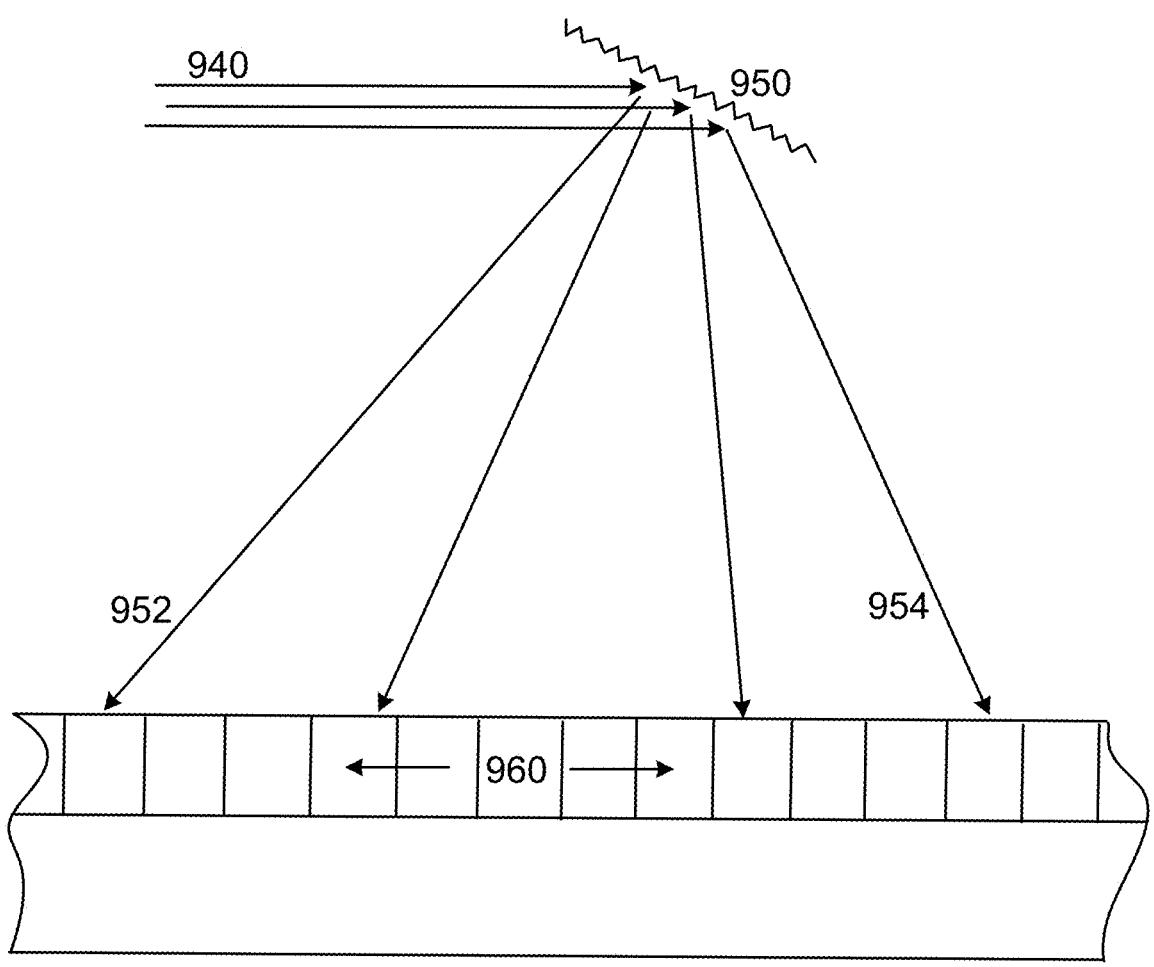
Figure 61:
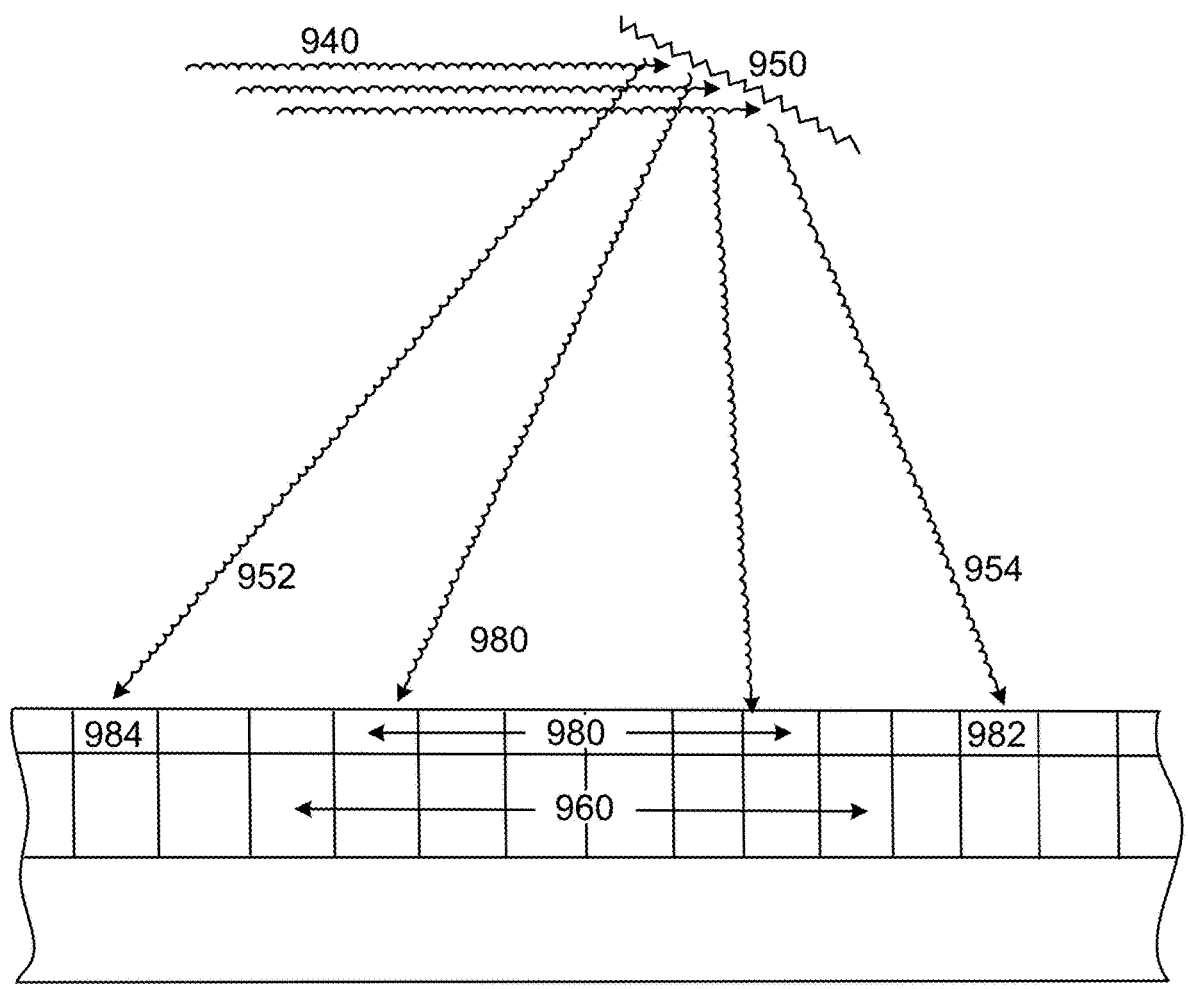

FIGS. 60 and 61 are schematic sectional side views of lighting arrangements.

Figure 62:
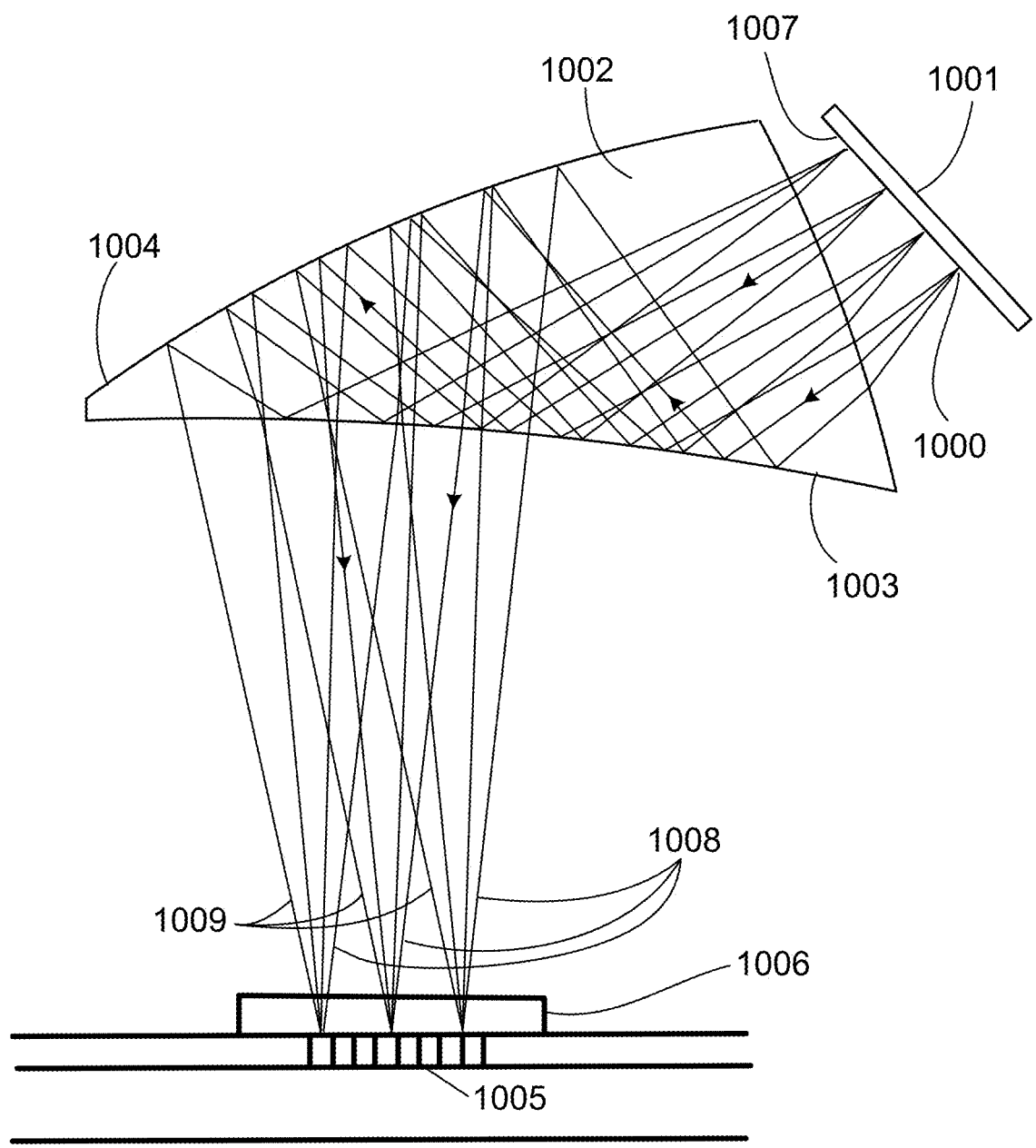

FIG. 62 is a schematic sectional side view of a light source array with collimating optic.

The figures and elements shown in them are not always to scale and many of them are illustrated schematically. The spatial relationships of the elements in the figure may appear differently than the descriptions in the text, for example, above and below and top and bottom may be shown oppositely in the figures from the way they are described in the text.

Figure 1:
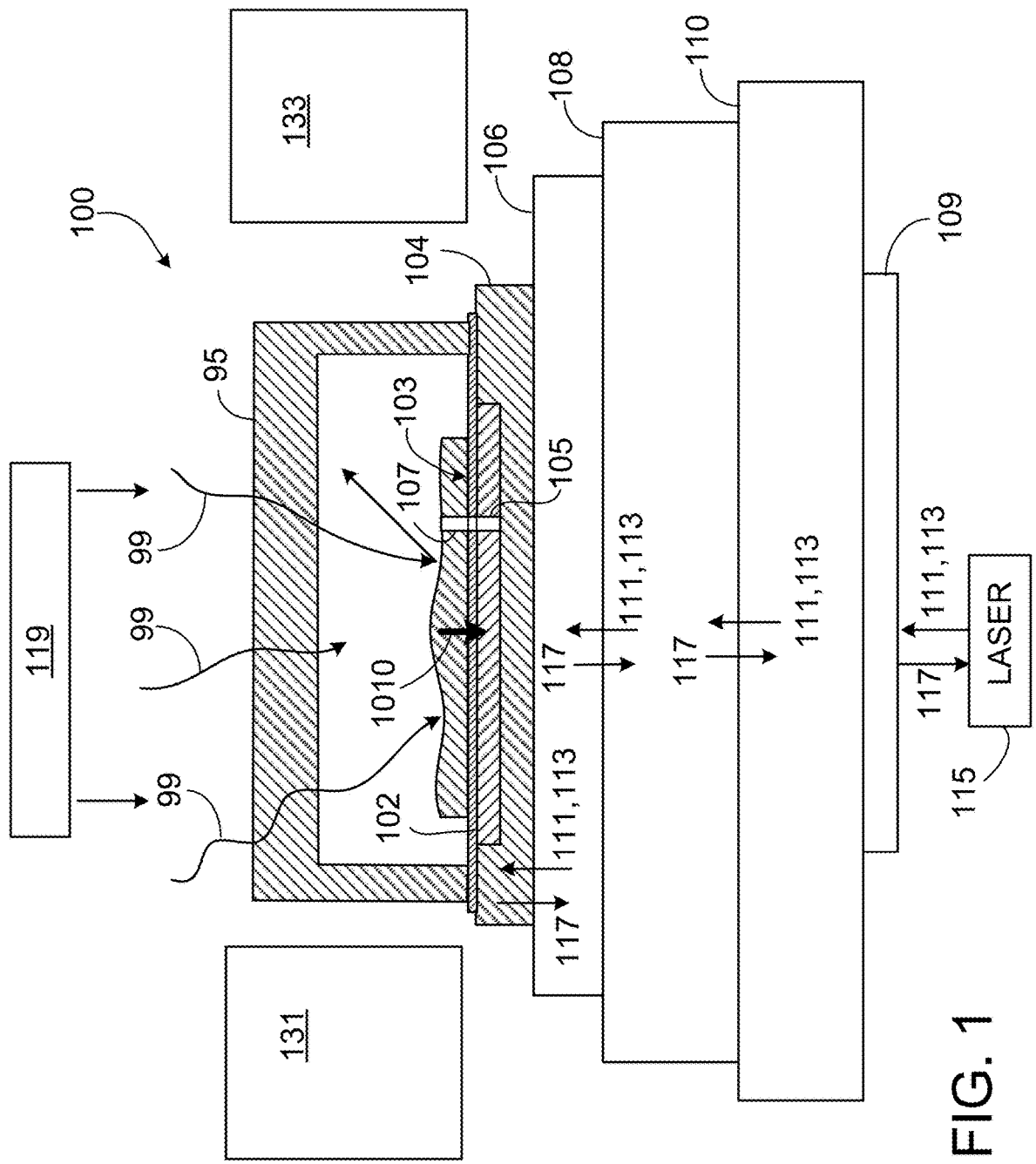
FIG. 1 is a schematic side view partly in section of a system to detect and use light representative of a sample.

As shown in FIG. 1, in some implementations of the concepts that we describe here, a system 100 can capture high resolution images (e.g., full-color, gray-scale, "black-and-white" or a combination of them) of a sample 101 (e.g., a sample in a gas phase, a liquid phase, or a solid phase, or a combination of those or other forms) that is in contact with (or in close proximity to) a light sensor 102. The light sensor includes a two-dimensional arrangement of light sensitive elements 105 that can correspond to an array of pixels in the image. We sometimes refer to the elements of the light sensor as pixels for simplicity.

We sometimes use the phrase "light sensitive locations" in the broadest sense to include, for example any features of a device that are separately sensitive to light or separately capable of emitting light, or both, including light sensitive elements or pixels and light source locations. We sometimes use the phrase light source locations to refer to elements capable of emitting light. In some cases we use the phrase light sensitive location to refer to an exposed light sensitive portion of a feature of the device without any covering, protective layer, shield, or any other feature that might separate the light sensitive from the ambient or from a sample.

We sometimes use the phrase "contact microscope" or "contact microscopy" to refer in the broadest sense to any device (or technique) that includes (a) a high resolution sensor of closely spaced light sensitive or a high resolution set of light emitting locations that are exposed to the ambient at a surface of the device together with (b) a device to associate with that surface a portion of a sample that is to be imaged, and, in the case of light emitting locations, a light detector relatively far from the light emitting locations and sample, so that the portion of the sample is in contact with (or nearly in contact with) the surface and a usable high resolution image can be obtained by the sensor when the portion of the sample is in place.

The spacing (that is, the center to center pitch) of the light sensitive or light emitting locations (sometimes called the resolution) of the device can be, for example, any spacing that is 5 microns or smaller with no limit how small the spacing might usefully be. In some cases reasonably good images can be obtained with a spacing of 1.4 microns and useful images have been achieved with a spacing of 2.2 microns. Devices having 1.1 micron spacing are expected to produce better results, and devices that will have 0.9 micron spacing are expected to produce even better results. The resolution of the image can be the same as the raw resolution of the sensor without requiring computational enhancement, or can be enhanced by computation, for example using multiple images, to reach a resolution that is at least twice as fine as the raw resolution along each dimension of the image. Therefore, useful device resolutions can be in the range of 5 microns or smaller, 3 microns or smaller, 2 microns or smaller, or 1 micron or smaller, for example.

In contact microscopy, the sample is either in direct contact with the light sensitive features of sensor, or light emitting features of the light source, without any intervening material, or the sample may be nearly in contact with the light sensitive or emitting features. By nearly in contact, we mean, for example, within the near field of the features, in some cases at a distance that is within ½ of the wavelength of the light involved or possibly at a distance that is within a wavelength of the light involved.

We use the concept of a device to associate the sample with the surface in its broadest sense to include any mechanism of any kind that facilitates the movement, flow, delivery, placement, or presentation, for example, of a portion of the sample into contact with or nearly into contact with the light sensitive locations, including any mechanism that uses mechanical, electrical, electromechanical, pneumatic, hydraulic, gravitational, or other features, for example.

The sensor can also include other components either as part of or in addition to the light sensitive elements, to drive or read the elements, generate, process, or deliver signals to and from the elements, and perform other functions. Generally, when we refer to the sensor we mean the integrated circuit or part of it that (a) receives light at light sensitive elements and generates signals or data representing the intensities of light detected by the light sensitive elements, and (b) any electronic elements that directly drive the light sensitive elements or cause the light-generated signals or data to be delivered by the light sensitive elements, but not (c) any other circuitry used to process the signals or data to form the image.

The sensor 102 can be part of or formed on an integrated circuit chip 104, which can be made in a homogeneous fabrication mode or a hybrid fabrication mode. The chip 104 can be mounted on a headboard 106, and the headboard 106 can be part of or be connected to a control unit 108. In some applications, a lid or cover or chamber or chamber wall 95 can abut, touch, surround, enclose, or contain the sample or a portion of it within a space or chamber adjacent to an exposed surface 103 of the sensor or a portion of the headboard or both.

The control unit 108 can be part of or connected to a user device 110. The user device 110 can provide an interface 109 with a user 115; can receive commands 111 and information 113 through the user interface from the user, process them, and forward them to the control unit 108; and can receive information 117 from the control unit, process it, and provide it to the user through the user interface. In some instances, the user interface can operate through the control unit 108 or the headboard 106 or a combination of them and of the user device. And commands and information 111, 113, and 117 can be passed between any two or more of the components.

The system can also include sample transport and management devices 131, 133, that can include mechanical, electrical, or electronic components or combinations of them that enable or cause the sample to be delivered to the sensor, held at the sensor, and removed from the sensor, as needed. The devices 131, 133, can also process the sample before and after imaging including by mixing materials with the sample, removing materials from the sample, fetching the sample from a source, disposing of the imaged sample, and any other function that may be needed with respect to the sample in order to operate the system to perform the imaging.

The user device 110 can be a cell phone, another kind of handheld device, an instrument, a system, a manufacturing component, a work station, or any other user device including one that is dedicated to the function of interacting with the control unit or one that has functions not limited to interaction with the control unit, or a combination of the two.

A complete working system or commercial product or component need not include all of the sensor, the chip, the headboard, the control unit, and the user device, but could include a combination of any two or more of them.

In various implementations, any combination of two or more of the sensor 102, the chip 104, the headboard 106, the control unit 108, and the user device 110 can have a variety of mechanical and electrical connections among them. In addition, mechanical, fluid flow, electronic, software, data processing, communication, storage, and electrical functions needed for various operations can be distributed in a variety of ways between and among pairs and three or more of those parts of the system. The distribution of functions can be arbitrary or based on commercial and technological considerations in a wide variety of ways.

In some instances, the sensor 102, which we use to refer to the light sensitive area of the chip 104, can operate as a charge-coupled device (CCD) or as a complementary metal-oxide semiconductor (CMOS) sensor technology. Other imaging regimes may be possible. As mentioned earlier, in some examples, the sensor is pixelated, that is operates with respect to rows and columns (or other array arrangements) of light sensitive picture elements (pixels) 105.

The pixel resolution of the sensor can vary widely based on cost and other considerations associated with particular applications. Typically the physical pixel resolution will depend on the fabrication technique. By physical pixel resolution, we mean the number of actual pixels per unit length. In some instances, CMOS devices have advantages including cost, control of frame rates, background or noise correction, and vibration dampening. In some cases, off-the-shelf commercially available sensor chips can be used. In some cases, there may be advantages to providing custom-designed sensor devices. Smaller pixel dimensions may be possible with alternative technologies such as single electron field effect transistors, as described in US patent application US 2010/0320515 A1, incorporated here by reference.

In some implementations, it may be useful to operate the sensor in a mode in which the physical pixel resolution can be enhanced by capturing multiple exposures at slightly different positions of the sample relative to the sensor or the light source or both. The resulting data are then interpolated to provide an effectively higher (sub-pixel) resolution. Sensors in which the pixels are smaller than the diffraction limit of light will yield relatively high physical pixel resolutions and therefore will be particularly useful for the system. In general, for many implementations, the smaller the pixels the better. In general, thinned back-illuminated image sensors will be advantageous, as in these sensors the sample can be closest to the photosensitive portion of the pixels, and none of the pixel's photosensitive area need be obscured by other circuit elements. In some cases, sensors are fabricated with micro-lenses or color filters or both associated with the respective pixels. In some instances, the system is intended to use a sensor that is free of such additional optical elements. In some implementations, such additional optical elements may be useful.

In some cases, the pixel resolution (either physical resolution or effective resolution or both) will intentionally be made as high as possible using available technology. Submicron pixel resolution is possible, for example. The effective resolution of the system may be enhanced to sub-pixel levels using a wide variety of techniques.

Many integrated circuit chips have exposed surfaces 103 that are comprised of silicon oxide. In such chips, the sensor will inherently have a durable, chemically resistant surface against which the sample can be placed, without requiring any additional layer. In some cases, however, an additional layer or layers may be placed on the surface of the sensor for a variety of purposes.

During operation, the sensor responds to incident electromagnetic radiation (e.g., light) 99 that passes through 1010, is scattered from, or emanates from the sample 101. Light that passes through or is scattered from or emanates from the sample may be altered in wavelength, for example, as it passes through or is scattered or emanates. The incident electromagnetic radiation 99 and the transmitted, scattered, or emanated radiation is typically in the wavelength range of visible light, near ultraviolet, or near infrared. We use the term light in its broadest sense to include all such ranges, for example.

Because the sample 101 is in contact with or essentially in contact with or in close proximity to the surface 103 of the sensor, there may be no need for any optical elements to be used in the system to refract or collimate or redirect the light.

Light from a portion 107 of the sample that is adjacent to a pixel (or is in a path between the incident light 99 and the pixel) will be received largely (in some cases essentially entirely) by that pixel 105.

In this arrangement, the light sensed by the array of pixels of the sensor is directly representative of a corresponding array of portions of the sample and therefore represents in effect an image of the sample, an image that can be of high resolution.

To the extent that the initial source of the light reaching the sensors is in the environment, that light may be ambient light or can be provided by a dedicated light source 119. In some implementations it may be useful to control the illumination of the sample and in particular the uniformity of the illumination by controlling the light source or screening out ambient light or both.

To capture an image of the sample, the sensor is driven and read during a conceptual image capture cycle. During an image capture cycle, the light received by the sensor at all of its pixels is converted to electrical signals (e.g., analog signals or digital values) that are delivered to electronic components of the chip. The signals may be read in parallel or serially depending on the technology. The electrical signal from each of the pixels typically is represented by a quantized intensity value corresponding to the intensity of light sensed by the pixel, within some range such as a range represented by 14-bit digital values. Color information can be obtained in a variety of ways, for example, using bandpass optical filters over multiple adjacent pixels, or sequential imaging with different color illumination, and possibly in other ways. Whatever method is used, the electrical signals that are received from the various pixels in space and/or time together can represent a full-color high-resolution high-dynamic range image of the sample.

A succession of images can be captured for a given sample using different exposure levels, different wavelengths of incident light, different amounts of exposure time, and other parameters and combinations of them. In addition, successive images can be captured for successive samples and used together for analytical purposes. And a given sample, for example, a liquid or gas, can be moved, e.g., along a direction parallel to the surface of the sensor while a video sequence of images is captured. The images can be of different portions of the sample that are unrelated or are overlapping. The successive images can then be used together for various purposes. When images are taken of unrelated portions of a sample, they may be useful as representations of the characteristics of other portions of the sample for which no images are acquired.

The successive images may represent the sample at very closely spaced locations as it is moved along the sensor, which can allow special processing to improve the resolution and other qualities of the images. The native or physical resolution of the sensor is represented by the spacing of the pixels in each of the dimensions of the array. Certain timing and mathematical techniques can be used to achieve an actual super-resolution, also called a sub-pixel resolution, higher than the native resolution. In addition, two or more images of a given sample can be taken at different "exposures" and combined into a single high dynamic range (HDR) image.

After a given image capture cycle and before the next image capture cycle it may be necessary or desirable to flush or clear a set of signals or data from the pixels of the sensor. In some technologies this can be done at any time simply by reading the sensor pixels.

In addition to the electronic features of the system, there are mechanical elements discussed below that among other things handle, contain, and illuminate the sample 101.

Some or all of the electronic and mechanical components that form the system, including the sensor, the chip 104, the headboard 106, the control unit 108, the user device 110, and the user interface 109, and combinations of any two or more of them can be produced as individual commercial products and can be either reusable or disposable.

When such a combination is disposable it can be packaged as appropriate for the application, for example, to protect it, exclude water vapor or air, maintain its sterility or any combination of two or more of those. Groups of identical disposable items can be packaged together to provide an ongoing supply at a point of use. Two or more of the components or products that are reusable and disposable can be packaged as kits. Kits may include disproportionate numbers of the components, for example, relative few reusable components, and relatively more disposable components.

The higher the cost per unit of a component or set of components in question, the more likely it or they are to be re-used and the less likely they will be made disposable. Mechanical elements that handle, contain, and illuminate the sample 101 can also be disposable or reusable. Elements and components may be made disposable if they are subject to contamination by samples and therefore rendered less usable for later imaging of other samples. In general, disposable elements will be made of less expensive materials and components using less expensive fabrication techniques. In some examples, the control unit and the user device could be reusable, and the headboard and the chip with the sensor could be disposable. In some examples, the headboard, too, can be reusable, with interchangeable disposable chips, while in yet other examples the chips also can be reusable, with disposable sample chambers overlying them.

When some elements are disposable and some reusable, there may be electrical or mechanical couplings or both between the disposable elements and the reusable elements that can be easily connected and disconnected.

Figure 2:
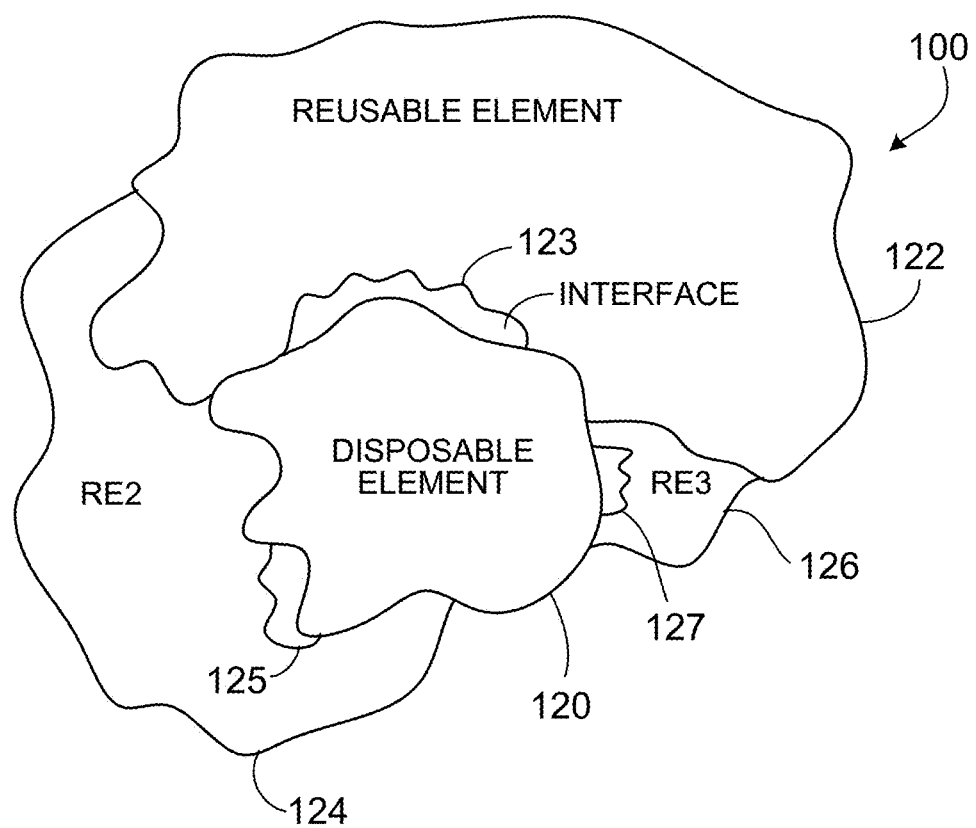
FIG. 2 is a schematic view of disposable and reusable elements.

As shown schematically in FIG. 2, for example, the system 100 can contain a disposable element 120 that can be any element (or any combination of elements) of the system 100. The disposable element 120 can be connected to one or more reusable elements 122, 124, 126 through appropriate interfaces 123, 125, 127. The interfaces 123, 125, 127 can include both mechanical and electronic connections that permit disposable element 120 to be easily connected to and disconnected from the reusable elements 122, 124, 126.

Figure 3:
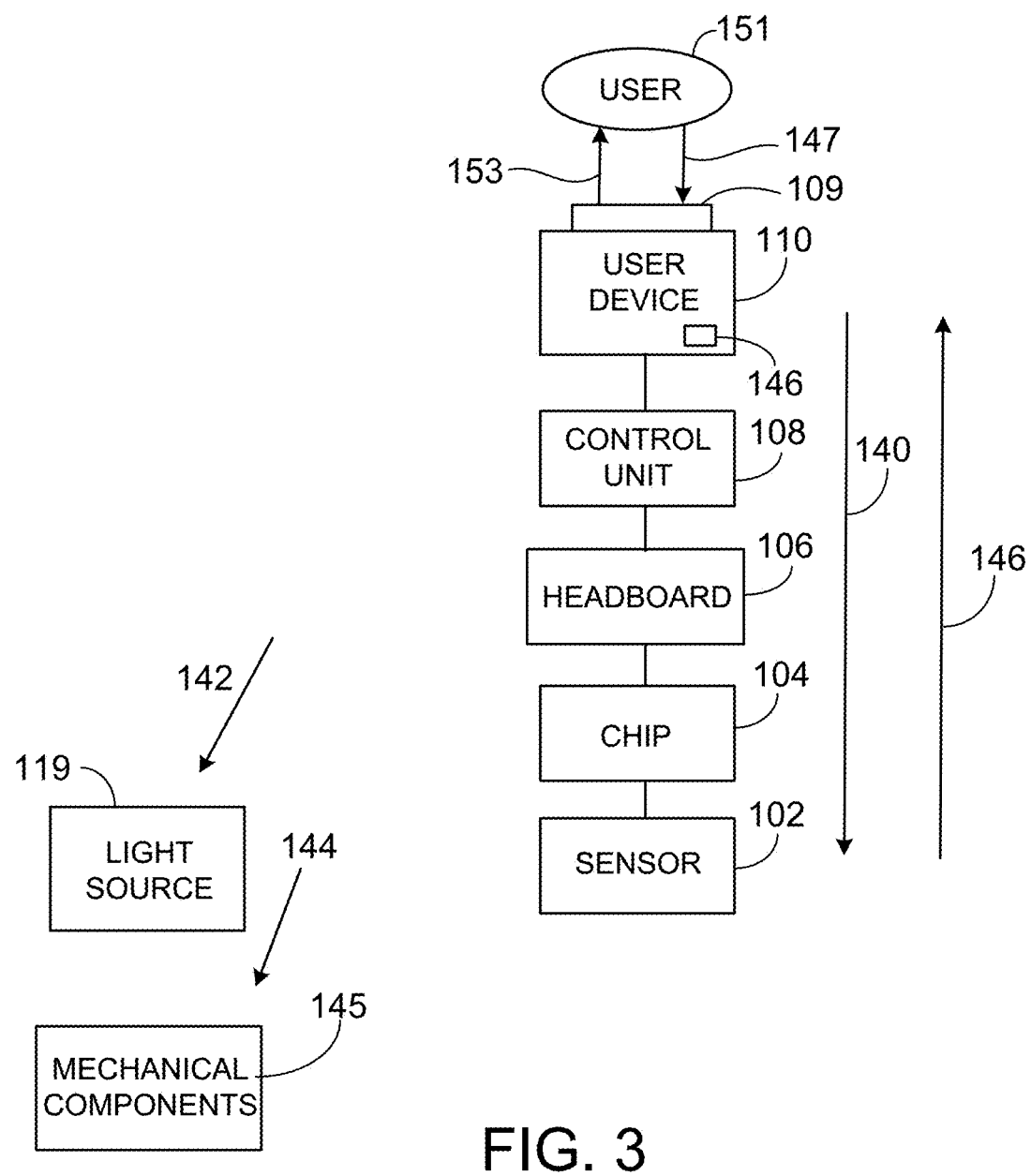
FIG. 3 is a schematic view of devices and components to detect and use light representative of a sample.

As shown in FIG. 3, to control the sensor for reading and to acquire and use the sensed pixel values read from the sensor, electrical signals, data, and commands can be passed from component to component in the system and processed and reprocessed to provide a high resolution image of the sample. For example, control signals or commands 140 (e.g., when a user invokes a user interface element to trigger the capturing of an image) may pass from the user device 110 to the control unit 108 to the headboard to the chip to the sensor 102. (As mentioned earlier, not all of these elements need be present in a given system.) The signal can be processed and translated, or merely passed along, or some combination of them, by each of the elements along the way. In general, the processing and translation proceeds from higher levels of abstraction at the user device end of the chain to fine-grained, low level raw electrical signals at the sensor. One or more of the components of the system can also provide control signals or commands 142 to the light source 119 and control signals or commands 144 to the mechanical components 145. The delivery of signals and commands 140, 142, and 144 can be coordinated to effect a disciplined operating regime for moving samples to and past the sensor, illuminating them, and capturing image information from them.

Conversely, raw pixel value signals or data 146 can be returned from the sensor 102 through the chip 104, the headboard 106, the control unit 108, the user device 110, and the user interface 109 (or a subset of them). Each of those components can process the information that it receives, generally at a higher level of abstraction than the elements from which it receives the information. For example, the control unit 108 can process the pixel values received from the headboard to produce corresponding streams of image data that are then passed from the control unit 108 to the user device 110.

At each component including the chip, headboard, control unit, and user device, software, hardware, firmware, analog circuitry, and various combinations of them can cause the processing of information and the passing of information and commands in either direction along the chain of components.

For example, applications 146 running on the user device can manage the sending of control signals 140 to the control unit 108, receive and process the image data 146 from the control unit 108, generate high level results, images, and other information based on the image data 146, receive user input 147 from a user 151 of the user device 110, and provide the information and user output 153 to the user 151 of the user device 110, in both cases through a user interface 109. The applications 146 can include a wide variety of algorithms and techniques for data processing for a wide variety of purposes. The user interfaces can provide a wide variety of features, controls, and information, from complex and subtle, to simple and rough, and any combination in between. A given user interfaces can be designed to serve a user drawn from a broad range of users from highly skilled users working in sophisticated environments to unskilled users working in physically difficult remote environments.

Figure 4:
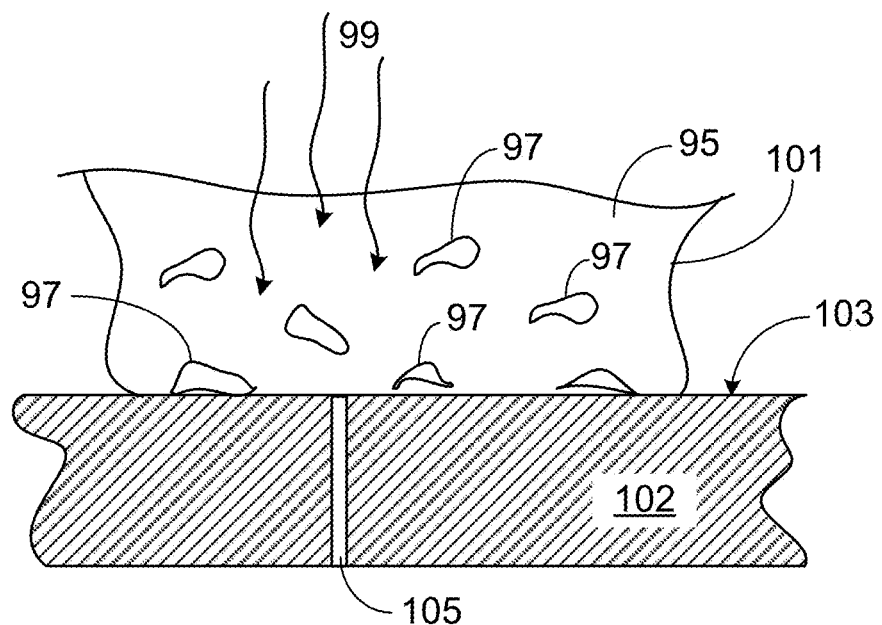
FIGS. 4 through 15, 21, 22, 25, 26, 27, 28, 29, 30, 31, 38, 40, 41, 45, 46, 47 and 58 are schematic sectional side views of elements useful to detect and use light representative of a sample.

As shown in FIG. 4, the sample 101 (we sometimes use the word specimen interchangeably with the word sample) that is being imaged can be composed of or include small similar types of units 97, such as particles, bits, specks, cells, or molecules, or combinations of them or combinations of any two or more of the different types. The units 97 may be suspended in or carried in a liquid 95 to form liquid-suspended sample units 97, entrained in a gas to form gas-suspended sample units (not shown), rest in an unsuspended and un-entrained form (a powder, for example) on the surface of the sensor (not shown), or be held in an integrated matrix of solid, gelled, or other integral self-supporting material, such as a sectioned layer of tissue, to name only a few examples. We sometimes use the term matrix very broadly to include, for example, any material in which sample units are held, including liquid, gas, solid, gel, or any other material.

Figure 5:
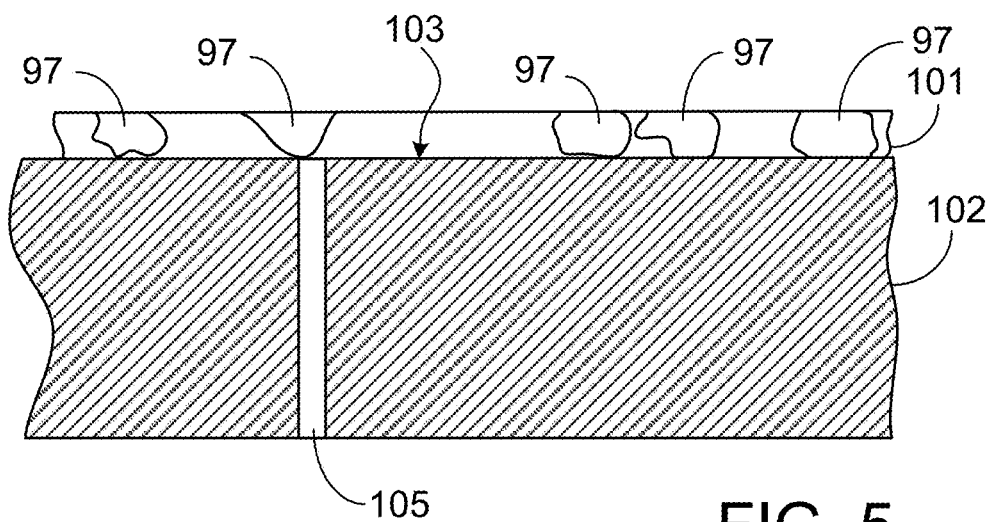

In FIG. 4, in general, the sample units may or may not be in contact with the sensor surface. As shown in FIG. 5, however, whatever the mode or method by which the sample units are to be suspended, entrained, held, or placed, it can be useful and in some cases important to have at least some of (e.g., essentially all of) the sample units to be imaged in contact with the exposed and uncovered surface 103 of the sensor. Having them in contact will help to assure the highest resolution, sharpest images of the sample units. In some cases, useful results are also possible when some of the sample units are not in direct contact with the uncovered sensor surface, for example, when they are in contact with a layer that covers the sensor surface, or in some cases, when the units are at a small distance from the surface sensor. In some examples, the resulting images may not be as sharp, but the images may be useful nonetheless.

The sample units can be caused to be in contact with the sensor surface in a wide variety of ways or combinations of them. Useful approaches may depend on the mode or method by which the sample units are to be suspended, entrained, held or placed.

A simple way to cause the sample units to contact the sensor surface, for example, when the sample comprises a powder or a matrix of gas or liquid that is not moving but is statically in place at the sensor, and assuming that the sample units are denser than the matrix and free to move within it, is to allow gravity to cause the sample units to settle against the sensor.

Figure 6:
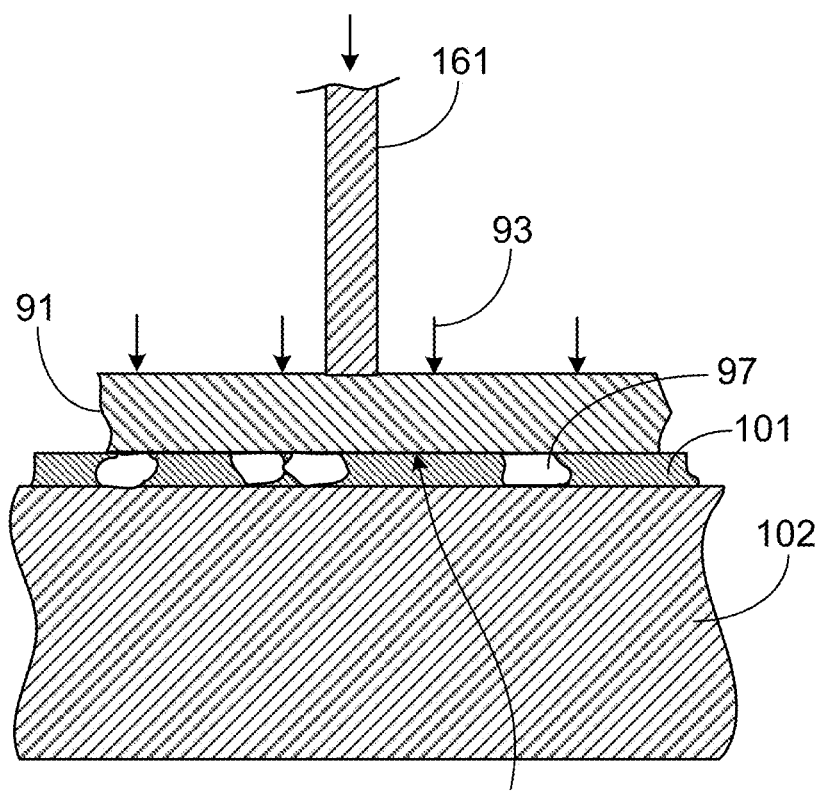

As shown in FIG. 6, in some cases, for example, when the sample units are carried in a non-solid material, a force 93 can be applied against the sample towards the sensor surface to force the sample units into contact with the sensor surface. This may be useful especially when the sample is static (not moving relative to the sensor).

In some cases, the force 93 can be applied to a pressure element 91 (which can be part of the element 95 in FIG. 1) that can have a planar surface 160 that is parallel (or in some cases not parallel) to the sensor surface. The pressure element can be arranged to be driven by gravity, that is to settle down towards the sensor surface, or can be driven actively by one or more elements or structures 161 to cause the pressure element to move towards the sensor surface, or a combination of the two.

If the samples are all of nearly the same size or if the sample units are compressible, then pressing on the sample using a, for example, parallel surface 160 will cause all of the sample units to make contact with the sensor surface. However, if the sample units are not all of nearly a uniform size and not compressible, then some of the sample units may remain in the matrix spaced from the sensor surface.

As noted earlier, the sample to be imaged can be held statically relative to the sensor at the time of the imaging, or can be moving relative to the sensor at the time of the imaging, or some combination of the two modes can be used. In addition, whether or not the matrix is moving, the sample units may in some cases be moving within the matrix, for example, if the sample units are living, or if there is a chemical or biological reaction in progress.

Figure 7:
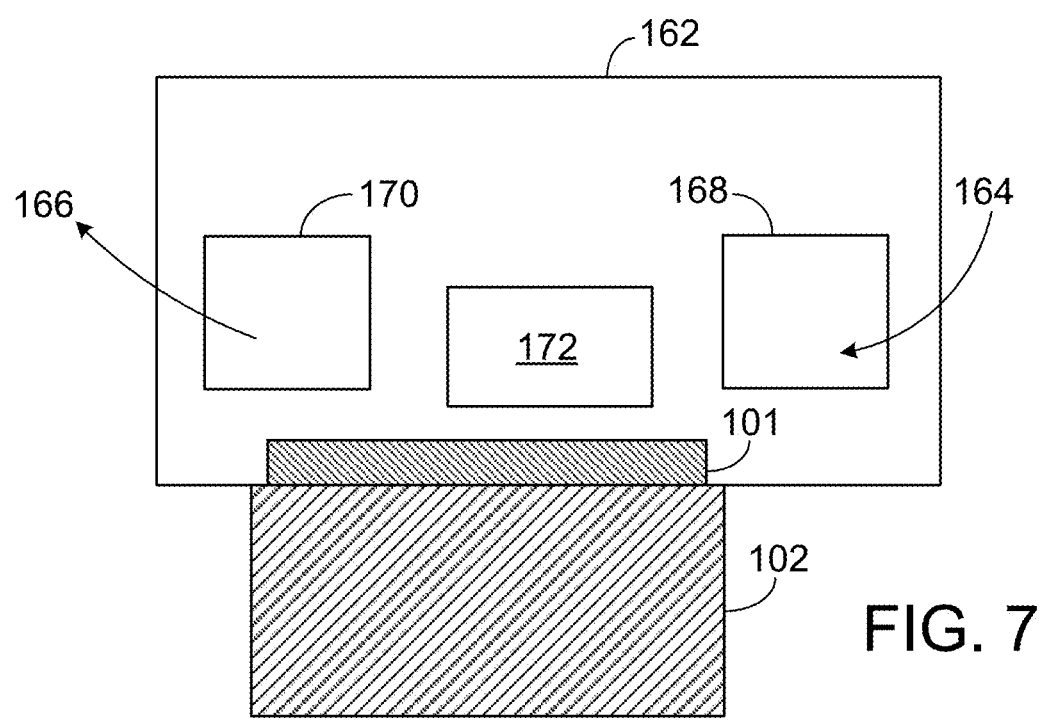

As shown in FIG. 7, if the sample is to be held statically at the sensor for imaging, in some implementations a structure 162 (shown schematically in FIG. 7) can be provided to deliver 164 the sample to the sensor, to hold it statically at the sensor for imaging, and then to permit it or cause it to be removed 166 from the sensor, for example, if another sample is thereafter to be imaged. The structure could include flow or transport elements 168, 170 that permit or cause a flow or transport of the sample into position next to the sensor and permit or cause a flow or transport of the sample away from the sensor after imaging. The structure could also include retaining elements 172 that hold the sample statically in place for imaging. A wide variety of flow or transport elements and retaining elements and combinations of them could be provided. Typically any structure 162 that covers the sensor or is otherwise interposed between the sensor and an intended external source of light will need to be transparent or translucent to allow light to pass from the source through the structure to the sample and then to the sensor.

Figure 8:
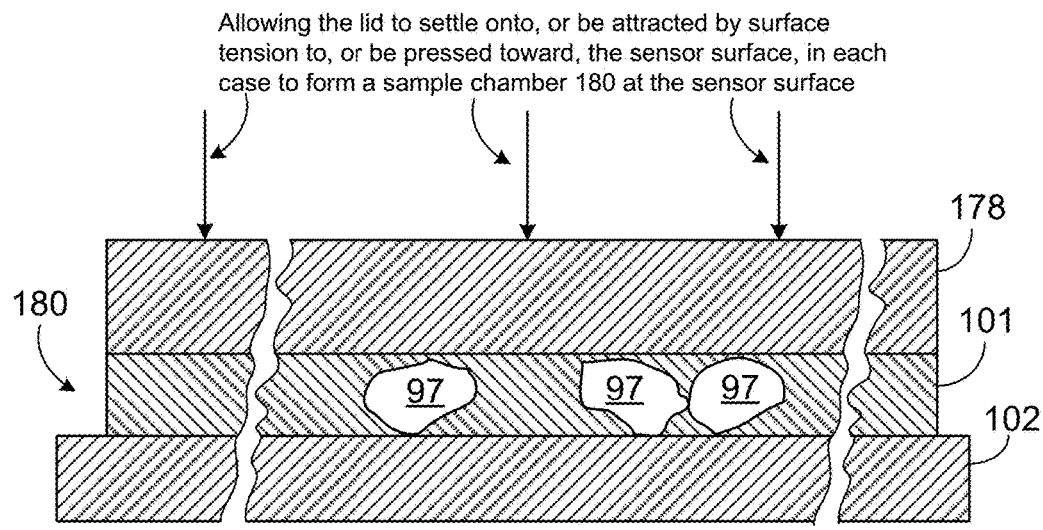

In some implementations, as shown in FIG. 8, for a static mode of imaging, for example, the sample can be kept in place at the sensor surface 103 by depositing a quantity of the sample on the sensor surface, laying an optically clear lid 178 having a flat bottom, such as a cover glass, on the sample, and allowing the lid to settle onto, or be attracted by surface tension to, or be pressed toward, the sensor surface, in each case to form a sample chamber 180 at the sensor surface. The sample chamber can be roughly as long and wide as the sensor and have a chamber thickness at the sensor surface of, for example, 50 micrometers. In some cases the chamber thickness can be as thin as 10 nanometers or as thick as 10 centimeters. In many applications, the chamber thickness would fall within a narrower range, say, between about 100 nanometers and 5 millimeters. In many applications, the thickness will be in a still narrower range from about 500 nanometers to about 50,000 nanometers.

Figure 38:
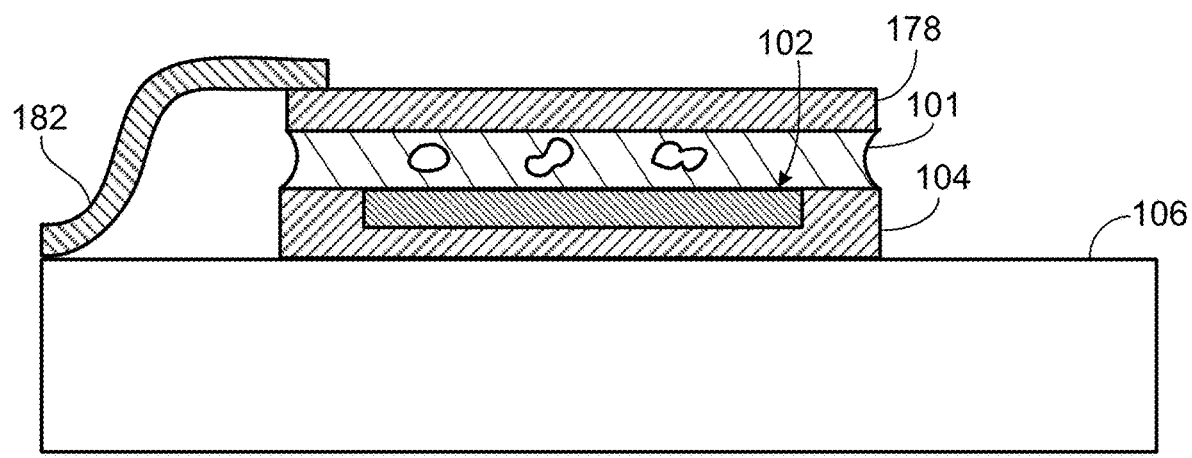

In some implementations, as shown in FIG. 38, the cover piece 178 could be a plastic (e.g., PET, poly(ethylene terephthalate)) film held in position by a flexible film 182. In some cases, the cover piece or lid could be molded plastic (e.g., poly(methyl methacrylate)—PMMA or another optically clear polymer) that has a bottom portion that is about the same length and width as the sensor. The bottom portion can be coupled to a top portion that is broader than the bottom portion and extends beyond an encapsulated portion of the chip bearing the sensor. The top and bottom portions can both be optically clear. The lower surface of the bottom portion can be optically flat, as, in some cases, would be the top surface. In some instances, the lower surface or the upper surface may be curved (continuously or discretely as in a Fresnel lens) to serve as a condenser or other collimating element, or have other structure to accommodate light sources or shape the illumination, for example. In some cases, the top and bottom portions could be formed integrally as one piece. In some instances, the top and bottom portions could be respectively more rigid and less rigid pieces bonded together. The top portion could be formed of PMMA and the bottom portion could be formed of glass to provide greater optical flatness, for example, or the top portion could be formed of PMMA and the bottom portion could be formed of polydimethylsiloxane (PDMS), a polymeric organosilicon compound, often referred to as silicones, to include spacing features or gasket features or both.

In the example, the chamber has a top but does not necessarily have side walls or end walls (although it could have one of more of such walls). When we use the term chamber we use it in the broadest sense to include, for example, any element that has one or more walls whether or not it has walls that fully enclose a space or any element that has one or more surfaces that establishes or defines a space for the specimen or any element that in any way defines a space for the specimen. A chamber can be, for example, open chambers with walls but no tops or tops with no walls.

The chamber includes or encloses or contains a sample space at or in the vicinity of the sensor or a part of the sensor. The sample space has a volume that is, in some cases, defined by the length and width of the sensor and a thickness between the sensor and the lid or between the sensor and the top of the specimen or sample or matrix. In some cases the chamber walls and the sample space may not be a rectangular prism but could be of any shape.

When a volume of a sample is placed in contact with the sensor surface in the chamber or otherwise placed in the sample space, the volume of the sample may be larger than the volume of the sample space. The excess can drain from or be squeezed from one or more open sides or other outlets of the sample space. When we refer to the chamber we mean a generally enclosed space that includes the sample space at the sensor and may include additional space adjacent to the sensor.

Figure 9:
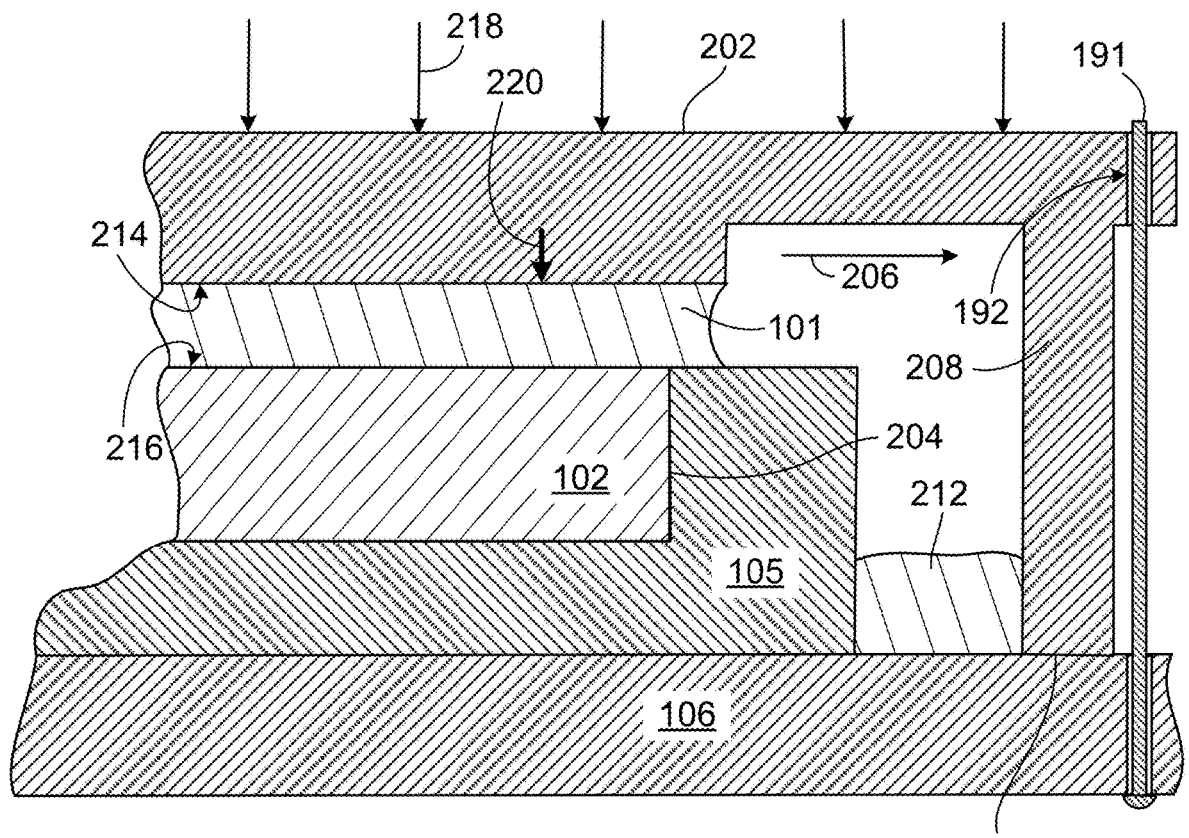

As shown in FIG. 9, in some examples, the lid 202 may have a configuration more complex than a simple flat cover glass. For instance, the lid 202 can extend 206 beyond the edges 204 of the sensor 102 and have side walls 208 that extend down to touch and seal against the chip 105 or (in the example shown) the headboard 106. In some examples, there is a compressible gasket 210 along the headboard, sensor or the bottom of the lid's side walls, extending all along the line of contact of the side walls with the headboard or sensor. This gasket serves to seal the lid against the headboard or sensor, to prevent escape of excess sample fluid 212. The sample to be imaged is held in the space between a bottom surface 214 and the top surface of the sensor by surface tension or capillary action.

In some implementations, in order to maintain the lid in an effective orientation relative to the sensor (e.g., to cause the edges of the bottom surface 214 of the lid to be aligned with corresponding edges of the upper surface 216 of the sensor), one or more pins 191 or holes on the headboard or lid, and one or more corresponding holes 192 or pins on the other of the lid and headboard can be mated when the lid is put into place. A variety of other alignment and orientation devices could be used, including, but not limited to, magnetic pins and pads, meshing teeth, vane and groove, ball and socket, or a combination of two or more of them.

To summarize, to use the implementations illustrated by FIG. 9, a larger than needed volume of fluid sample, for example, can be dispensed onto the sensor. The lid 202 is lowered onto the sample with the pins 191 and holes 192 mating and pressed down until the perimeter walls 208 strike and seal against the surface of the headboard. Pressing 218 (which can be done by hand or by a mechanical, magnetic, electromechanical or other device) the lid down causes excess fluid 212 to be ejected from the perimeter of the sensor and flow down into the moat created by the lid walls where the excess is captured until the lid is removed. The imaging is done while the lid is held down in some cases with light passing down through the lid and the sample to strike the sensor. Capillary action would keep the precise volume within the sample space and may also provide adhesive force drawing the lid down and holding it in place, while the excess volume would stay in the lake formed in the moat. For example, 10 µL of blood could be placed on the sensor surface 103. When the chamber lid is lowered, the precise volume of, e.g., 0.04 µL is formed (say four microns thick with the sensor area of 10 mm$^2$) and held in the sample space. The excess sample is expressed 206 beyond the sensor, and may drain into the lake 212. In some cases, the excess fluid could be drawn up the sides of the gap between the chamber walls and the closely-fitting chamber lid, which may have the form of a rectangular prism, or of a truncated inverted pyramid, or another such solid, and which may have vertical vanes that project into corresponding channels along the chamber walls to maintain proper attitude as the lid is lowered.

In some instances and for a given kind of sample unit or a precisely specified volume of sample (e.g., for a blood count, or other analysis in which the number of sample units is to be counted for a precise volume of the sample), the volume of the sample imaged by the sensor is precisely controlled by the width and length of the top surface of the sensor and by the height of the gap 220 between that surface and the flat bottom surface of the lid. In some cases, the volume may not need to be precise, but the gap height may need to be a precise amount, or no larger than a certain amount, or no smaller than a certain amount, or a combination of those conditions.

A wide variety of techniques and devices can be used to form and maintain a height (e.g., a precise height) of the gap. We broadly refer to those techniques and devices as spacing features. Among other things, spacing features can be provided on the lower surface of the lid, on the upper surface of the sensor, on both of the surfaces, within the sample, by controlling the dimensions of the side walls 208, and by other kinds of spacers between elements of the system, or a combination of any two or more of those. In order for the lid to provide both a precise gap height and also to seal the dam for collection of excess sample, the lid 202 or gasket 210 may be made of a resilient material, so that pressure 218 on the top of the lid can force the lid down to the right level to form the precise gap height even after the bottom edges of the side walls of the lid have, through the gasket, struck and sealed against the headboard or the chip. In the case of a resilient lid, the lid should not be too soft or flexible, however, in order to assure the precision of the volume of the space in which the sample is held.

In some implementations, one kind of spacing feature can include microspheres or other kinds of beads of uniform size, say, 3.0 µm or 5.0 µm. To establish a precise and uniform spacing and therefore volume of the sample space, it may be useful to specify the precision of the bead sizes, for example, the beads could be specified as 4.0 µm with a precision of plus or minus 100 nanometers. The beads can be used in a variety of different ways.

Figure 10:
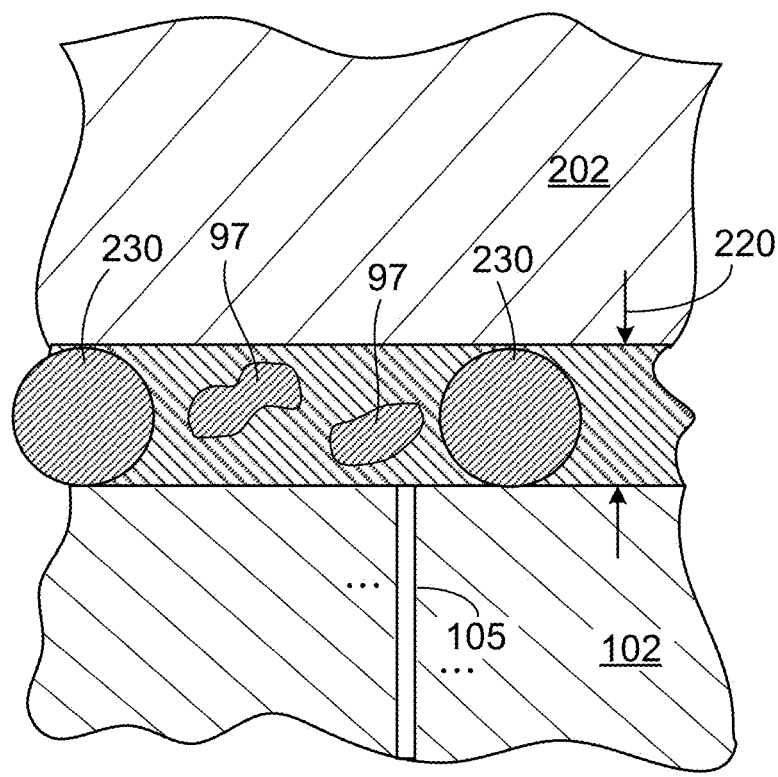

As shown in FIG. 10, in some implementations, the beads 230 are included within the sample, for example a sample having a liquid matrix in which sample units (smaller than the beads) are suspended, when the sample is delivered to the sensor surface 103. If the chamber lid is then allowed to settle on or be pressed down onto the sample, and assuming that there are enough beads in the sample and they are reasonably well distributed within the liquid, then a uniform accurate gap height can be achieved. For this purpose, the beads might be present in the sample at the rate of 10,000-500,000 beads per microliter of sample, for example. Maintaining an even distribution of the beads in the sample can be done by simple mechanical agitation if the beads are selected to have close to neutral buoyancy in the sample.

In some cases, the beads can be roughly the same size as the sample units. In some implementations, beads of two different sizes can be included. A larger size defines the intended spacing. A smaller size can be counted to verify that the volume of the sample space is as intended, assuming the smaller beads are distributed through the sample reasonably uniformly, and the number of smaller beads per unit volume of the sample is known. The beads may be transparent in order to allow light to pass through to the sensor, or may be colored, or fluorescent, or opaque, or a combination of two or more of those characteristics.

Figure 11:
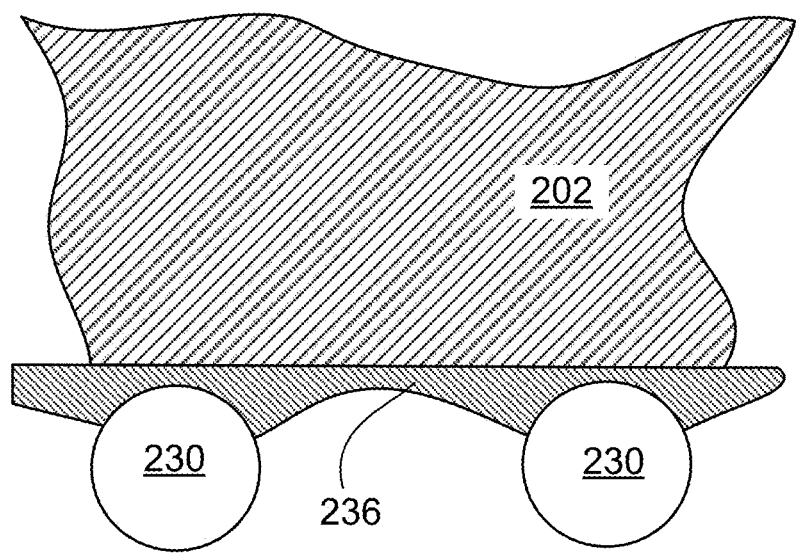

As shown in FIG. 11, in some examples, beads 230 can be attached to the lower surface 214 of the chamber lid 202 by printing them or in some other way depositing them onto the surface in a way that causes them to adhere to the surface. The printing or depositing could include a transparent adhesive or other medium 236 that causes the beads to adhere, or be achieved by surface activation using plasma bonding or another treatment inducing high adhesiveness.

Figure 12:
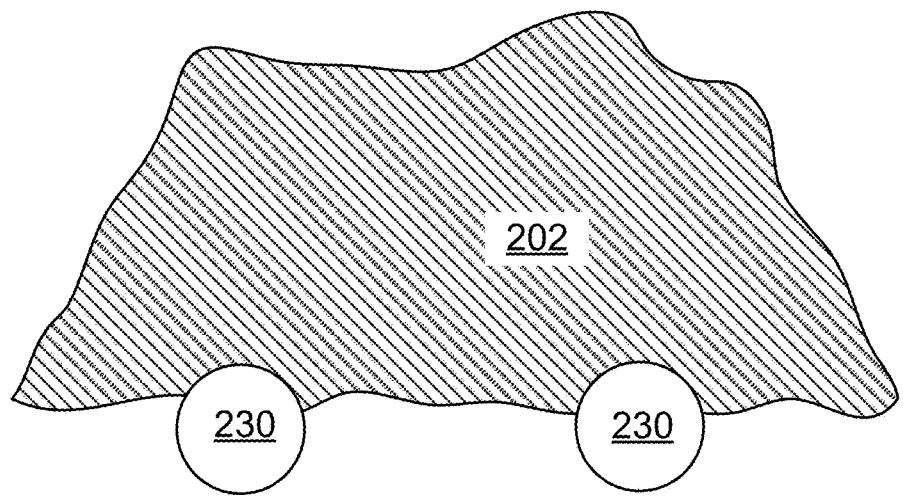

As shown in FIG. 12, in some examples, the beads could be embedded into the surface during or after formation of the lid, for example, while the lid or the surface is in a semi-molten state.

Figure 13:
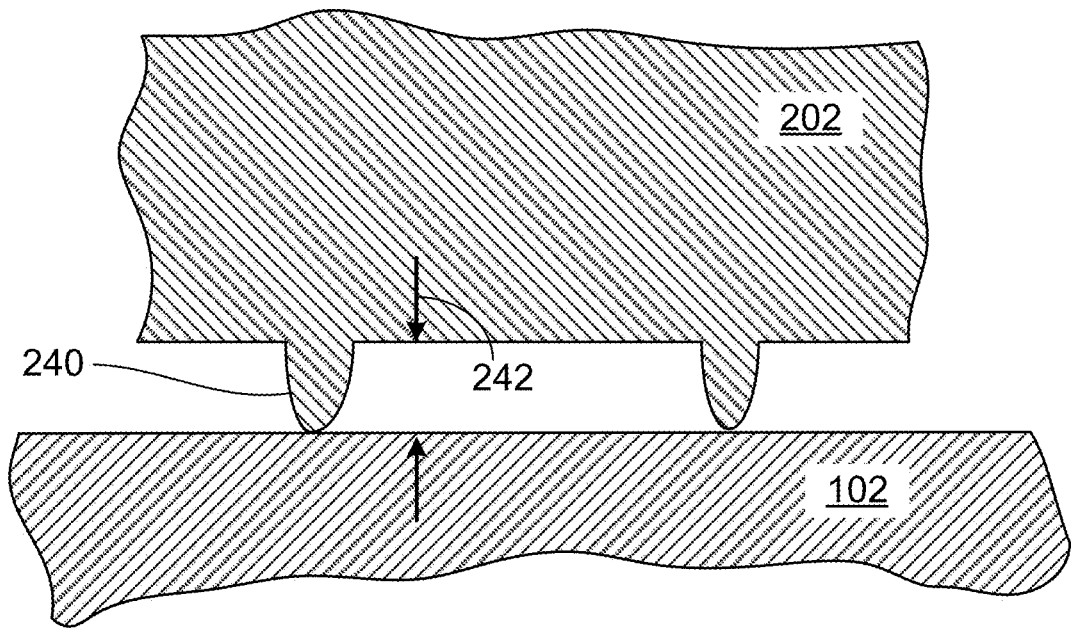

As shown in FIG. 13, in some implementations, the spacing feature could include projections 240 molded into the lower surface of the chamber lid when the lid is formed and would project by a precise selected distance 242 (the same as distance 220 in FIG. 10). The projections could be arranged with a shape, configuration and frequency, and in a pattern so that when the lid is lowered onto the sensor surface, the precise distance is maintained uniformly across the sensor. One material for molding the chamber lid could be PDMS. In examples in which the spacing feature is to be integrally formed in the chamber lid, the spacers (we sometimes refer to the spacing feature as spacers) could be dimples, bumps, or ridges, or combinations of them.

In some implementations (see for example, element 208 in FIG. 9), side walls of the chamber lid could be integrally molded. The sidewalls could include apertures to permit liquid to be drained from the edges of the sample space.

Figure 14:
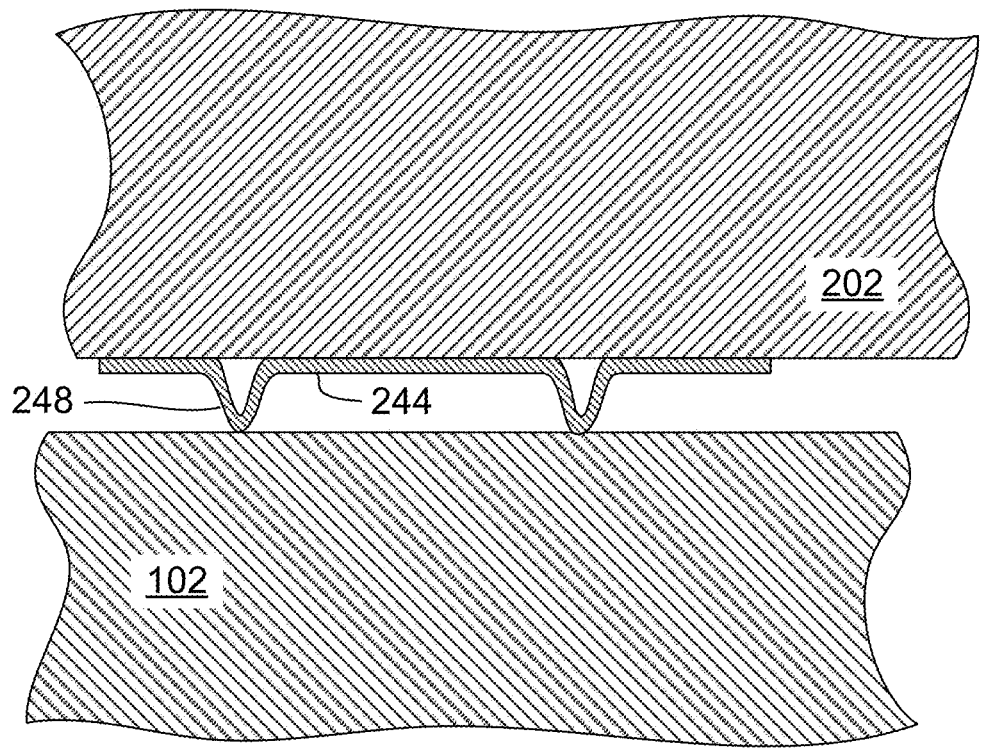

As shown in FIG. 14, in some examples, an additional layer 244 that bears the projections or beads or other spacing feature could be formed and attached to the bottom surface of the lid. Different spacings could then be achieved using a common lid by attaching different layers having the needed dimensions of projections, beads, or other spacing features. In some instances, the spacing features 248 could be formed on a thin layer by embossing. In some cases, features could be cast in poly(ethylene terephthalate) (PET) sheets.

In some instances, spacing features could be printed on the lower surface of the lid (or on a sheet, for example, an acetate sheet, that would then be attached to the lower surface of the lid) or on the sensor surface or on a combination of the two using xerography. Toner particles are typically of approximately 8 μm diameter, which would work well for some applications, but smaller and larger size toner particles are available and could be used.

In some cases, it may be possible and useful to form or attach the spacing feature on the surface of the sensor.

A wide variety of combinations of any two or more of the spacing features described above, and others, could be used in a given system.

Because in many cases it is important for the sample space to be of small height and precise volume, it can be important that the lower surface on the chamber lid be very flat and smooth. Injection molding of the lid may not work well for this purpose.

Figure 15:
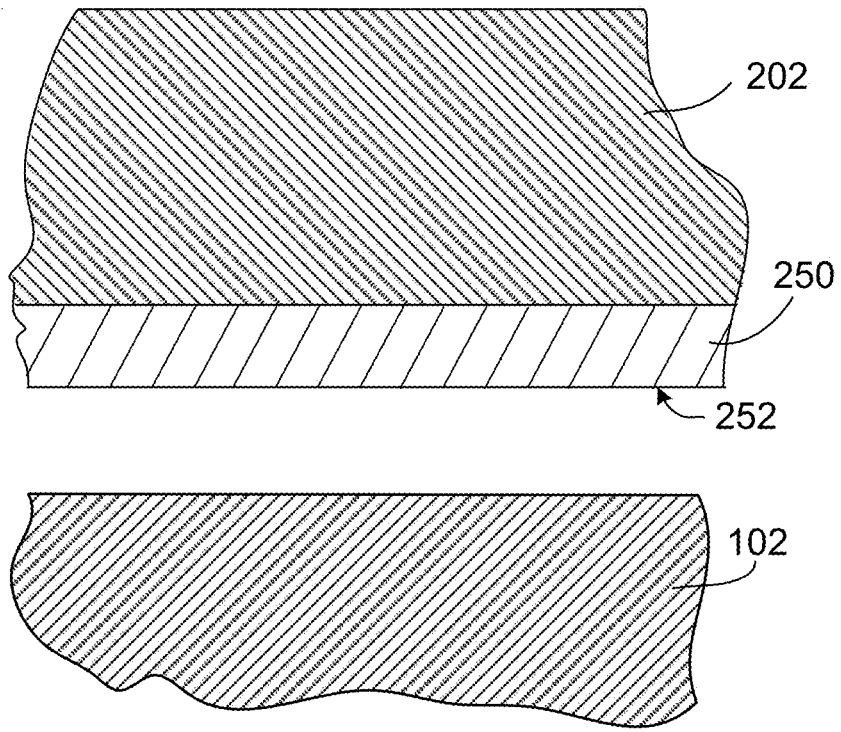

As shown in FIG. 15, in some examples, a glass insert 250 could be bonded (for example, using plasma bonding, or transparent epoxy or other adhesive) to the chamber lid or seated in the lid during fabrication when the material of the lid is semi-molten or semi-fluid. An exposed surface 252 of the glass insert could serve as the lower surface facing the sensor. Spacing features could be provided on or with the glass insert. In some cases, the glass insert could bonded to additional pieces of glass, or could itself be of a sufficient thickness, to comprise the chamber lid.

It can be desirable to bring the lid down smoothly and maintain its bottom parallel to the surface and to the exact intended final height above the surface. For this purpose a wide variety of devices can be used, including mechanisms that make use of gravity, magnetism, springs, motors, piezoelectric materials, parallelogram flexures, sidewall friction, and dashpots, and combinations of any two or more of them, for example.

It may also be useful to provide one or more ways to measure and assure the intended height, and therefore the volume, of the sample space in the chamber, including: absorbance using a known concentration of dye, counting of microbeads added in known concentration, and trigonometry with markers/spots on the bottom surface of the chamber lid illuminated from different positions or combinations of two or more of those and other approaches.

In some cases, the chamber lid, alone or with various additional layers and sheets, can be a disposable, single-use element of the system. In implementations of the kind that use reagents for fluorescence immunoassay or other chemical assays, as discussed later, the reagents could be printed or otherwise applied on the bottom of the disposable lid.

Some of the features that we have described to this point are especially useful for imaging of a static sample, that is, one that has been placed on the surface of the sensor and is held there during imaging, then removed and discarded.

In some implementations, that we sometimes refer to as flow systems or transport systems, the sample flows or is transported past the sensor and the imaging is done "on the fly". We sometimes use the phrase flow system to refer broadly to any system, including a transport system, in which the sample is, for example, transported past the sensor during imaging or between imaging events. Successive images can be captured as fast as the sensor is capable of capturing them. Depending on the speed of flow, this means that given sample units could be captured in more than one successive image, enabling, for example, computation of sub-pixel resolution images and three-dimensional structure of the sample units. In some cases, the flow speed and the image capture cycles could be timed so that each sample unit was imaged approximately only once.

Figure 16:
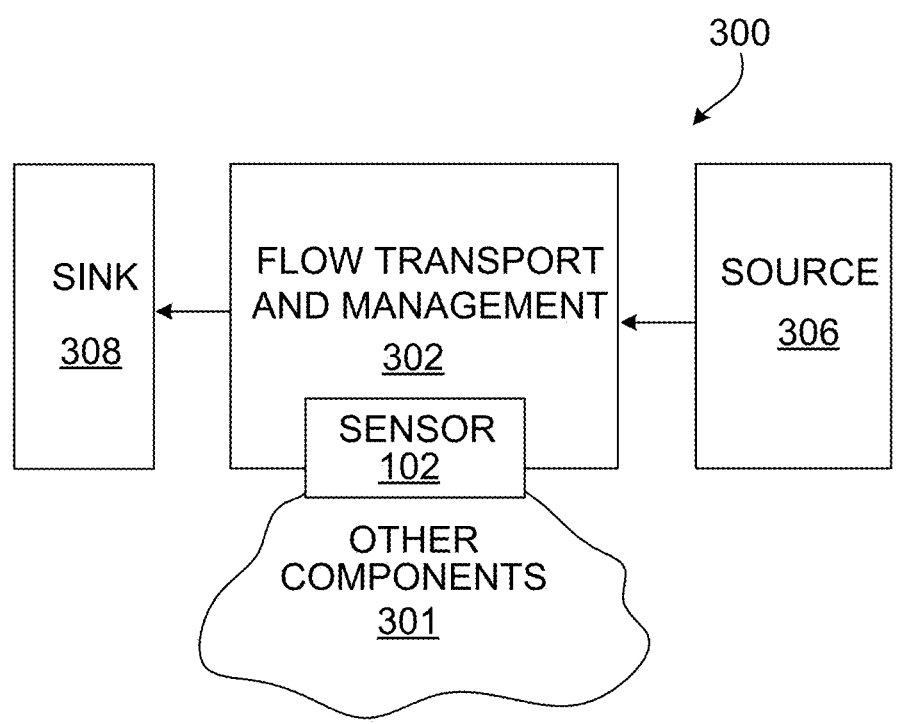
FIG. 16 is a schematic side view of elements useful to detect and use light representative of a sample.
Figure 17:
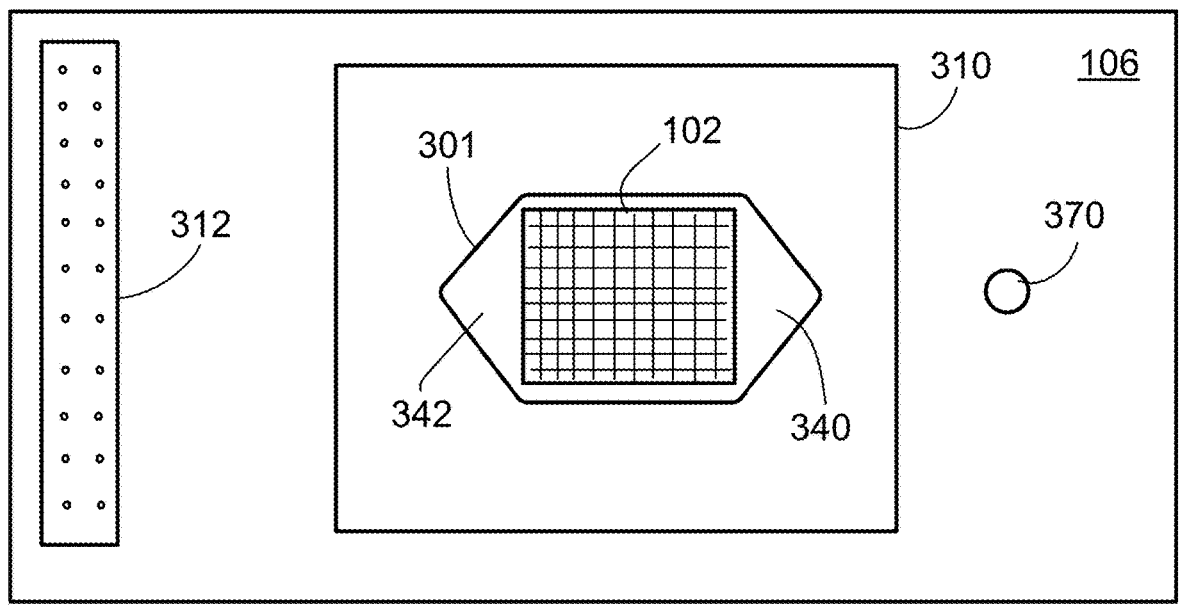
Figure 18:
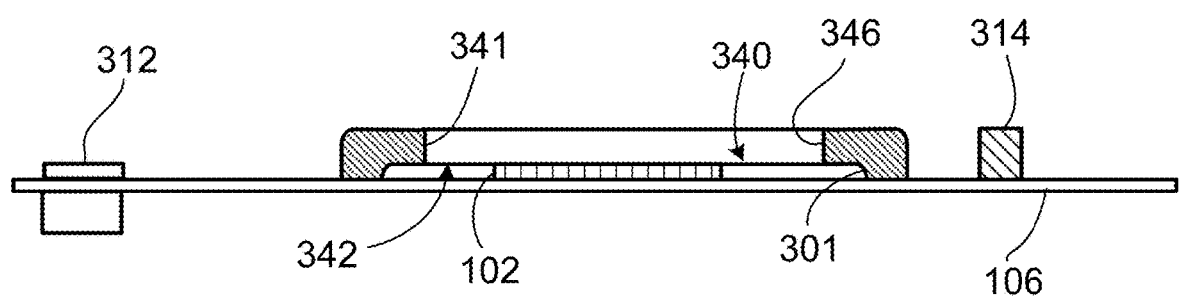
Figure 19:
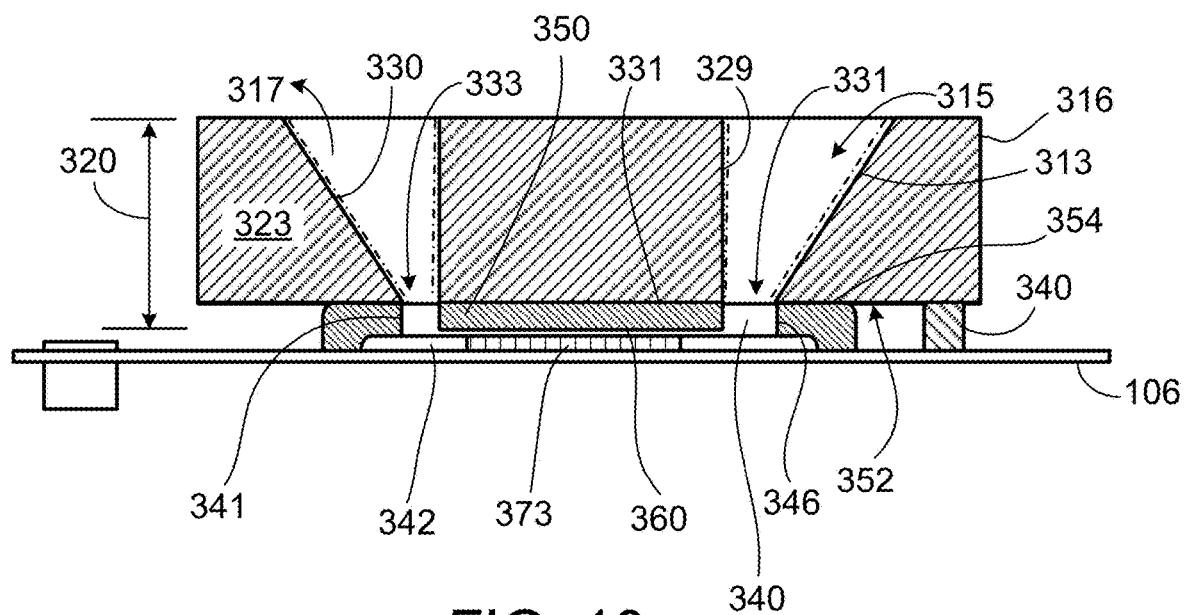
Figure 20:
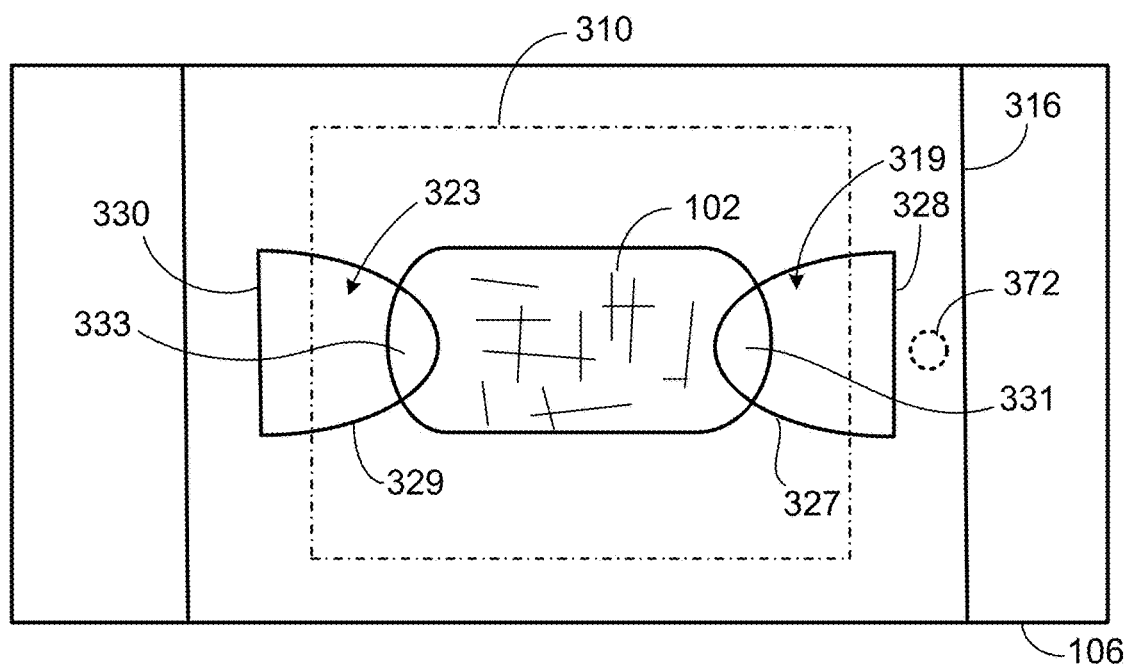

As shown in FIG. 16, a flow system 300 includes a sensor 102 and one or more of the related components 301 described with respect to FIG. 1, including one or more sample transport and management elements 302. In some instances, the flowing sample will be drawn from a sample source 306, which could be a supply of fluid, air, gas, powder, or any other material that can be drawn from a source and transported to and then placed at the sensor. The supply could be a limited sample the flow of which would start and end within a short period of time. Or the supply could be unlimited and the flow could continue for an indeterminate and potentially very long period of time. In some cases, the images could be taken only occasionally and in the periods between images, many sample units could pass the sensor without being imaged. Portions of the sample that have passed the sensor can be delivered to a sample sink 308 to be reused or discarded.

The flow transport and management elements can include mechanical and electromechanical elements, for example, that enable the sample to be withdrawn from the source and delivered to the sink, including conduits, pumps, reservoirs, meters, filters, passages, flow constraints, mixers, separators, cleaners, sources of reagents, diluents, and other materials to be mixed with the sample, and a wide variety of other processing and flow devices and materials as needed. The flow transport and management elements can be coupled to active elements of the system, including the imaging electronics and light sources, in order to coordinate the flow activities with the imaging by the sensor.

As shown in FIGS. 17 through 20, 54, and 55, in some implementations, the flow transport and management elements can include an optically transparent chamber lid 316 formed to include intake and discharge flow features 328 and 330 that provide flow paths for incoming portions 315 of the sample to be delivered in a flow to the sample chamber and for outgoing portions 317 of the sample to be conducted away from the sample chamber after being imaged. In the examples illustrated in the figures, each of the flow features includes a generally planar canted surface 319, 323 along which portions of the sample can flow and an elliptical surface 327, 329 that reduces the cross-section of the flow path to cause the portions of the sample to flow toward or away from a small opening 331, 333.

A region 301 (we sometimes use 301 to refer to the inner perimeter of encapsulation that defines the region 301) surrounding the sensor 102 is defined by an encapsulation feature 310 that has been formed of an encapsulating material such as an epoxy resin. The outer perimeter of the encapsulation feature is rectangular. The inner perimeter 301 is parallel to and near to two of the opposite edges of the sensor and forms generally triangular inbound and outbound reservoirs 340 and 342 bound by walls 346 and 341 at opposite ends of the sensor. Element 301 is continuous with 341 and 340 and also denotes where the encapsulation covers the edge of the imaging chip. A channel plate 350 is formed below or attached to the bottom of the main portion of the lid. When the lid is installed, the bottom surface 352 bears against the top surface 354 of the encapsulation feature. The distance by which the channel plate projects below the bottom surface of the main portion of the lid, the height of the sensor surface above the headboard, and the height of the top surface of the encapsulation feature above the headboard—and the flatness of the sensor surface, the top surface of the encapsulation feature, and the bottom surface of the main portion of the lid—are designed and fabricated so that a precise sample space 360 having predefined dimensions and configuration is formed. The overall height of the sample space can be on the order of 10-100 microns in some examples. One or more pins 370 projecting from the top surface of the headboard mate with one or more corresponding holes 372 on the lid to orient the lid properly when it is installed. The encapsulation feature can be formed of a somewhat resilient material such as PDMS so that when the lid is lowered the lid compresses the encapsulation feature slightly to form a liquid tight seal to reduce the chance of leakage of the sample from the encapsulated region. A connector 312 provides an electronic coupling from the headboard to the control unit.

The incoming portion 315 of the sample flows or is pumped down through the flow feature 328, through the small opening 331, into the inbound reservoir 340 and then into the sample space 360. The sample portion can be pumped into the sample space 360 or drawn into it by capillary action or suction. The outgoing portion 317 of the sample then can collect in the outbound reservoir 341 and be drawn up through the small hole 333, up through the flow feature 330 and away to a sample sink. (FIG. 50 shows a top view photograph of a version of the encapsulation feature on the sensor and headboard in which the encapsulation forms a rectangular well around the sensor, rather than the hexagonal well 301 of FIG. 17; in this case, diagonally opposite corners are used as inbound and outbound reservoirs 340 and 342.

In some implementations, the design of FIGS. 17 through 20 can be altered by providing a smaller chamber feature as illustrated in FIGS. 54 and 55 that is glued directly onto the inactive area of the sensor chip surrounding the active area. The lid can be glued directly onto the surface of the image sensor chip, inside a "dam-and-fill" encapsulation covering the sensor chip's bonding pads at its periphery; the polished surface on the underside of the central block of such a chamber (marked "Oberflache poliert" in FIG. 55) constituting the top of the imaging chamber.

In some examples, including applications that involve point-of-care blood analysis (discussed later), a wide variety of other configurations of chamber lid can be used. Some implementations may use an automatically height adjustable chamber lid 802, shown in FIG. 51 (without the lid in place), 52 (with the lid in place), and 53 (schematically in a side sectional broken view). For example, the chamber lid can be a rectangular transparent block (e.g., of PMMA) that includes an upper thinner broader top part 804 and a lower narrower thicker bottom part 806. The bottom part has a length and a width to fit (with a gap 808 of from about 10 μm to about 100 μm wide on all sides 810) into a corresponding aperture 812 (in a sensor-chip encapsulation 814 feature). The aperture is positioned over the active area 816 of the sensor. The lid, which we sometimes call a transparent block, can float up and down 818 within the aperture.

In use, a small volume (for example, about 10 μl) of diluted suspension of blood or other specimen and microbeads is deposited onto the active area, and the transparent block dropped onto it, within the aperture of the encapsulation feature. Capillarity between the suspension, the surface of the sensor, and the bottom surface of the block, augmented by the weight of the lid and, in some cases, magnets, spring clips, etc., produces a force that pulls the down on the lid until stopped by the microbeads, with excess blood escaping up along the gap at the sides of the aperture. This design yields a flexible chamber height and chamber volume (that is set by the choice of the size of the microbeads) and minimizes movement of the cells due to evaporation or settling. In some instances, the top part of the lid can be a glass square glued to the top surface of the block for ease of handling. A smaller square of glass or other optical window can be glued to the bottom surface for better flatness.

If the block, when dropped into the aperture, doesn't drop down with its bottom surface parallel to the sensor surface, then the blood sample may flow from the lower edge toward the higher edge of that bottom surface, producing a gradient of cell concentration across the sensor. This effect may be reduced by adding vanes and grooves along the perimeter walls of the block and the aperture in the encapsulation feature, or by increasing the height of the lower part of the block and the depth of the aperture, or by incorporating additional mechanical or electromechanical components to maintain parallel closure, to reduce or eliminate tilting of the lid as it slides into place.

Figure 21:
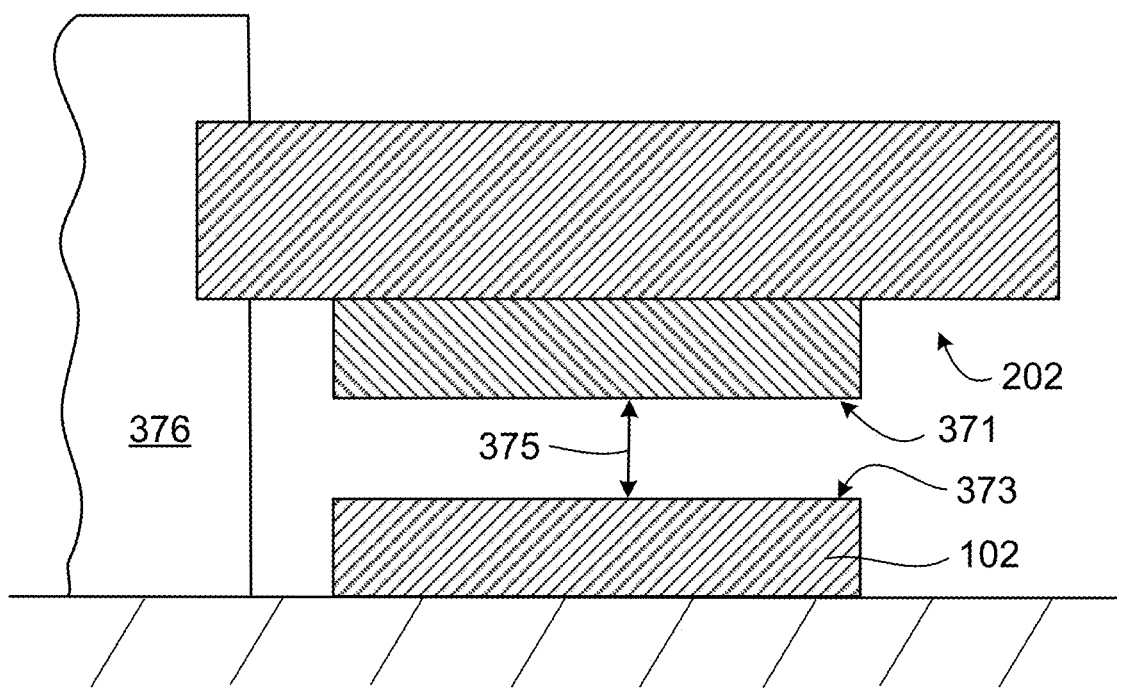

As shown in FIG. 21, in some implementations that could apply to both static and flow modes of operation, other arrangements may be useful to controllably adjust the gap between the bottom surface of the lid 371 and the top surface of the sensor 373. Making the gap adjustable enables the system to be adapted easily for samples that contain sample units of different sizes, for example, and also for different required sample volumes. A mechanism 376 (shown schematically in FIG. 21) can be used to permit the adjustment to reach any desired gap 375 in a range of values. A wide variety of mechanisms can be used. In some cases, they are manual. In some arrangements, they are automatic or semiautomatic. Among the possible mechanisms are a lens-mount screw ring, a lever arm, and screws, or combinations of them. Among the actuators that might be used are electromechanical actuators including motors and piezoelectric elements, or combinations of them, and hydraulic actuators. The shape and size of the lid could be changed to facilitate the adjustment mechanism. For example, the lid could be cylindrical and bear external threads to mate with internal threads on a large "bolt" so that turning the lid would adjust the size of the gap. The bottom portion of the lid could be a simple plano lens. The lid could be a non-rotating plate attached to the surface of the headboard, for example, by a compliant gasket so that the gap could be adjusted by the adjustment mechanism.

Figure 22:
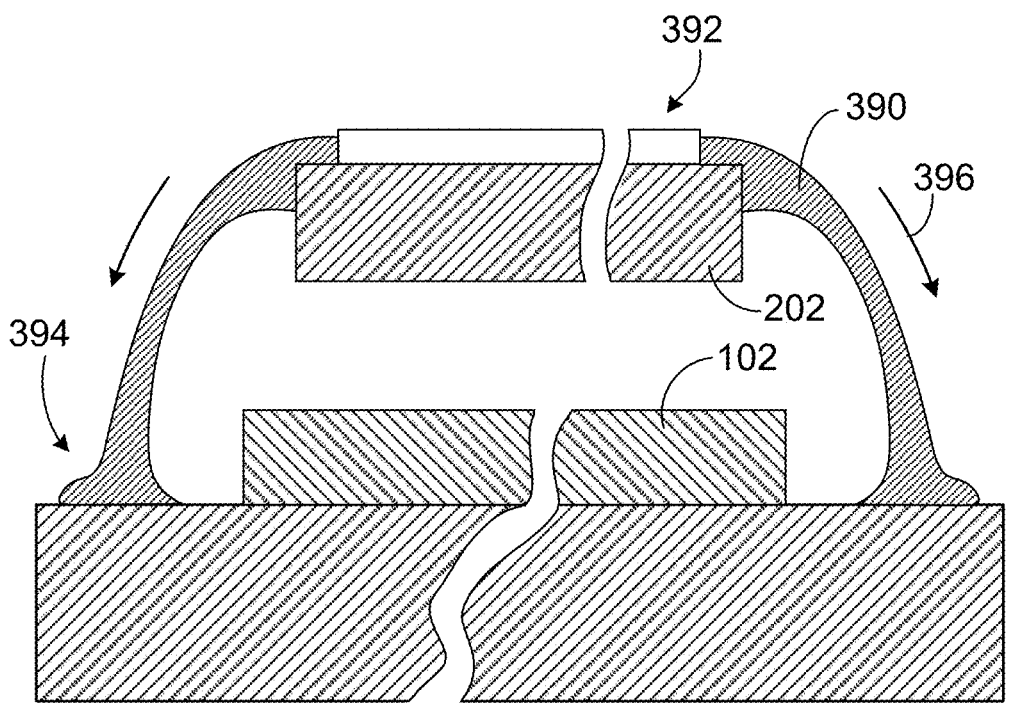

In some cases, as shown in FIG. 22, the chamber lid could be suspended by attaching it at an aperture 392 in a balloon 390 having a cylindrical or other closed shape, the perimeter 394 of which is attached to the chip or headboard. The balloon could provide a tension 396 pulling down on the lid and at the same time serve as a gasket to contain a fluid sample.

In some uses, the bottom of the lid and the top of the sensor need not be parallel. In some cases, it may be useful to arrange the bottom of the lid to provide a gap 375 that is thicker at one end than the other. If such a tilt is oriented perpendicular to the direction of fluid flow, this can provide a simple method of physically sorting flowing particles by size during observation. By such means the chamber can be progressively reduced to a vanishing height, such that the minimal volumes overlying some pixels contain only single sample units, such as single fluorescent or otherwise detectable molecules. If the bottom surface of the lid is convex, the region of such vanishing chamber height can be swept to different positions across the sensor by tipping or tilting the lid. A wide variety of other configurations of the gap can be established. Such arrangements can be useful particularly in static modes.

The dimensions of the sensor surface may be chosen to be the largest available dimensions in order to provide the largest area for imaging or counting or other applications of the system. In some implementations, however, it may be useful to have a smaller (e.g., a much smaller) sensor so that the sensor and its supporting elements can be delivered to enclosed or otherwise difficult to reach locations. In some implementations, for which larger overall sensing areas are useful, sensors can be tiled to form a much larger sensor surface. For example, very wide field high resolution microscopy may be possible by tiling multiple sensors together into a large and virtually seamless mosaic, using three-sided buttable CMOS image sensor array architecture such as described in U.S. Pat. No. 7,009,646, incorporated here by reference.

A large sensor area can be particularly useful in applications that involve statistical analysis. For example, in blood cell counting, an assumption is made that any portion of a patient's blood in general has the same constituents in the same proportions as indicated by the count performed on a relatively small sample as any other portion. By providing a larger sample and a correspondingly larger sensor area, the statistical accuracy of the count increases. Another consideration in whether or not to tile sensors is that larger sensors are generally more than proportionately expensive because of the rate at which fabricated sensors have flaws requiring them to be discarded during manufacture. Although tiling may present difficulties in mounting, signal coordination, and uniformity of light sensitivity, in some applications, a compromise between using smaller cheaper tiled sensors and using a single larger un-tiled sensor can be made based on the requirements. In addition to tiling to create a single contiguous larger sensor area, multiple non-contiguous sensors can be used in parallel in some applications to achieve similar statistical benefits, as discussed below.

The dimensions of the sensor, the pitch of the pixels on the sensor, and the total number of pixels in each of two orthogonal dimensions can vary widely depending on the application, cost, and available technology. For example each dimension of the sensor could be in the range of 0.1 millimeters to 10 centimeters, the total number of pixels could be in the order of 5 thousands to 100 billions, and the pitch could be on the order of 0.1 microns to 5 microns.

As shown in FIG. 23, in some instances, a relatively small surface area sensor 401 (for example, a 80 pixel by 80 pixel sensor) could be mounted on a tool 403 in the vicinity of one or more light source 405. The tool could be small enough, for example, no larger than 0.1 millimeters across, to allow the tool to be inserted into a hidden or closed or otherwise inaccessible space 409 in a body 411 for inspection of some material 413 within that space or a surface 415 of a wall of the space. The tool could include an extension 407 that could be as long as needed to reach into the inaccessible space and could include devices within or surrounding the tool or extension to enable the user to manipulate the tool from an end opposite the sensor. In some implementations, the tool could be relatively small, without such an extension, and could be moved passively, e.g., by peristalsis along the gut, or actively using incorporated miniature motors, wheels, treads, propellers, jets, or other means of propulsion or combinations of them. In some instances, the sensor is mounted to project beyond the surface of the tool so that the tool could be manipulated to press the surface of the sensor against the material within the space, for imaging or counting. Light from the source 405 could be reflected from the material or transmitted through the material to reach the sensor. A controller 417 could include mechanical, electromechanical, or electronic elements used to manipulate, trigger, and receive output signals from the tool, the light, and the sensor, by wire in the case of a tool with extension, or by wireless transmission in the case of a small tool or in some cases a combination of them. (In FIG. 23, the sensor is not shown in contact with the material that is being imaged, for ease of understanding the figure.)

Various implementations can be used for microscopic examination of diverse solid materials, living as well as inanimate, if the material is transparent, translucent or light-scattering, and has a surface that can be brought into contact with the sensor surface. This will be particularly the case for materials with smooth, flat surfaces, and for deformable materials, which can make close contact with the sensor surface to produce sharp images of good resolution. In some instances, the tool could be an endoscope used either for inspection or inspection and procedures on tissue within a patient's body. During inspection, the user could trigger the capturing of images of the wall of the interior of the patient's body or of material within it, including blood, bone, muscle, skin, cartilage, or other materials. Typically viewing materials using endoscopy tends to be a type of macroscopy. By means of the system that we describe here, an aspect of microscopy, "endomicroscopy", can be included in the process of using an endoscope, either alone or in combination with a standard macroscopic endoscope. Methods for carrying out endomicroscopy have been described previously (e.g., Watson T F, Neil M A, Juskaitis R, Cook R J, and Wilson T 2002 "Video-rate confocal endoscopy", J Microsc. 207:37-42; U.S. Pat. Nos. 7,267,647; 7,330,305; US 2003/0233028 A1; US 2008/0013900 A1 among many) but have been more complex and expensive than the system described here. See also US 2011/0063428 Ai, which uses very small format CMOS sensors.

In some instances, the tool could also carry materials used for cytochemical and histochemical analysis, including dyes, stains, antibodies, and other specific ligands and combinations of any two or more of them. In some instances, use of the endoscope in such an analytical mode to provide "optical biopsies" could reduce the need for ordinary biopsy, accelerate the obtaining of results, save money, and be more convenient and easy to use.

Among many applications, implementations can be used for intraoperative pathology in which internal organs or other bodily tissues can be examined in situ simply by pressing the sensor against the external surface of the tissue, or against an interior surface of the tissue created or exposed by surgery. For typical cases, the sensor could have a large light sensitive area. Tissue may be viewed unstained, as illustrated in FIG. 39 which shows low magnification and high magnification images (upper and lower images, respectively) of collapsed alveoli in a fresh living transected neonatal rat lung obtained with such an implementation, or after application of various contrast agents such as vital stains or fluorescent dyes, as noted above. These implementations allow pathological evaluation, as for detection of cancerous tissue remaining after surgical resection of the main tumor mass (see, e.g., US 2011/0280820 A1, incorporated by reference), without requiring excision of additional potentially healthy tissue, and without requiring laborious and time-consuming tissue freezing or fixation, sectioning, mounting and staining according to ordinary histological methods, a substantial advantage when microscopic analysis is required during the course of surgery. A further important advantage over standard biopsy is that these implementations can image a potentially unlimited area of tissue simply by moving the sensor along the tissue for sequential images. Images acquired using these implementations can be transmitted to pathologists near to or distant from the operating theater, using standard telecommunication and internet capabilities as described above.

In some cases, the tool can be used for non-medical purposes, for example for inspection inside a pipe or tube or bore hole or other non-living-body cavity.

In implementations of the system, the light used to illuminate the sample units can have a wide variety of wavelengths and bands of wavelengths, intensities, durations, coherence and direction, among other characteristics. In addition, the light can be provided from a wide variety of sources and types of sources having various locations with respect to the sample units, the sensor, and the system. In some instances the light can be unprocessed and unaltered ambient light. In some cases, the light can be carefully controlled in each or two or more of the parameters mentioned above and the sensor can be screened to assure that only the controlled light reaches the sample units or the sensor. In some cases, the illuminating light will serve to excite fluorescence in the sample units, and the sensor will be designed to respond only to the fluorescence. In some cases, the light will originate within the sample unit itself, as, for example, from chemiluminescence, bioluminescence, sonoluminscence, and electroluminescence, and combinations of two or more of them.

As shown in FIG. 24, a wide variety of control electronics 400 can be provided within one or two or more elements of the system and in devices external to the system 404 to control light controlling devices 402 according to each or two or more of the light parameters mentioned. The electronics 400 can also control the light controlling devices in coordination with the operation of the system 404. The coordination can be done over time, with respect to spatial locations, and in other ways.

In many applications, it is possible and desirable for the sample units to make direct contact with the active sensing area of the fabricated sensor, without any material or coating or layer interposed between the sample units and the sensor. The closer the sample units can be to the chip-level features that perform the light sensing, the higher can be the resolution of (e.g., the sharper and less blurred can be) the resulting images. Thus thinned back-illuminated silicon image sensors, as illustrated in FIG. 56, represent a useful embodiment, because they reduce the distance between sample unit 831 and the photodiode portion 832 of each pixel of the sensor, the region that responds to light 833 when an incident photon generates an electron-hole pair 834 the electron of which is then detected by the associated pixel readout circuit 835.

For some applications, however, layers or coatings or materials can be placed on the sensor surface. We will sometimes refer to these very broadly by the term layers. When layers are used, there can be one or more than one layer. The layers can be applied by a wide variety of techniques including printing, deposition, coating, gluing, sputtering, gravity, molecular forces, and others, and combinations of any two or more of them. The layers can be rigid or flexible, for example.

The layers could include thin film coatings (e.g., diamond, $Al_2O_3$, parylenes [poly(p-xylylene)-derived polymers], or others). which can be deposited in nanometer to many micron thickness in various ways such as chemical vapor deposition) to protect the sensor surface against wear such as abrasion from flowing particles, cleaning, and other influences. Protection from abrasion and other damage is an important practical consideration with commercial significance. Layers can also include coatings (e.g., silanes, antibodies, or other macromolecules) to reduce non-specific adhesion or to increase adhesion (either non-specifically or, as for antibodies, with high specificity), to reduce or increase friction, to reduce or increase hydrophobicity, or combinations of those and other effects.

Figure 58:
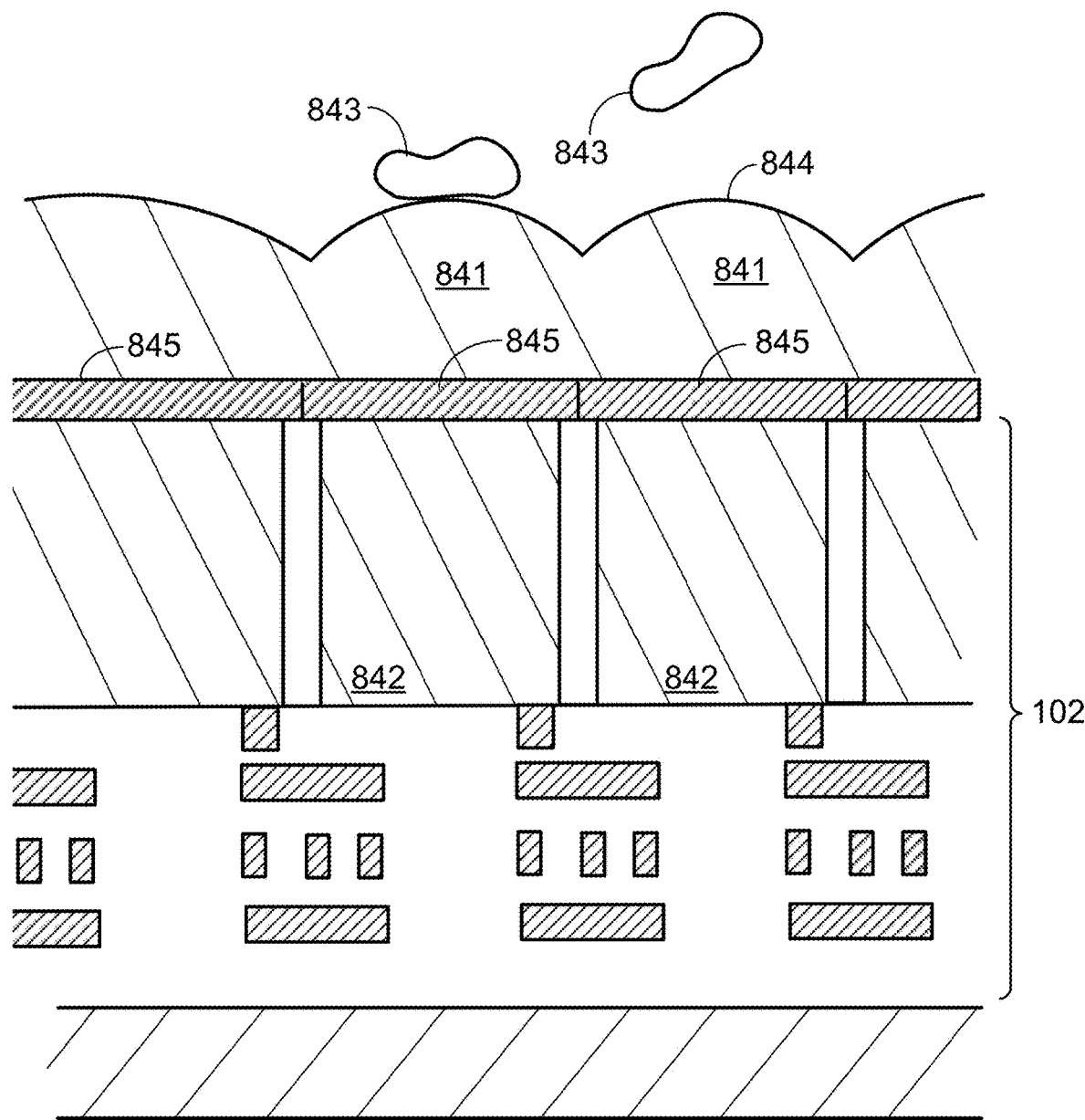

CMOS image sensors typically include microlens arrays arranged over the pixels, one microlens per pixel. and color filters underlying the microlenses. In many of the examples that we have described, the light sensitive elements of the sensors are not overlaid by such microlens arrays or color filters or both. In some implementations, however, as shown in FIG. 58, the layers on the sensor 102 can include a microlens array having one microlens 841, and in some cases one color filter 845, per pixel 842. The microlens over each pixel in such implementations offers some potential advantages, including slightly increased sensitivity. When such a microlens array is included, the relationship between resolution of the image and the distance of the sample, as we have discussed it above, can be recast in terms of distance of the specimen 843 from the microlens surface 844.

In some cases, one or more layers put on the sensor surface can be used for purposes related to the illumination of the sample units.

Figure 25:
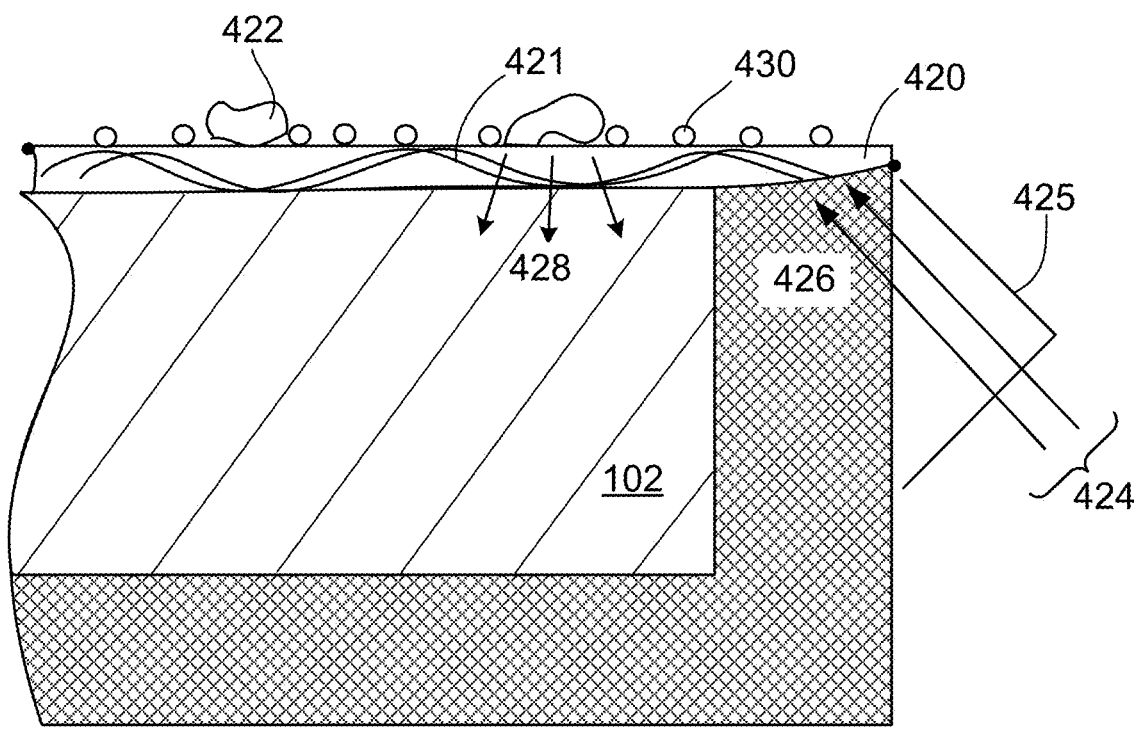

For example, as shown in FIG. 25, a gold film surface 420 could be provided as a layer on the surface of the sensor 102 to permit surface plasmon 421 excitation of sample fluorescent molecules or particles 422 that are on or very close to the exposed surface of the gold film. By introducing the surface plasmon illumination 424, e.g., using a prism 425, to regions 426 of the gold film that are beyond the light-sensitive active area of the sensor, the surface plasmon illumination should not be detected by the sensor. But the surface plasmon polariton can propagate in the film across the active area of the sensor. Fluorescence 428 emitted by the fluorescent molecules on the film in the active area should be detected by the sensor, either because the gold film is sufficiently thin as to be transparent, or because it is patterned so as to leave one or more gap over the surface of each pixel of the sensor.

In this way, fluorescence imaging of the sample fluorescent molecules should be possible directly at any wavelength by varying the wavelength of the peripheral illumination and without the need for wavelength-specific filters to block the illumination as would be the case if it were impinging directly onto the sensor. The efficiency of the fluorescence excitation of the sample units can be increased by incorporating resonance enhancing structures on or attached to the surface. For example, gold nanoparticles 430 could be provided on the surface for that purpose.

In some implementations, the surface plasmon can be used itself for surface plasmon resonance measurements, for example, of molecular binding. In some cases, the surface plasmon resonance measurement can be done simultaneously with the fluorescence imaging, with fluorescence correlation spectroscopy, and with other fluorescence measurement techniques, in combination.

The layer need not be a gold film but could be any other material transparent to light that is to reach the sensor and is characterized by surface plasmon behavior that would be suitable for causing the fluorescence of the molecules.

Alternatively, the layer can be of thicker, non-transparent gold or other material that supports surface plasmons, if the layer is deposited as so-called nanowires less than 1 μm wide, extending from outside the active area into the active area. Such nanowires are capable of relatively long-range propagation of surface plasmon polaritons (see, e.g., K. Leosson et al., Optics Express 14 (2006) 314-319, incorporated here by reference). Provided that these strips only partially cover the surface of the pixels they traverse, at least a portion of the fluorescent photons emitted by fluorophores close to the nanowire can pass into the light sensitive portions of the sensor through the uncovered portions of its surface.

Figure 26:
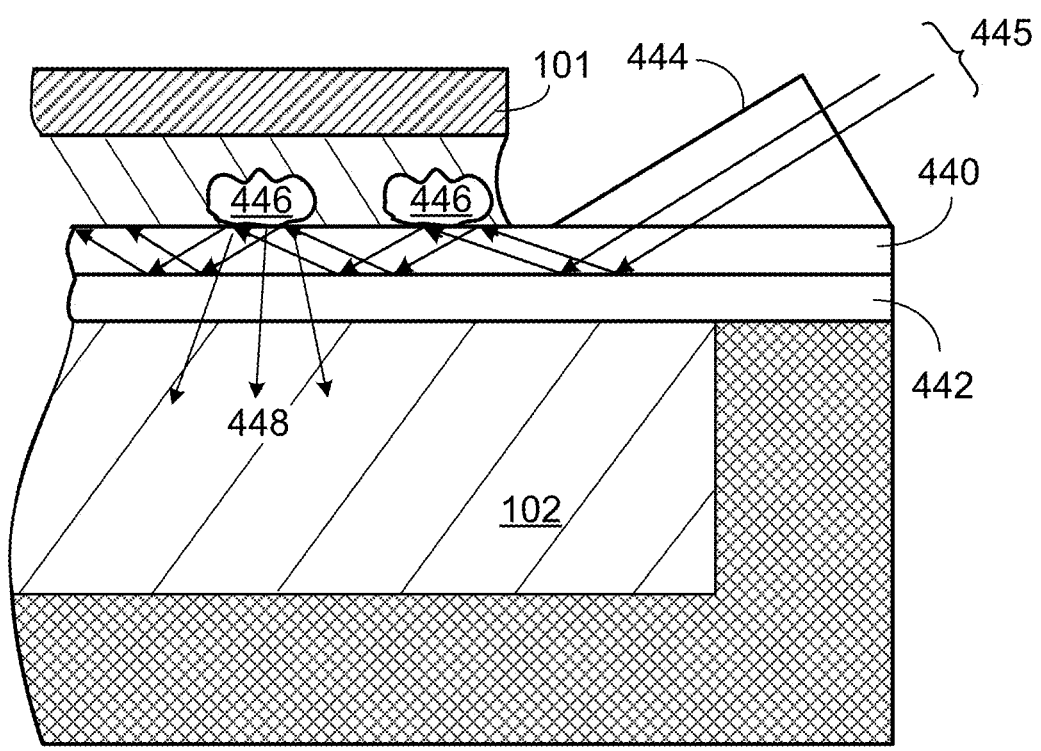

Other techniques could be used to achieve fluorescence imaging at any arbitrary wavelength and without blocking filters interposed in front of the sensor. In some cases, total internal reflectance fluorescence of fluorophores on or very close to the surface can be used in conjunction with the system for that purpose. As shown in FIG. 26, a thin layer 440 (for example, 100 nm thick) of a transparent high index of refraction material (such as $TiO_2$) is placed on a thin layer 442 of a transparent material having a lower index of refraction (such as $SiO_2$) which is in turn placed on the silicon sensor surface. Light 445 at the excitation wavelength is introduced obliquely into the high index layer 440 through a prismatic surface feature 444, such that the light encounters the interface between the higher and lower index layers (as well as the interface between the high index layer and the water or air medium 101 containing the specimen 446) at an angle beyond the critical angle for total internal reflection. The introduced light thus propagates in the high-index layer but is contained in that layer by total internal reflection and therefore does not reach and is not detected by the sensor. However, the evanescent wave of the propagated excitation light excites fluorophores 447 within the specimen 446 sufficiently close to the surface of the high index layer, resulting in fluorescence emission 448 would encounter the index interfaces at less than the critical angle, and would thus pass through the layers into the sensor 102.

A wide variety of techniques and devices can be used to deliver light to the sample units and from the sample units to the sensor. Whatever the illumination technique, it is useful in many applications to provide illumination that is uniform across the sensor.

One of the simplest approaches is to rely on ambient light to illuminate the sample units. The availability of ambient light almost everywhere from daylight or building illumination makes some applications and uses of the system especially inexpensive and viable all over the world, including in remote locations.

Figure 27:
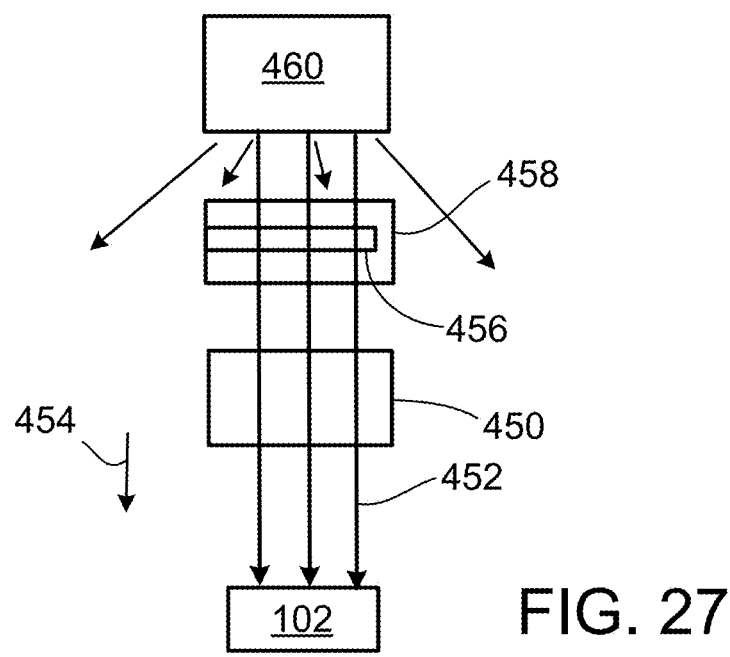

As shown in FIG. 27, in some applications, it is useful to provide a mechanism 450 for collimating light 452 so that it arrives at all parts of the sensor from essentially the same direction 454. In order to capture full color images of the sample units, or in some cases images at specific wavelengths or bands of wavelengths for a variety of purposes, it is also useful to provide a filter mechanism 456 that is designed to enable filters 458 to be interposed between a polychromatic light source 460 and the sensor surface. The filter mechanism can be arranged so that the filters can be applied in any sequence and switched at high speed. In some cases, the light source may comprise monochromatic or quasi-monochromatic sources such as LEDs or lasers that can be switched at high speed. In some implementations, it is desirable to provide a sensor that is a monochromatic sensor without any incorporated filtering devices.

The collimating device can be as simple as a pinhole in a sheet of opaque material. In some cases, the collimator could be a massively parallel microchannel (also referred to as micropore) plate in the form of a very dense array of parallel tubes or optical fibers. In some applications, optical lenses could be used for collimation.

In some examples, the sample, light source, sensor, and other elements of the system are held in an enclosure or a partial enclosure that can have opaque walls, for example, to exclude or reduce ambient light and permit the light within the enclosure to be carefully controlled as to intensity, spectral qualities, direction, distance to the sensor and other parameters. In some instances, there is no enclosure and the light is controlled in conjunction with the ambient light. In some implementations, ambient light and a controlled light source combine to provide light for imaging at the sensor.

A wide variety of illumination arrangements are therefore possible.

In one example illumination setup, an LED light source is arranged with one or more lenses, reflectors, or other collimating devices between the source and the sample. The LED light source could be a single LED having selected spectral characteristics, or the LED light source could be an array of monochrome LEDs or an array of composite narrow-band sources such as red, green and blue LEDs or lasers, or a miniaturized color display such a liquid crystal (LCD) or organic LED (OLED) display or RGB laser color projection display that can be controlled to provide light over a range of color and intensity at any position on the array. Importantly, full color images can be acquired using a monochrome (black and white) sensor by appropriately combining images obtained sequentially with such red, green, and blue light sources. The array may be arranged as a dome aimed at the center of the sensor, in some cases. In some examples, a single light source (monochrome or RGB) can be physically scanned through a range of positions. In some examples a projection display or array can be (e.g., in raster mode) scanned electronically through a range of positions.

An anamorphic reflector pair or prism can serve as a particularly useful collimating optic for such array scanning, as illustrated in FIG. 62. Light from a point 1000 on the OLED array 1001 that enters a suitable and appropriately positioned anamorphic prism 1002 is internally reflected from convex 1003 and concave 1004 internal surfaces, and emerges as a collimated beam 1008 that passes through the specimen chamber 1006 to fill the image sensor active area 1005. Light from any other point 1007 similarly emerges from the anamorphic prism as a collimated beam 1009, but impinges on the image sensor from a different angle. Images can be collected using illumination from one position of the array at a time, and the cumulative results integrated to achieve-sub-pixel resolution (higher than the native resolution of the sensor) according to known algorithms (for example, the algorithms described in Irani, M. and Peleg, S. (1991) Improving resolution by image registration. CVGIP: Graphical Models and Image Processing 53:231-239; A. M. Tekalp, M. K. Ozkan, and M. I. Sezan, (1992) "High-Resolution Image Reconstruction for Lower-Resolution Image Sequences and Space-Varying Image Restoration," IEEE International Conference on Acoustics, Speech, and Signal Processing (San Francisco, CA), pp. III-169-172, Mar. 23-26, 1992; Hardie R, et al. (1997) Joint MAP registration and high-resolution image estimation using a sequence of undersampled images. IEEE Trans Image Process 6:1621-1633; Elad M, Hel-Or Y (2001) A fast super-resolution reconstruction algorithm for pure-translational motion and common space-invariant blur. IEEE Trans Image Process 10:1187-1193; Farsiu S, et al. (2004) Fast and robust multiframe super resolution. IEEE Trans Image Process 13:1327-1344; Farsiu S, et al. (2006) Multiframe demosaicing and super-resolution of color images. IEEE Trans Image Process 15:141-159., incorporated here by reference.).

As shown in FIG. 60, if broadband illumination 940 is used, the wavelength components can be dispersed by various devices such as a prism or diffraction grating 950. By orienting this dispersion from long wavelengths (e.g., red, 952) to short wavelengths (e.g., violet, 954) across one dimension of the sensor pixel array (960), it is possible to carry out absorbance spectroscopy of the sample without moving parts. If the sample is homogeneous, a single image may suffice. If the sample is a suspension of heterogeneous particles, absorbance spectra of individual particles can be carried out by tracking the particles in successive frames as they flow parallel to the axis of the spectral dispersion, thereby encountering illumination of incrementally changing wavelength in successive frames. Sensors with large numbers of small pixels can yield high spectral resolution by these means.

A wide range of modes of illumination are also possible relating to its direction, polarization, and propagation, among other things.

In some implementations, the light is received at the sensor from a direction normal to the sensor or otherwise at an angle that allows the light to pass directly through the sample and any layers on the sensor to the sensor surface.

Figure 28:
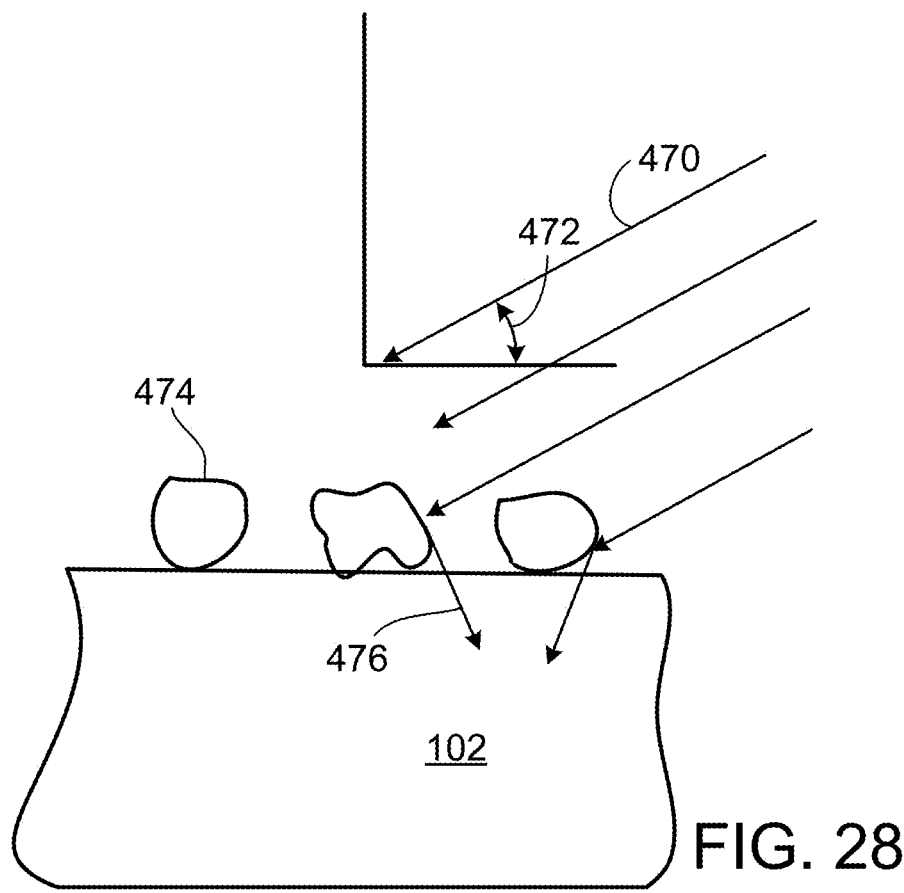

In some implementations, as shown in FIG. 28, the sensor 102 is operated in a dark-field illumination mode in which most of the direct light from the light source cannot be absorbed by the sensor. In some cases, the light is directed towards the sample units 474 at an oblique angle 472 such that it is mainly reflected from the sensor surface. If sample units scatter the incident light, then at least some of the scattered light 476 strikes the sensor surface at a less oblique angle and can efficiently enter and be detected by the sensor. In some embodiments, the light is directed at an angle that is close to 0 degrees to the sensor surface, i.e., as "grazing" illumination. Among the advantages of such dark-field illumination is that it permits detection of features that differ little in absorbance from their surrounding (and thus are difficult to detect by ordinary transmission imaging) if they differ in index of refraction; minimally-absorbing (i.e., dim) objects that are smaller than a pixel of the sensor (sub-pixel features) can be easily imaged this way because by scattering light they constitute bright points visible with high contrast against a dark background.

Figure 29:
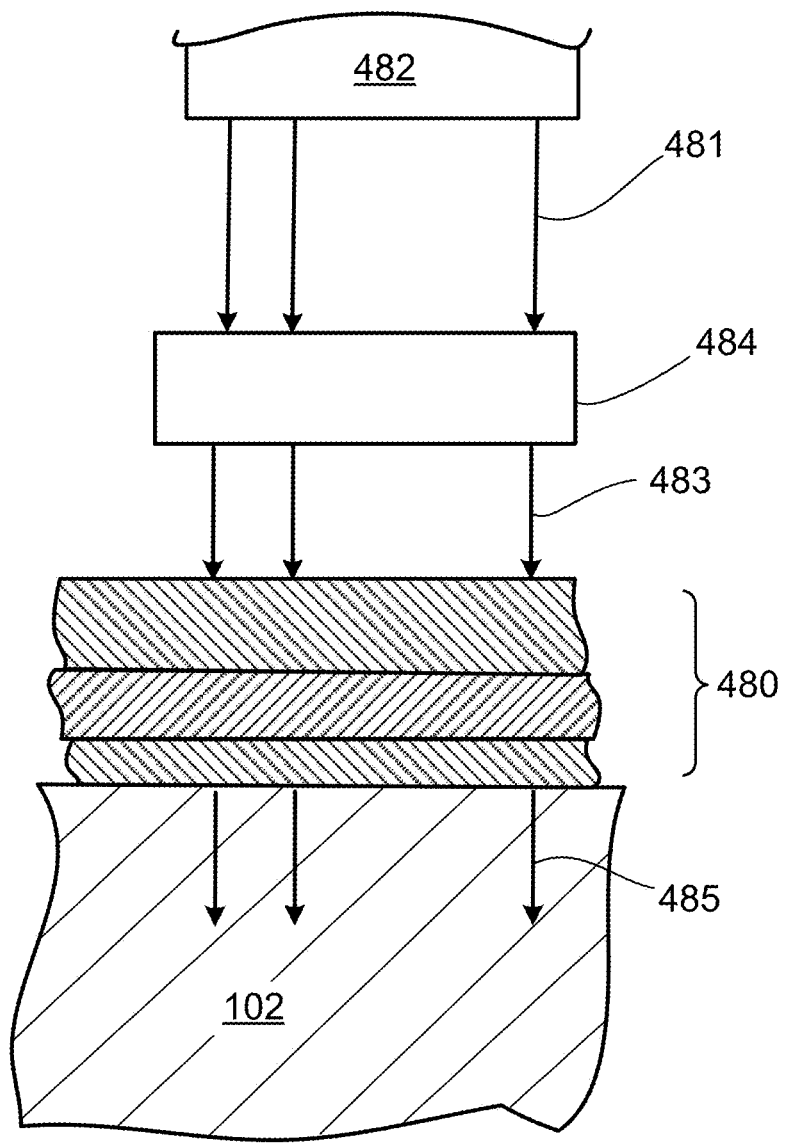

Some modes of illumination can take advantage of the polarization properties of light and films to permit the system to be used in a polarization microscopy mode. As shown in FIG. 29, in such a mode, the sensor can be covered with one or more thin film layers 480 that allow only light of predefined polarizations 485 to pass to the sensor. In addition a filter 484 associated with the light source can be arranged to pass only light of predefined polarizations 483. The combination of the light source filter and the layers on the sensor enable a wide variety of polarization techniques to be used for imaging and image analysis. For example, regions of the specimen where molecules are regularly aligned may exhibit birefringence detectable through such crossed polarizers as increased brightness when appropriately oriented, allowing enhanced visualization of certain crystalline materials or biological structures such as mitotic apparatus or striated muscle.

In some examples, polarization microscopy is possible without a thin film polarizer on the sensor, by taking advantage of a well-known behavior of polarized light at the boundary between media of different indices of refraction, as described by the Fresnel equations. Thus p-polarized light incident on the sensor surface at Brewster's angle will enter the sensor with high efficiency, creating a bright field against which appropriately oriented birefringent materials in the specimen will display enhanced contrast.

Fluorescence of sample units offers a wide range of imaging opportunities in the system that we are describing. In general, fluorescence in the sample units can be excited by light at a relatively shorter wavelength to cause emission at a relatively longer wavelength.

Although we use the term fluorescence in our descriptions, useful modes of operation are available in which the excited state lifetime of the light-emitting molecule or particle is longer than nanoseconds;

these analogous phenomena are sometimes referred to as luminescence and phosphorescence.

In some implementations, sample units that are not themselves fluorescent can be tagged using fluorescent tagging molecules or particles. With particularly bright tags such as quantum dots, it is possible to follow the movement of an individual molecule to which such bright fluorescent particles are bound.

Figure 30:
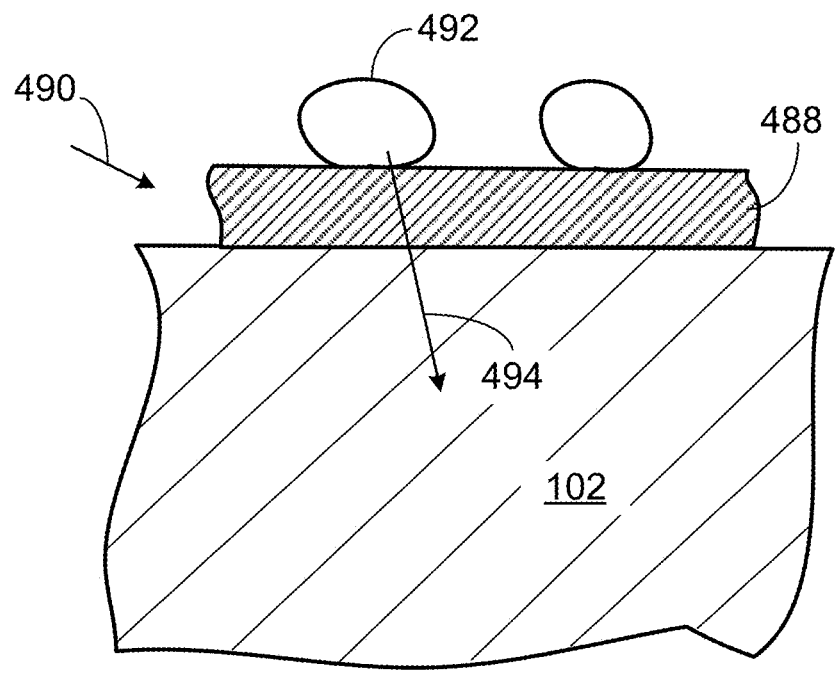

As shown in FIG. 30, in fluorescence imaging, the light emitted 494 from the sample unit 492 is often several orders of magnitude less intense at the sensor than the excitation light 490 delivered from the source. In order to detect the light reaching the sensor from the sample units effectively it is useful to block the source light from reaching the sensor. In the context of an ordinary optical microscope, this can be done by a spectral (e.g., long-pass or band-pass) emission filter between the sample and the sensor. In the system that we describe in which the sample is in contact with the sensor there is essentially no space for such a filter. An ordinary emission filter that is typically more than 1 mm thick would separate the sample from the sensor by a distance leading to loss of resolution. To the extent that a filter 488 is to be interposed on the surface of the sensor in our system, the filter should be as thin as possible.

Figure 31:
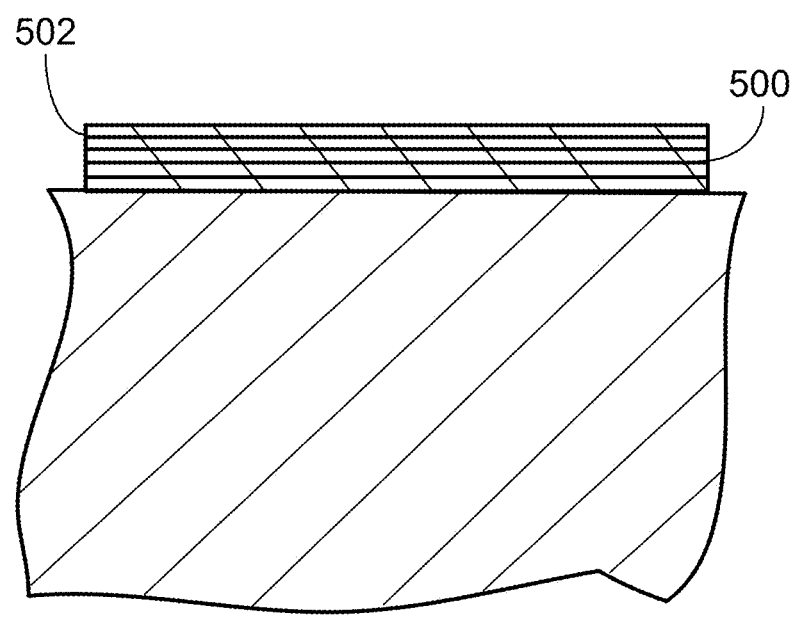

As shown in FIG. 31, a very thin filter 500 can be formed on the sensor in our system by a set of layers of sufficiently transparent materials of alternating high and low index of refraction 502 that cause destructive interference at the wavelength of the light that is to be filtered out. Such a set, tailored to block the unwanted (excitation) wavelength of light, can constitute a Bragg reflector, and is commonly constructed as a quarter-wave stack, with alternate layers deposited at respective thicknesses equal to $\lambda/4\ n_H$ and $\lambda/4n_L$, where $\lambda$ is the wavelength to be blocked (i.e., reflected), and $n_H$ and $n_L$ are the refractive indices of the high-index and low-index materials, respectively, at that wavelength. Many materials can be deposited as such layers, for example, alternating layers of $TiO_2$ and $SiO_2$.

Another approach to discriminating between the incident light and the light from the sample units would take advantage of the intrinsic responsiveness of silicon in the sensor to light. Silicon image sensors typically do not respond to light in the deep ultraviolet range. Therefore by using a source of light at a wavelength within the deep ultraviolet range and detecting light that results from fluorescence at wavelengths longer than that range, the imaging can proceed effectively.

Figure 40:
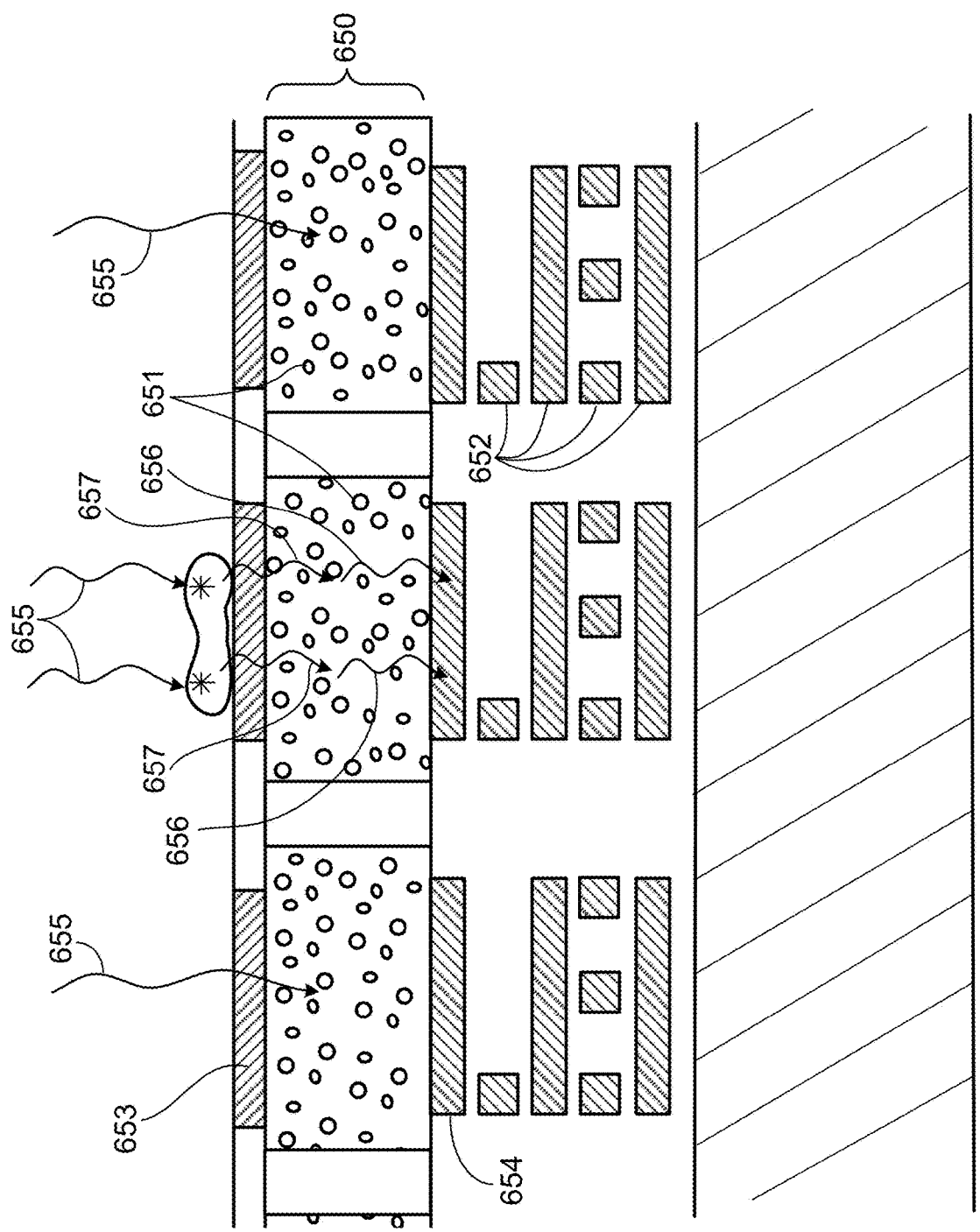

Some approaches to discriminating between the incident light and the light from the sample units would use sensors employing quantum dot photodetector technology as shown in FIG. 40. In examples of such sensors, the photosensitive layer 650 of the sensor includes suitable quantum dots 651, which may be multi-exciton-generating particles for improved photoresponse outside the useful range of ordinary CMOS devices as described by V. Sukhovatkin et al., Science 324 (2009) 1542-1544 and in U.S. Pat. No. 8,310,022 or may be mixed with fullerenes as described in United States patent application 2012/0223291 A1, all incorporated here by reference, between voltage-biased conductive layers (electrodes), the superficial one of which 653, at least, is transparent. Charge 656 due, e.g., to electron-hole pair generation by absorbed photons is read-out by circuitry 652 from the deeper conductive layer 654, in a manner similar to a back-illuminated CMOS image sensor. In some implementations of our systems, this approach offers the advantage that, because suitable quantum dots can be made over a range of activation wavelengths, this type of sensor can be designed to respond to wavelengths 657 in the emission band, but not wavelengths 655 in the excitation band, of particular fluorescent probes. Thus such suitably designed image sensors could be used to carry out fluorescence microscopy with the sample 658 in contact with the sensor, e.g., apposed to the transparent superficial conductive layer 653, using those particular probes, without need to interpose any additional spectral filter between the specimen and the surface of the image sensor.

Additionally, in some low-light implementations such as fluorescence or chemiluminescence, it may be useful to amplify the light signal. This can be done in several ways, as, for example, by bonding a proximity-focus microchannel plate (MCP) image intensifier to the surface of the image sensor, or, in some versions, by employing an electron bombarded CMOS image sensor (EB-CMOS-IS) as described in U.S. Pat. No. 6,285,018, incorporated here by reference. The MCP or EB-CMOS-IS would be operated without a front window. As illustrated in FIG. 59 for the EB-CMOS-IS, the specimen 910 would be arranged in contact with a photocathode surface 912. Light 914 passing through, or emitted from, the specimen 910, upon reaching the photocathode causes the emission of photoelectrons 916 which are accelerated by an applied voltage 918, negative with respect to the sensor chip 920. For semiconductor silicon, one electron-hole pair is generated for approximately every 3.6 electron volts of incident energy, causing gain when the accelerated photoelectrons strike the sensor pixels 922. As for the quantum dot technology sensors described above, judicious selection of photocathode material with sharply tuned spectral responsiveness may allow these devices to be used for fluorescence microscopy according to our methods without need of an excitation-blocking filter interposed between the specimen and the surface of the photocathode. A similar electron bombarded architecture can be employed with CCD sensors.

In some implementations for which the sample unit does not substantially scatter light (e.g., where the sample is a molecular monolayer adsorbed onto the sensor surface), discrimination of the incident light and the detected light can be achieved without concern about their respective wavelengths by taking advantage of the angle of incidence of the source light to embody dark-field illumination as described previously (see FIG. 28). By delivering the excitation light to the sample unit and sensor from a sufficiently oblique angle, that light will not enter the sensor but can still be absorbed by fluorophores on the sensor surface. Fluorescence emission from the fluorophores will typically not be restricted to the excitation angle of incidence but will be isotropic, so that some of the emitted photons will be incident upon the sensor at a non-grazing angle that can enter, and be detected by, the sensor.

In some examples, a very thin spectral filter created by two-dimensional nanohole arrays in a thin metal film such as 200 nm Ag or Au can be deposited on the sensor surface (as described by Ghaemi, H. F., Thio, T., Grupp, D. E., Ebbesen, T. W. and Lezec, H. J. (1998) Surface plasmons enhance optical transmission through subwavelength holes. Phys. Rev. B 58, 6779-6782; Xiao, S., Mortensen, N. A., and Qiu, M. (2007) Enhanced transmission through arrays of sub-wavelength holes in gold films coated by a dielectric layer. J. Eur. Opt. Soc. 2, 07009). By appropriate selection of hole size and periodicity, transmission can be selectively tuned to the emission wavelength while the film (thin filter) effectively blocks the excitation and other wavelengths.

The spectral characteristics of thin film filters for fluorescence need not be uniform across the sensor. As shown in FIG. 61, filters with different transmission wavelengths can be deposited over respective regions ranging from the full sensor down to a single pixel, permitting fluorescence imaging of different specimens with multiple different fluorophores in subfields of a single image, if, for example, the fluorophores can all be excited by the same wavelength but fluoresce at different wavelengths. Different fluorophores in the same sample in suspension or solution could be monitored in successive frames as the sample flows over different filter subfields. By depositing filters of incrementally longer transmission wavelength in a range 980 (e.g., from filters passing only wavelengths longer than blue 982 to filters passing only wavelengths longer than red 984) along one direction of the sensor pixel array 960 and dispersing (e.g., via diffraction grating 950) the wavelengths of broadband excitation 940 over the same range and along the same direction but suitably displaced along the direction (e.g., from blue 954 to red 952), it may be possible to carry out microspectrofluorimetry of homogeneous samples in a single frame, or of heterogeneous samples in sequential frames as they flow along the same axis.

Some implementations can take advantage of the time course of fluorescence emission to achieve effective imaging without needing to discriminate between wavelengths of excitation light and emitted fluorescence light. Fluorescence occurs when absorption of a photon drives a fluorophore to a higher energy state, from which, after some period of time (which, on average, is the excited state lifetime) and loss of some energy through vibrational modes, the fluorophore relaxes to a lower energy state with emission of a longer wavelength photon. Excited state lifetimes are characteristic of respective fluorophores and vary from less than a nanosecond or a few nanoseconds for most fluorophores to a millisecond or longer for photoluminescent or phosphorescent materials. By timing a shutter in synchrony with the illumination, the incident light can be shut off and the shutter immediately opened and kept open until the excited state is depleted, to allow the pixel to integrate all the fluorescence/luminescence emission.

CMOS image sensors that incorporate global shutter circuitry, in which all pixels can be re-set simultaneously and their charge transferred simultaneously, are particularly advantageous for embodying this time-domain fluorescence imaging strategy, as illustrated in FIG. 32. A trigger pulse 660 controls when pixels are reset 661 at the beginning of the exposure or integration period, simulating closure and reopening of a shutter. LEDs, lasers, or laser diodes, or combinations of them, can be advantageously used as the excitation light source, as in suitable embodiments they can be switched on and off in less than the excited state lifetime. Resonant cavity LEDs, for example, can be modulated at GHz rates. By briefly flashing 662 an LED or other excitation light source precisely before the end of the re-set phase 661, the pixels of a CMOS sensor will discard signal due to that source illumination, and after re-setting will detect signal due to the decaying fluorescence. Fluorescence signal can then be integrated during the exposure time 663, after which accumulated charge is rapidly transferred 664 to a masked, dark area on the sensor from which the pixel values are read out 665 by row. With appropriate timing sequences a similar strategy can be implemented also with the more common rolling shutter image sensors. Luminescent molecules or particles displaying relatively long excited state lifetimes, such as those containing $Eu^{3+}$ or other lanthanides, may be particularly advantageous for such time-domain fluorescence imaging with our devices.

Some illumination modes for the system can use a technique known as fluorescence correlation spectroscopy (FCS). In conventional FCS, confocal or multiphoton excitation microscopy is used to ensure that illumination or imaging or both are confined to small (e.g., femtoliter) volumes of a dilute sample, typically containing zero or one fluorescent molecule. Moment-to-moment fluctuations in fluorescence are detected as indicators of molecular diffusion, binding, and other processes. In our system, FCS can be carried out by binding very dilute enzyme, antibody, nucleic acid, or other molecule to the sensor surface at individual pixels separated in all directions by two or more pixels without such bound molecules, or by carrying out similar binding to discrete spots on the chamber lid overlying such individual pixels, such that most individual pixels have bound zero or one such molecule at their surface, and then incubating the sample units with, for example, a fluorescent substrate, ligand or analyte.

The system we describe here has a very broad range of applications in measurement, counting, analysis, imaging, and other activities, and combinations of them. For convenience of discussion, we can consider two main categories of applications, one for sample units that are living things or relate to living things, the other for sample units that are non-living. Other ways of organizing the many applications are also possible.

With respect to living things, a significant category of applications relates to animals, in particular humans, and to medicine, biotechnology, pharmaceuticals, medical care, human biology, the chemistry and cells of humans, and similar topics.

A particular group of applications involves blood. The system can be used in detecting and analyzing types of cells in the blood, counting cells of various types in the blood, determining the normality of cells in the blood, monitoring the function of cells in the blood, and analyzing the chemistry of the blood.

Blood counts, in which cells or cellular elements of particular kinds such as white cells, red cells, and platelets, are counted in a carefully controlled volume of blood, are ubiquitous in the health care system in developed countries. Blood counts are highly useful in diagnosing pathologies and health conditions, determining their severity, and determining changes in such conditions over time. Over 250 million blood counts are done annually in the United States. A common form of blood count counts a variety of different elements in the blood and their properties and is known as a complete blood count (CBC).

Blood counts can be expensive and tend to be performed on expensive large dedicated machines operated in dedicated labs, for example, in hospitals or clinics. They are therefore not always available to poor or remote populations. This delivery model can also slow down the turn-around time and make the blood counts inconvenient to patients. Obtaining the amounts of blood generally needed for the counts carried out by such labs typically requires that the patient undergo venipuncture by a skilled technician; this procedure is often difficult, e.g., in pediatric or geriatric patients.

The system that we describe can provide rapid inexpensive blood counts performed conveniently at the location of the patient (that is, at the "point-of-care"). The blood count capability can be made available to much broader populations including poor and remote populations. In addition, in developed regions of the world, the system enables blood counts to be taken in a clinician's office, in the patient's home or office, at bedside in a hospital, and in virtually any other place. Blood counts can be taken faster, less expensively, more conveniently, by less sophisticated users, and with faster turnaround of the results than with current techniques. The system will allow almost anyone, trained or not, to perform blood counts anywhere at any time.

As described earlier the system can be configured to define a small and precisely controlled sample space volume between a lid and the sensor surface. As shown in FIG. 33, in some implementations, the sample space volume 510 (shown schematically) can be housed within a lightweight portable inexpensive handheld battery-operated device 512 that can be taken anywhere and used to perform a blood count such as a CBC. Only a small volume of blood 514 is needed from the patient and can be drawn by pricking 515 the finger 516. The blood can be transferred to the sample space by techniques that range from directly squeezing drops of blood onto the sample surface 511 and then lowering the lid onto the blood to form the precise volume, to transferring by a capillary tube or a pipette 513, for example, into a premeasured volume of diluent with or without stain 518 and, after mixing, from there into the already formed sample space between the sensor and the chamber lid.

Once the blood is in the sample space, the user of the device can control the performance of a blood count by providing commands through a user interface, such as a keyboard 519. A display 517 can aid the user in controlling the blood count and can present results to the user. The device can include a variety of hardware including memory, storage, wireless, and wired communication devices, and one or more microprocessors. Software 520 in the device can include an operating system 522, wireless and wired input/output drivers 524, interface controlling software 528, software to drive and read the sensor 530, and algorithms 526 to read images captured on the device, perform blood counts using typical or special blood count protocols, and to infer information about the patient from the blood counts, in some cases.

The size, weight, convenience, simplicity, cost, and other features of the device can exhibit a wide range of characteristics.

Some simple systems could include only the elements necessary to collect the blood, deliver it to the sample space and enclose the sample space to protect it from contamination while it is carried to another place for reading. For example, in a hospital, such a device could be used by a nurse to collect the sample and then connected to a blood count unit at the nearby nurse's station where it would be read and communicated to a hospital communication network.

Some inexpensive systems could also include simple hardware and software that would do nothing more than capture an image of the sample in the sample space and store the image digitally. The stored image could then be sent wirelessly to another location where the blood count would be read from the communicated image.

In some instances, the system could include a complete system capable of accepting and processing the sample, capturing the image, performing the blood count, analyzing the results, and displaying and printing on a miniature printer a complete blood count report comparable to ones now delivered by laboratories to health care providers.

In some cases, for use in the field, a kit could be provided that would include a sterile lancet, premeasured diluent with stain, volumetric micropipette, a device containing the sample space, and possibly directions for use.

In some implementations, the sample space and the sensor could be provided in a small inexpensive device that would plug into, attach to, or communicate with an existing handheld device such as a mobile phone. The device could include the hardware and software necessary to capture the image, and store it, and the phone could store and run software to perform the count and report the results locally and wirelessly to another location. Or the mobile phone could take the image from the device and transmit it to another location where the blood count would be performed.

A wide variety of counts could be performed including the total number of red blood cells in the sample, the total number of white cells in the sample, and the total number of platelets in the sample. Other features that could be counted, measured or computed include the number of erythrocytes per volume, the average volume fraction occupied by erythrocytes (hematocrit), the average diameter and volume of erythrocytes, the average content of hemoglobin per erythrocyte, morphological aspects of the components of blood, categorization and counting of subtypes of cells of a broader type, i.e., differential blood counts, including numbers of neutrophils, total lymphocytes, lymphocyte subtypes identified on the basis of cell surface antigens, monocytes, basophils, eosinophils, reticulocytes, sickle cells, and other normal and abnormal blood cells, and any combination of two or more of them.

In some implementations of CBCs, absolute leukocyte and erythrocyte counts can be performed, based on morphometric criteria including (and derived from) size, shape, and color of cells (cytoplasm) and nucleus. For example, an 8 µm diameter round cell that is red and lacking a nucleus could indicate a red blood cell. A 10 µm diameter round cell with a round nucleus larger than 7 µm in diameter and densely stained by Toluidine Blue or Gentian Violet could indicate a lymphocyte. A single field of view could contain about half a million blood cells. With such a large number in the sample, meaningful statistics can be collected rapidly in parallel even for relatively rare or ambiguous cells. Identification of some cells can be facilitated by the use of cell type-specific antibodies coupled to suitable contrast agents.

Thus, in the use of the sensor device for CBC as illustrated in FIG. 33, a minute quantity of blood, for example, 10 microliters, can be collected by a disposable volumetric transfer pipette 513 from a pinprick, and added to a pre-loaded vial of anticoagulant (e.g., heparin, EDTA), one or more contrast agents (stain, labeled antibodies, etc.), microbeads (as spacers to set chamber height, and as fiduciary particles to confirm imaged volume) and in some cases isotonic diluent 518. Vial contents are briefly mixed manually by inversion and finger tap, then transferred by the transfer pipette to the surface of the image sensor. The sample chamber lid is then lowered onto the drop, the illumination device (if not ambient) is closed in place over the chamber and switched on, and one or more (e.g., for color or sub-pixel resolution) images are captured and processed.

In classic CBC only absolute concentrations of different types of cells is determined. Using the sensor device and system that we describe, functionality and health of cells in the various counts can also be determined by use of functional probes (e.g., fluorescent calcium sensors), video imaging of cellular responses to stimuli, and in other ways, as described below.

Once the sample space has been used for a blood count, it could be considered to be contaminated and to require cleaning or flushing using a cleaning or flushing agent, which could be included in a kit with multiple lancets, for example, to permit reuse. In some cases, the sample space, sensor, and lid could be made disposable and replaceable after each use.

Because the cost will be lower and the counts will be easier and simpler to do, it will be possible to change the mode in which blood counts are perceived and used. For example, it will be possible to fine tune and customize on the fly for each blood count a choice of what parts of a complete blood count to perform at a given moment. The user could select the elements to be counted and could change them for each different use of the device. In addition, devices could be made that would be configured for only one or a small number of specific counts and measurements.

Other human fluids and substances (such as stool, urine, sputum, cerebrospinal fluid, lymph fluid, to name a few) could also be subjected to counts and measurements using handheld wireless devices that would be configured to capture images, perform the counts or measurements, and present results, with one or more of the features and modes of operation described above for blood.

Figure 41:
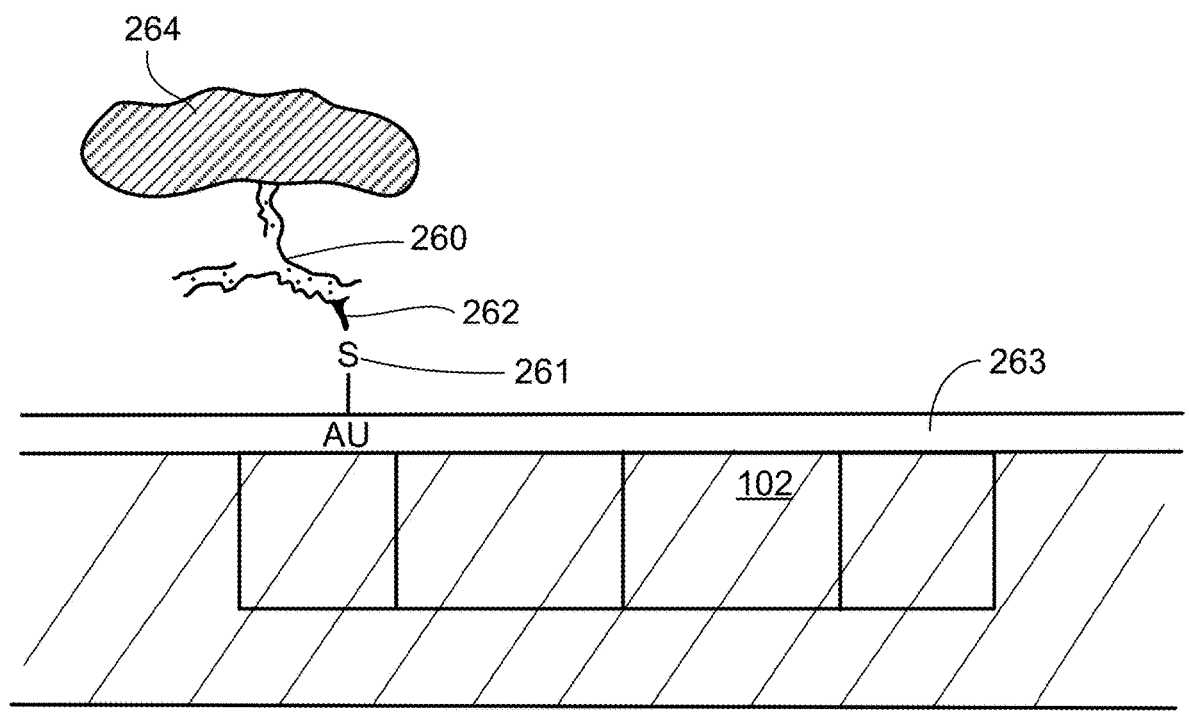

In some implementations, bacteria can be detected by using specific antibodies anchored to the surface of the sensor as shown in FIG. 41. For example, specific antibodies for methicillin-resistant *Staphylococcus aureus* (MRSA), anthrax and others could be used. One way to attach the antibodies 260 is by using thiol chemistry 261 to attach the linker 262 for the antibodies to a thin transparent gold layer 263 or layer of parylene or other thin transparent functionalizable material or a combination of them that has been deposited on the surface of the sensor 102. In this way the surface is made sensitive to particular bacteria 264 that match the specific antibodies. By flowing air, water, or other fluid past the sensor, relevant bacteria carried in the fluid can attach to the antibodies and then be counted or measured. This counting can be facilitated by subsequent incubation of the attached bacteria with a solution of similar antibodies coupled to fluorescent particles, beads, chromogenic enzyme and substrate, among others Such a device can be used in a broad range of biosafety and environmental assessment applications.

One class of analysis that can be done in an especially effective way with the system that we describe is referred to as fluorescence immunoassay for biochemical analysis of blood serum, cerebrospinal fluid (CSF), and other fluids, and combinations of them. We use the term fluorescence immunoassay broadly also to include related assays, for example, enzyme-linked immunosorbent assays (ELISA). However, many fluorescence immunoassays that are among implementations of our system would not require enzymes. In some implementations, as shown in FIG. 34, the sensor could be operated in a massively parallel mode in which individual pixels 540 of the sensor are spotted with respectively different specific antibodies 542, aptamers, polynucleotides, or receptors, or combinations of them, plus fluorescent-labeled 548 ligand 544, for example, cardiac troponin-I (cTn-I) molecules, specifically bound by the aforementioned molecules. These individual pixels are separated by at least two unlabeled pixels in all directions to minimize cross-talk between labeled pixels.

The ligand is bound to the antibodies 542 that are attached to the pixel. When blood is in the sample, cTn-I molecules 554 in the blood can displace the fluorescent-labeled cTn-I molecules and the extent of displacement, and thus the concentration of cTn-I in the blood, could be measured based on a change in the fluorescence detected at that pixel. Each of the pixels could be at the center of a three by three (or larger) pixel area 546 of the sensor to minimize crosstalk from nearby labeled pixels. Thus, the binding of antigens or molecules 554 that are sample units in the fluid sample, to the respective antibodies can be detected by the sensor to provide an analysis of antigen or molecular characteristics of the fluid. In some examples, the pH of the fluid and ions in the fluid can be detected by fluorescent pH sensors or ion sensors that have been bound to specific pixel locations on the sensor in a similar way. Small molecule fluorescent pH and ion probes are commercially available, and fluorescent protein or oligonucleotide sensors for pH, $Ca^{2+}$, $Mg^{2+}$, $K^+$, Nat, $Cl^-$ and other ions and metabolites exist.

In some implementations, a variant of these assays can provide a general approach to detecting any protein kinase or ATPase by using immobilized antibody against ADP (a product of kinase reactions) pre-loaded with a fluorescent ADP analog, and adding substrate for the kinase in question to the sample under analysis. This and related methods for phosphatases and proteases are described in U.S. Pat. No. 7,727,752, incorporated by reference. These methods may be used in multiplexed applications of our lensless microscopes, for example, by micro-printing pre-loaded antibodies at specific sites on an image sensor surface 102.

Alternatively and advantageously, as shown in FIG. 57, the antibodies, polynucleotides, or other specific binding reagents, enzymes, fluorescent sensors, or other probes 860, 862, 864 could be spotted, either directly or within a permeable gel, at spot locations 866, 868, 870 on the bottom surface 872 of a disposable, single-use chamber lid 874 at a spacing 876 to the sensor surface 877, such that fluorescence, light absorbing reaction product, or other optically detectable signal 882, 884, 886 from each spot is detected principally by the pixel or pixels 865, 867, 869 directly beneath it, each of which can detect much less fluorescence from adjacent spots. This arrangement will allow simultaneous determination of the concentrations of numerous proteins, metabolites, electrolytes, or other constituents or combinations of two or more of them rapidly and in parallel using very small amounts of blood. These measurements could be carried out at the same time, and on the same sample, as analysis of blood cellular constituents as for a CBC or other tests as described above. A comprehensive assay of a fluid sample could therefore be achieved in a small space, conveniently, at low cost, and quickly. In some implementations, spots of binding units can be deposited directly onto the pixels on the line with the light sensitive locations of the imaging device. This could enable higher resolution because the signal may be more tightly restricted to the spotted pixel and its immediate neighbors, but may require that the sensor be single-use.

As shown in FIG. 35, applications of fluorescence immunoassays and other optical molecular-selective and ion-selective probes are only some of a broad range of applications that can be based on using the sensor in a (massively) parallel mode to analyze, image, count, detect, and perform other functions with respect to different types 560, 562, 564 of sample units that may appear in a given sample. In some massively parallel applications, a large number of different functions that rely on detection of light are performed at the same time at (a large number of) respectively different individual pixels or groups of pixels of the sensor (we sometimes call them functional sites 570, 572, 574). Typically the functions are ones that are based on characteristics of the different respective types of sample units, for example, their presence, size, number, activity, chemical, mechanical, optical, or physical behavior or properties, changing properties, or combinations of any of them. The characteristics are represented in characteristics of the light 576 that is detected at the pixels of the sensor, for example, its intensity, wavelengths, timing, or combinations of any two or more of those. The functions to be performed at the respective functional sites of the sensor can all be different versions or different examples of a single class of function such as detection of antigens. In some implementations, completely different functions could be performed at different functional sites on the sensor. Once the light that is indicative of any of these characteristics or combinations of them has been detected and corresponding signals 580, 582, 584 are produced, the processing of the information can proceed in parallel or serially and can be done immediately or be delayed.

Among the applications of massively parallel uses of the sensor are genomics, genetics at the cell level or the molecular level, DNA sequencing, biochemical analysis, molecular dynamics, drug screening, pathogen identification, particle analysis, cell analysis, high content screening of cell physiology and behavior, and many others.

As mentioned earlier there are many broad classes of applications for which the system is suitable. One of those broad classes is point-of-care diagnostics.

Point-of-care diagnostics broadly include any activities in which the system could be used at any location of the patient to determine a condition, diagnosis, prognosis, characteristic, or other factor that is indicative of the patient's past, current, or future state. In some instances the activities could include visualization of internal and external tissue, fluids, and other observable conditions of the patient, identification or classification of sample units that are part of or derived from the patient, enumeration of such sample units, and measurement of a wide variety of characteristics of such sample units (including their volumes, optical densities, shapes, and sizes, to name a few) and any combination of those activities. The target of the analysis could be blood cells, other cells in cytological specimens, protozoa, bacteria, parasites, particles (such as urinary crystals, casts), or chemical analysis, to name a few. Point-of-care can be any place, including within a hospital or clinic, at an institution, in a home or office, indoors or outdoors, and anywhere in the world. The point-of-care diagnostic work could be done at any time and in any ambient condition.

As shown in FIG. 36, a broad class of health care applications would be in the field of imaging live tissue 590 for the purpose of enabling a human practitioner 592 to determine a condition of a patient 594, for example, in real time, and to make that determination from any location including possibly a location 596 different from the location of the patient 598. For example, pathologists could make determinations of the condition of skin or tissue (for example whether it is cancerous) in real time while the patient is undergoing a procedure such as surgery at another location, for example. Typically this is done by the surgeon taking a biopsy and sending it down the hall to a lab where the pathologist performs the analysis at a microscope and then reports back to the waiting surgeon. Using the system that we have described, the biopsy step may be eliminated. Instead the surgeon may be able to apply the sensor surface 599 directly to tissue of the patient, for example, prostate tissue during surgery to remove malignant sections of the prostate. The sensor would image the tissue and the resulting image could be viewed directly at location 598 or sent electronically 600 to the pathologist down the hall or at any location in the world.

In some instances, the visualization of tissue by a practitioner who is not located with the patient can be useful and the system would allow a practitioner 602 who is with the patient to apply the sensor to the tissue, capture an image, and transmit it to the remote practitioner for consideration.

As shown in FIG. 37, in any application in which tissue 609 is imaged for immediate review locally or remotely, light 610 to illuminate the tissue could be delivered from the side of the tissue. The tissue being imaged could be illuminated by scattered light illumination achieved through the adjacent tissue 616. In some implementations, there would be no chamber enclosing the sensor 617, the sensor would be configured to project 618 from surrounding portions of the system so as to be easy to apply to the tissue, for example, at the end of a probe 620, and small LEDs or other minute light sources 622 could be mounted peripherally, or interspersed among the light-sensing pixels in the detector surface. Vital stains, antibodies, or other contrast agents, or combinations of them 624 could be applied to the tissue surface prior to imaging, for example, for purposes and in ways that we mention in other places. The imaging could be done in a transmission mode, a side-illuminated (effectively dark field) mode, or a fluorescence mode, or a combination of them. In the fluorescence mode, fluorescent immunolabeling could be used to detect specific (e.g., cancerous) cell types using specific surface antigens, or fluorescent, or fluorogenic molecules or combinations of them selectively taken up by the relevant cancer cells. An example of the latter is 5-aminolevulinic acid, a nonfluorescent molecule selectively taken up by glioma cells and converted by them to the highly fluorescent protoporphyrin IX (e.g., Hebeda K M, Saarnak A E, Olivo M, Sterenborg H J C M, Wolber J G. 5-aminolevulinic acid induced endogenous porphyrin fluorescence in 9L and C6 brain tumors and in the normal brain. Acta Neurochir 1998; 140:503-13; Stummer W, Stocker S, Wagner S, et al. Intraoperative detection of malignant gliomas by 5-aminolevulinic acid-induced porphyrin fluorescence. Neurosurgery 1998; 42:518-26; US2006/000429)

In addition to the usefulness of such implementations for monitoring the static histological, histochemical and immuno-histochemical aspects of normal and abnormal tissue, they will also be useful for monitoring dynamic aspects of the tissue, such as microcirculation, which may be of diagnostic importance in assessing sepsis or tissue response to injury, ischemia, or stroke. Fast readout rates of CMOS image sensors 617 can advantageously achieve good temporal resolution for such dynamic imaging, and higher frame rates can be achieved by reading only restricted sub frames of the sensor. Blurring of fast-changing images can be further reduced by stroboscopic illumination, timing a single very brief pulse of the LED or other light source to occur only once during each frame integration period. Use of appropriate illumination, such as green light that is strongly absorbed by the hemoglobin within red blood cells, can enhance the contrast of such dynamic imaging. By using each of two wavelengths to illuminate alternating frames, additional physiologically or pathologically relevant information can be obtained.

For example, using the absorption maxima of, respectively, oxyhemoglobin and deoxyhemoglobin, such implementations will permit monitoring of dynamic microscopic changes in local blood oxygenation. Using LEDs or other light sources of appropriate wavelengths to excite fluorescence of relevant molecules, in conjunction with means, as described above, to prevent detection by the sensor of that excitation illumination, such implementations will permit monitoring of dynamic changes in tissue metabolism, ion levels, membrane electrical potential and other physiological parameters of interest. For example, the reduced form of nicotinamide adenine dinucleotide, NADH, can be distinguished from its oxidized form NAD+, by the former's excitation and emission peaks at approximately 350 nm and approximately 460 nm respectively, enabling microscopic monitoring of tissue redox state and cellular energetics. Expression of genetically encoded fluorescent probes, or application of extrinsic fluorescent probes, extends the scope of application of such implementations.

Other point-of-care applications are broadly useful in detecting specific cell types using antibodies that are directed to cell surface antigens. In some examples, this approach is useful in measuring a degree of competence of the immune system, for example, in the context of a patient who has AIDS.

An absolute count of CD4+ helper T lymphocytes in blood of the patient could be quickly and easily determined using the sensor in an alternative approach to relatively expensive and time-consuming flow cytometry. In applications of our system in this context, a precise microliter-scale volume of the patient's blood could be drawn at the pointof-care. The precise volume would be quantitatively diluted with buffered physiological saline containing bovine serum albumin and markers for cells of interest. In some instances the markers could be fluorochrome-coupled primary antibodies (available, for example, from Becton-Dickinson as its FITC-labeled anti-CD4 [Leu-3a]). In some cases, the markers could include 2.8 micrometer bead-coupled antibodies (e.g., Dynabeads anti-CD4) used for non-fluorescent detection of the CD4+ cells. In some instances, inclusion in the sample of a known quantity of non-coupled marker beads (e.g., Becton-Dickinson TruCount) in diluents enables absolute calibration of cell counts.

In some implementations, the diluted blood sample with markers is then introduced into the sample chamber adjacent the sensor and imaged. From the images, cells are detected and counted using algorithms. Morphometric criteria can be applied by the algorithms to exclude CD4+ non-lymphocytic cells (e.g., CD4-dim monocyte subpopulations) from the count.

In some examples, a similar technique can be used to identify and count CD19+ B cells. In these examples, the markers could be anti-CD19 monoclonal antibodies (available, for example, from Becton-Dickinson as its FITC-labeled anti-CD19). These counts are useful in monitoring, e.g., a patient's response to treatment by rituximab (monoclonal antibody against CD20, which is mainly found on the surface of B lymphocytes) which is widely used against B cell lymphomas, transplant rejections, certain autoimmune diseases, and for other purposes.

In some examples, this approach can be used to identify and count CD66+ granulocytes, where the markers could be anti-CD66abce monoclonal antibodies (available, for example, from Millipore as its FITC-conjugated anti-CD66abce). These counts are useful in diagnosing, e.g., infections, in which the blood concentrations of neutrophils, the most abundant type of granulocyte, are typically elevated. In some examples, this approach can be used to determine ABO blood group, e.g., by use of anti-A blood group and anti-B blood group IgG Fab' fragments, each coupled to distinguishably-different sized microbeads, as markers. Thus, blood from type A patients would display erythrocytes decorated with beads only of the size coupled to anti-A Fab', blood from type B patients would display erythrocytes decorated with beads only of the size coupled to anti-B Fab', blood from type AB patients would display erythrocytes decorated with beads of both sizes, and blood from type O patients would display erythrocytes entirely without beads. Determination of Rh status (+ or −) could be carried out similarly by incorporation in the same diluent of anti-Rh D blood group Fab' coupled to a third distinguishable marker, or by a subsequent separate test.

A broad category of applications of the sensor system relates to simple and easy point-of-care detection of parasitic diseases of the kinds that can be detected by microscopy. Such parasitic diseases include trypanosomiasis, leishmaniasis and malaria. The detection of the parasites as sample units can be done by pattern recognition on the images. Pattern recognition can be enhanced by applying routine stains to the sample (such as Giemsa, Wright-Giemsa, Gentian violet, toluidine blue, methylene blue, and others, or combinations of them). Parasite detection can also be enhanced by dyes such as fluorescent dsDNA-intercalating dyes, especially fluorogenic cell-permeable dyes such as SYBR Green$_{tm}$, possibly thiazole orange, PicoGreen$_{tm}$, and others (see, e.g., R. Guy et al., Malar. J. 6 (2007) 89, incorporated here by reference), or by optically detectable parasite enzyme-specific reactants such as 3-acetyl pyridine adenine dinucleotide (APAD) (see, e.g., U.S. Pat. No. 5,124,141, incorporated here by reference). In some approaches the parasites can be subjected to antibody labeling. In particular cases, polarization microscopy techniques as described above could be used: thus the hemozoin pigment granules of intracellular *Plasmodium falciparum* parasites within malaria-infected red blood cells display birefringence, and can be easily detected as bright spots against a dark cellular background through crossed polarizers using methods described above (see, e.g., C. Lawrence and J. A. Olson, Am. J. Clin. Pathol. 86 (1986) 360-363; S. Kapishnikov et al., Proc. Natl. Acad. Sci. USA 109 (2012) 11184-11187; incorporated here by reference).

In some implementations, the sensor system can be used to diagnose intestinal parasitic diseases of the kind that can be diagnosed by imaging of stool samples. The parasites associated with these diseases can include *Giardia lamblia, Entamoeba histolytica*, spore-forming protozoa (such as Crypotosporidium and others), *Balantidium coli*, and helminths such as *Ascaris lumbricoides* (roundworm), *Trichuris trichiura* (whipworm), *Ancylostoma duodenale*, and *Necator americanus* (hookworms) among many others. In such cases, the stool sample could be diluted to form a slurry or a liquid that could be delivered to the sample chamber as a fluid. In some cases, the diluent could be a hypertonic solution, to facilitate separation and enrichment of parasite oocysts or eggs by flotation. Stains could also be included in the samples.

The DNA-binding fluorescent dyes mentioned above can also be used to estimate the ploidy of cells, by which the sensor system can be used to monitor cell cycle, to visualize actively dividing cells, and to detect abnormal cells, all of clinical significance in a variety of contexts including cancer diagnosis and staging. DNA content as an indicator of aneuploidy, as well as sperm head size and motility, are important measures of sperm quality and can be measured by the sensor system.

A broad set of applications that apply both to point-of-care and in a research context (as do others of the applications that we discuss) are cell function assays. For example, the sensor system could be used effectively for point-of-care analysis of the functioning of blood and other cell types.

For example, neutrophil activation in the blood could be tested by detecting the reduction, by released myeloperoxidase, of the tetrazolium salt 3-(4,5-dimethylthiazol-2-yl)-2,5-diphenyltetrazolium bromide (MTT), 3,3',5,5'-tetramethyl-benzidine (TMB) or other chromogenic substrate to colored product or of chemoluminescence upon oxygenation of luminol, or by detecting elastase release upon degranulation by use of a flurogenic substrate. Imaging of leukocyte activation could also be achieved by monitoring the associated degranulation of the cells using scattering of oblique or dark field illumination, or through changes in fluorescence using a variety of fluorescent probes, e.g., for reactive oxygen species, granule pH, etc. Activation of a wide variety of blood cell types could also be determined using the sensor system through fluorescence detection of calcium transients or changes in trans-membrane electrical potential, including neutrophils, lymphocytes, and platelets. For lymphocytes in particular, activation can also be determined by immunofluorescence detection of CD69 antigen on the surface as a rapid surrogate for cell division; by detection of trypsin-like serine esterase activity released by degranulation, using fluorogenic or chromogenic substrates; or by detection of mitochondrial membrane potential dissipation using fluorescent probes. Measurements of these activation-indicators can also be used to identify various types of cells undergoing apoptosis.

In some cases, platelet activation can be determined using degranulation (as for neutrophils explained above) or the appearance of activation-specific surface antigens (see, e.g., C. S. Abrams et al., Blood 75 (1990) 128-138, incorporated here by reference).

Platelet activation could also be detected and analyzed based on aggregation. In some instances, monitoring platelet motility and increased sizes of platelet clumps can be facilitated by fluorescent-labeled, or bead-labeled anti-platelet antibodies, such as CD42 (glycoprotein 1b) (see, e.g., P. Metcalfe, Vox Sanguinis 87 (Suppl 1) (2004) S82-S86).

Monitoring cell dynamics including locomotion, chemotaxis, contractility and shape change can be used for many other applications, including a wide variety of clinical and research assays of differentiation, drug and other chemical effects, and others.

A broad category of applications of the sensor system is in cytogenetics. In some examples, fluorescence in situ hybridization contact microscopy could be used to screen for a wide range of genetic abnormalities (for example, trisomy 21) or alleles of diagnostic or risk-factor utility (e.g., BRCA1, ApoE4).

Although many of the examples that we have mentioned involved imaging features of the blood, a broad range of applications also exists in imaging other kinds of cells and particles and in a wide variety of biochemical analyses. In many cases, the cells or particles or the samples to undergo biochemical analysis are held in liquids or can be added to solutions for analysis. For example, the sensor system could be used for counting, identifying, and analyzing sample units in urine, cerebrospinal fluid, feces, peritoneal fluid, bone marrow aspirate, and water including wastewater, drinking water, and swimming water.

In addition to or as part of sensors, devices, and systems, and categories of them already described, the sensor system can be implemented in a wide array of different specific devices having a range of uses.

For example, a broad general class of devices that use the sensor are disposable (e.g., single use disposable) contact microscopes for use anywhere at relatively low cost and conveniently. Disposable contact microscopes could be distributed widely for use in homes, offices, field locations, in hospitals and other clinical settings, in laboratories and research centers, industrial contexts, and factories, to name a few. These applications are not limited to health care or biological contexts.

Disposable contact microscopes could be useful in situations in which a sample is of a nature that would contaminate the sensor or chamber with respect to subsequent uses. The contamination could make a subsequent use of the device either inaccurate with respect to a later sample or dangerous or inadvisable because of hazards associated with the sample. In addition, the devices may be used in contexts that are remote or inaccessible and where it therefore is impractical to clean the sensor or device between uses. In some contexts, it may be useful to assure that the state of the device when used is exactly as it was when manufactured and packaged. For example, the device may be sterile and packaged for a single use. In some cases, the device or related kit may include coatings or materials or supplies or reagents that decay or change state or combine with a sample in such a way as to be inappropriate to use more than once.

When we refer to disposable contact microscopes, we mean disposable portions of devices that use the systems and techniques that we have described. Those portions could include only the sensor and a small amount of associated circuitry on a headboard, or could include other elements of the system up to and including a complete operating device or instrument. In typical cases, the amount of the complete device that is disposable would be limited so that the value lost in the disposal is as small as possible yet consistent with the context that makes disposal desirable. In some cases, for example, a handheld device could have a port into which a disposable sensor and headboard could be installed and removed. The device could be used repeatedly over a long period of time and for each use a fresh sensor and headboard could be taken from a package or supply, installed in the device, used, and then removed and discarded or recycled.

In some examples, the sensor chip alone could be the disposable part and a coupling mechanism could be used to enable the connectors of the chip to make good connection to corresponding contacts on a headboard that is part of the reusable device. In some implementations, a sample chamber is part of the disposable elements. In some cases, the chamber is reusable. In some implementations, the chamber lid alone is the disposable part. Every element of the sensor system, including mechanical, fluidic, electromechanical, electronic, and software, can be made disposable, as well as a variety of combinations of any two or more of them.

In some cases, the sensor, a minimal headboard, and a sample chamber could constitute a disposable element to be coupled to all of the other elements of the sensor system in a reusable device such as a handheld device.

Although we have described single use disposable devices and elements of devices, in some implementations the disposable elements need not be limited to single uses, but can be used for several or even a fairly large number of instances and then discarded. The context, location, safety, speed, cleanliness, and other factors will affect the number of uses.

In some cases, the disposable devices need not be permanently discarded or destroyed but can be refurbished, recycled, and reused. Refurbishment could include cleaning, sterilization, relabeling, modification, or changing of parts or a combination of those.

With respect to cleaning of the sensors, chambers, and other elements of the system, cleaning is important when failure to clean results in data contamination or safety hazard. However, in flow modes of operation, laminar flow of sample fluid through the chamber will tend to carry the sample through the chamber without leaving any "old" portions of the sample in the chamber. If there is no adhesion of old sample portions to the sensor or chamber, there is likely no contamination and cleaning may not be required. In any case, in a flow mode of operation, any part of the sample that is not moving can be detected and an alarm set off to alert the operator.

In some cases, if cleaning is to be done in a flow mode, it could be done by applying positive or negative pressure pulses to the flowing sample to push old material out of the sample chamber. Or the flow could be reversed to dislodge old material. In some cases, the chamber could be flooded with soap or disinfectant. In general, the surfaces of sensors are a glass-like material and therefore robust in their resistance to contamination and decontamination.

In some cases, the reusable device into which the disposable unit is installed for use could be a device containing an illumination element, a control element, and a readout element. The reusable device could be self-contained or could be an accessory to a host such as a smartphone, a tablet, a laptop, a workstation, or another device that could provide analysis, storage, user interaction, and a variety of other features and combinations of them. When the architecture of the system includes such a reusable device, a disposable unit, and a host, the system could be used as follows.

In instances when the raw sample or specimen is liquid or is added to a solution, the disposable unit would be installed in the reusable device and the specimen would be transferred from its source using, for example, a pipette and delivered into the loading entrance of the sample chamber of the sensor assembly. Capillary action would spread the sample across the sensor surface and excess fluid would drain to the sides. In some instances, dry or liquid samples could instead be applied directly onto the surface of the sensors of units that did not include chambers or could be used either way. The control unit (which we sometimes refer to interchangeably with the reusable device or as part of it) would be closed over the sample, chamber, and sensor to bring its illuminator into position (unless ambient light is used). Images could then be captured. After the image capture, the disposable unit can be removed, discarded or recycled.

A wide variety of pipettes can be used to transfer samples from sources to chambers including commercially available pipettes. In some implementations, specially designed and special purpose pipettes can be useful to transfer and image samples. In some cases the pipettes can be inexpensive and disposable pipettes that can acquire samples and deliver precise volumes of the samples to the sensor surface or the chamber inlet or both. There are many possible designs for such disposable volumetric pipettes, such as a glass capillary tube with one or more volume calibration marks and a close-fitting wire or rod to serve as an internal piston for loading and discharging fluid.

A useful pipette design for collection, transfer, and quantitative dilution of microliter quantities of blood can be formed as shown in FIG. 42. In some examples of this design, a pair of adjacent equal-length capillary tubes 632, 634 each incorporates a displaceable hydrophobic gas-permeable plug 635 at a similar preset position in each that precisely determines the filling volume as described in U.S. Pat. No. 5,059,398, incorporated here by reference. The precise filling volume is determined by the inside diameter of the capillary tube and the distance from the bottom of the plug to the bottom of the capillary tube. One capillary tube 632 is used to draw up, by capillary action, the predetermined volume 633 of blood at the time of use. The other capillary tube 634 is pre-filled, by capillary action, with a precise volume of supplemental fluid 636 that could include any of a wide range of stains, contrast agents, anticoagulants, microbeads, and other materials and combinations of them, for mixing with the blood. This supplemental-fluids capillary may be of larger or smaller diameter than the blood-collecting capillary to accommodate the intended mixing ratio of the precise predetermined volume of the supplemental fluids to the precise predetermined volume of the blood. The bottom of the capillary tubes is sealed by packaging until use. After loading the predetermined volume of blood 633, the tip of the pipette is inserted into a close-fitting tip 638 that makes a water-tight seal with the pipette tip. A double plunger 637 that can be depressed by a finger allows simultaneous discharge of both fluids, with rapid and efficient mixing in the intended ratio facilitated by the tip as the fluids are discharged. Both capillaries can be sheathed in a strong, flexible polymer tube 639 as described in US patent application 2006/0239866 A1, incorporated here by reference, for protection from breakage. A hydrophobic polymer sheath will also facilitate filling of the blood-collecting capillary, preventing blood from running up the grooves between the two capillaries. A friction gasket 640 can be placed inside the flexible polymer to and at the top of the supplemental fluids capillary, both to seal the top of the supplemental fluids capillary and to maintain the double plunger in an "up" position until the intended discharge of pipette contents.

In some instances, the device that loads the sample to the sensor can be attached to the sensor or related chamber or headboard to form a self-contained, self-loading portable, light-weight, inexpensive easy-to-use contact microscope that can receive and handle sample fluids and deliver images for processing by another device. Such a unit can be implemented in a wide variety of configurations and including a broad range of elements.

In some implementations, for example, a pipette could be combined with a sensor and readout unit, such as a disposable unit, to form a self-contained inexpensive, easy to use pipette microscope. In such a pipette microscope, as shown in FIG. 43, the fluid sample could be drawn into the pipette by depressing and releasing a button 670, causing a precise volume of the fluid sample to be drawn into the chamber 671 at the sensor 672.

In such applications, and in others that involve a sensor unit that is disposable, for example, we sometimes refer to the sensor unit 673 including the sensor and a readout unit 674. We use the term readout unit broadly to include, for example, any circuit, software, firmware, or other functional unit that can accept raw signals or data from the sensor chip and organize and store them in a form that amounts to an image that can be later processed, stored, analyzed, and used in other ways.

In such applications, the readout unit can include a connector 675 or interface that is wired or wireless and enables the unit to be connected electronically to a device or other part of the system that processes, stores, analyzes, or uses the images. The electronic connection can be continuous or can be established only at certain times. For example, a lab technician could use a pipette microscope to capture images and later plug the readout unit into a worktable image-processing unit. For many applications it would suffice to view images and analyze data using a touchscreen 676, control keys 677, or other interface incorporated in the readout unit.

In some cases, as shown in FIG. 44, multiple sensor units can be ganged and loaded from multiple pools or wells 681 of distinct sample fluids as, for example, in a standard laboratory multi-well plate 682. The ganged set of sensor units 683 can be operated by one or more electromechanical controller 684 able to provide the reader unit functions in parallel. In conjunction with robotic plate handling apparatus 685, this would allow rapid microscopic imaging and analysis of large numbers of samples.

Although many of the example applications that we have discussed involve taking single images of a sample and then analyzing the images individually, there are a broad range of applications that involve capturing multiple related images and processing them together. The multiple images could be different spectral images of a given sample, of images taken at different times of a given sample, or images of different portions of a sample taken successively as, for example, of different samples of a flowing fluid.

Figure 45:
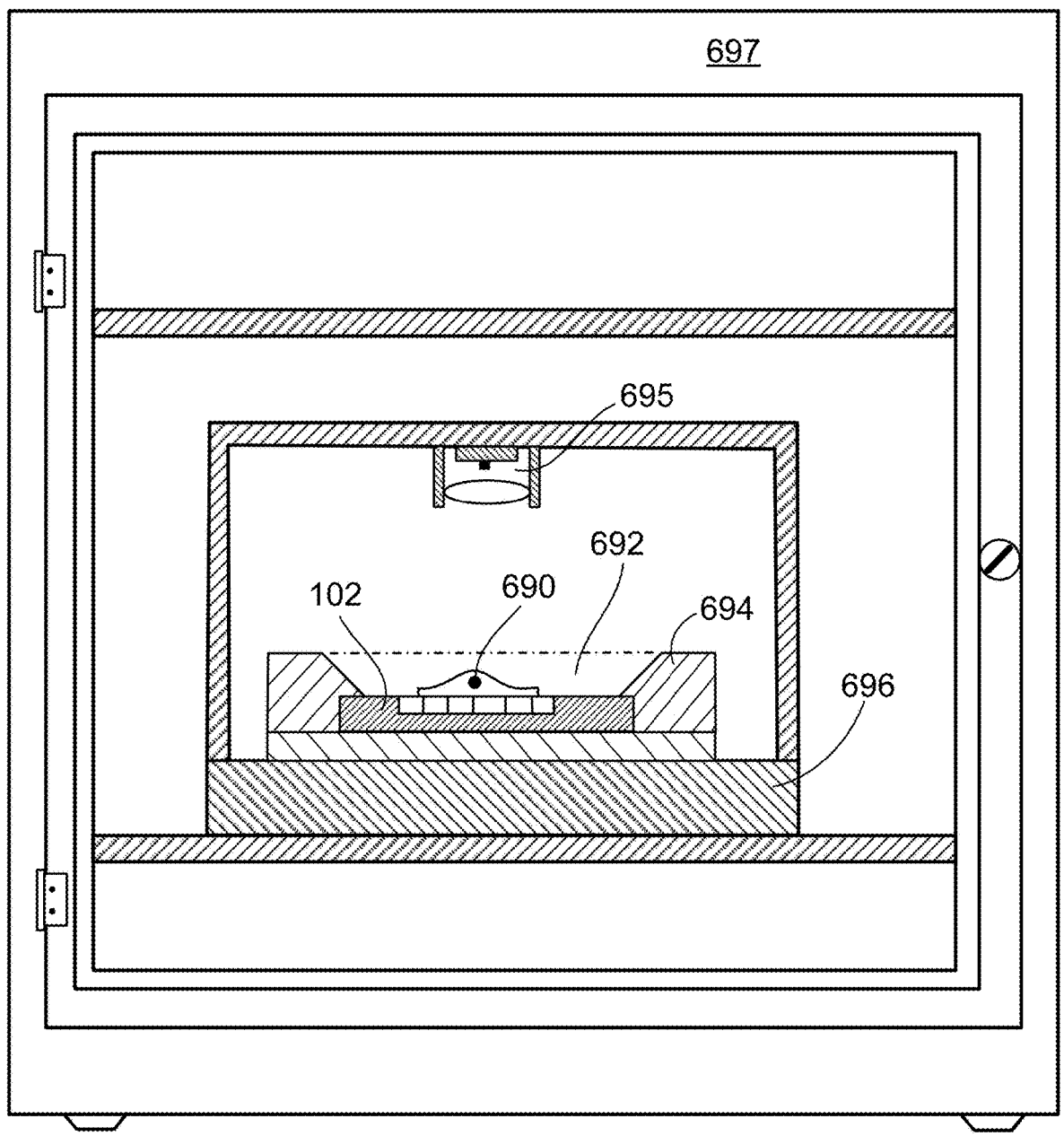

In some implementations, for example, a time-lapse series of images could be captured. This approach could be used for incubation time-lapse imaging as a simpler, inexpensive, portable, compact alternative to, or supplement to, building an incubation chamber on a conventional microscope. When the sensor system that we are describing is used for this purpose, cells to be incubated can be plated directly on the sensor surface. For example, as illustrated in FIG. 45, in some instances the cells 690 within a sample fluid 692 can simply be loaded into the sample chamber 694. The sensor unit 102 and related illumination 695 and readout unit 696 could then easily be loaded into, for example, a conventional tissue culture incubator 697. An additional advantage that results from the direct contact of the incubating cells with the surface of the sensor is that no change will occur in the focal plane that is being imaged (or, in turn, the focus of the image) as often occurs with incubation time-lapse photography using conventional microscopes due to thermal expansion and contraction.

Such compact sensor systems can also be used to provide optical microscopy in conjunction with other non-optical forms of microscopy, particularly the many modes of scanning probe microscopy such as atomic force microscopy (AFM). In these techniques, a delicate probe, which may have a tip of nanometer dimensions, is brought very close to a very small specimen. Proper positioning of the probe tip is a tedious process that is helped by optical microscopic visualization. In addition, optical microscopy can provide additional information that can complement the information provided by the scanning probe. For this reason, scanning probe apparatus is commonly mounted atop large inverted lens-based optical microscopes. The sensor systems described here can entirely replace those lens-based microscopes in these applications, enabling cheaper and more compact combined instruments. See, for example, FIG. 16 of the U.S. patent application Ser. No. 13/095,175, incorporated here by reference.

For similar reasons, time-lapse imaging using the sensor system can be applied broadly to achieve time-lapse cinemicrography in a wide variety of samples that undergo changes over time, such as individual dissociated cells, embryos, or explanted tissue growing or developing in culture.

As mentioned earlier, a broad spectrum of applications can involve using the system in a flow mode in which the samples have biological features or non-biological features, or both.

Flow cytometry systems, which typically look at one cell at a time, are widely used for counting, measurement or identification of cells in a flowing volume in connection with diagnosis of, for example, cancers, and blood diseases. These systems are typically large and expensive. Imaging flow cytometry systems, which can additionally measure cell shapes, may be even more expensive. Typically, flow cytometers provide data on light absorbance and scattering, as well as fluorescence in one or more wavebands. Our devices can be used as imaging flow cytometers, to produce a sequence of images that can yield multiple morphological parameters including size, shape, and optical density by illumination at multiple wavelengths. Light scattering by cells in the sample can also be monitored by using dark field or oblique illumination, as can fluorescence (at one or more wavelength by using thin spectral filters, and possibly at multiple wavelengths by using total internal reflectance, surface plasmon, fluorescence lifetime or related techniques, as described earlier). Imaging of at least two different surface molecules would also be possible using antibodies, aptamers, peptide toxins or other specific ligands coupled to two or more distinguishably-different sizes of microbeads. Thus our system can provide multiple channels of data (size, shape, light scatter, absorbance and fluorescence at multiple wavelengths, bead-labeling of multiple cell surface markers, and other multiple measurements, and combinations of them) yielding multidimensional cellular descriptions of a richness equal to or greater than that of the large and expensive flow cytometer systems. The system that we describe has advantages in being less expensive, smaller, faster, and easier to use. In our system, we can analyze a very large number of cells in parallel at the same time. In some instances, our system can process hundreds of thousands of cells in a single imaging frame. The resulting large quantities of data enable powerful statistical analyses.

In some implementations, the data can represent non-image data, such as electrical or chemical or other information about the sample units, and the imaging can combine image data with such non-image data in a wide variety of ways. Image and non-image data can be collected in parallel at one time on a single sensor or on parallel sensors separately. Time-varying non-image data can be stored in video or other time-series image sets by allocating one or more pixel values to the non-image (i.e., non-light dependent) data.

In many of the examples that we have discussed to this point, the sample units in the sample are allowed to have whatever distribution across the sample occurs naturally and the sample units are not altered to change their density, behavior, granularity, or distribution in the sample. In some implementations, it is useful to manipulate the sample to cause changes in the distribution, behavior, granularity, or density or other characteristic (or any combination of two or more of those) of the sample units.

Figure 46:
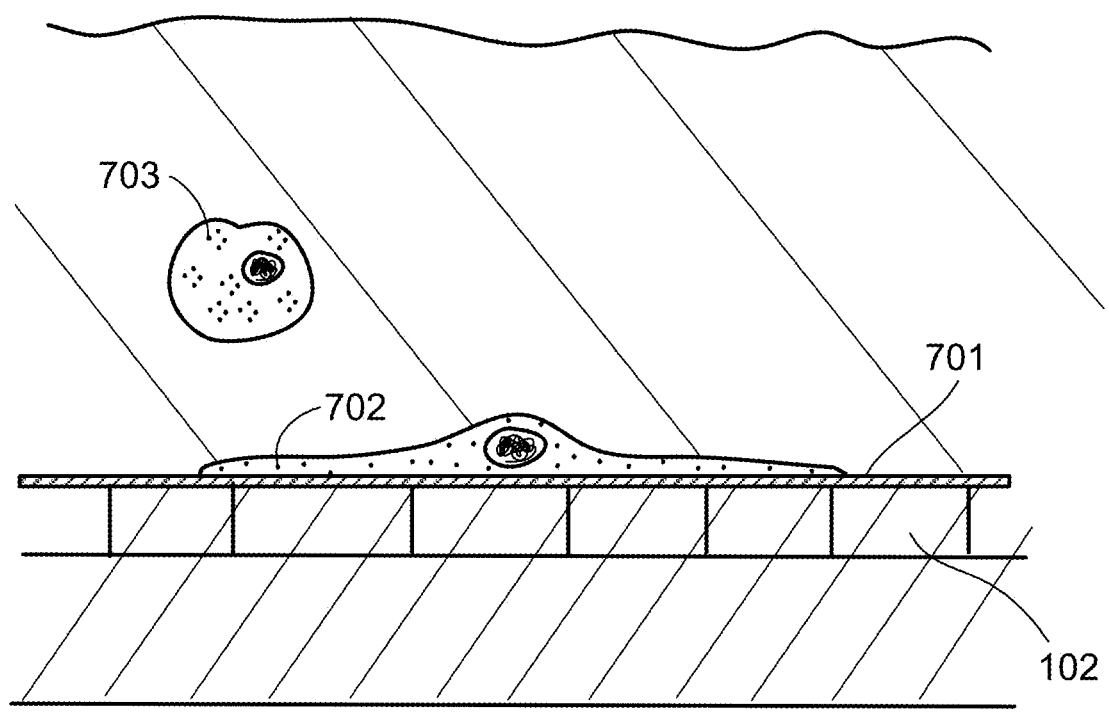

In some cases, as illustrated in FIG. 46, such changes can be promoted by coating the sensor surface 102 with a molecular layer 701 to enhance the adhesion of cells 702 to the surface, or to enhance changes in shape upon contact with the surface, such as cell spreading, i.e., transformation from spherical 703 to flat morphology (e.g., spreading of leucocytes to aid a complete blood count), or to elicit a physiological change (e.g., differentiation, degranulation) or a pathological change (e.g., apoptosis). In some cases, specific ligands or antibodies can be used to concentrate specimens (such as bacteria, as discussed later).

Figure 47:
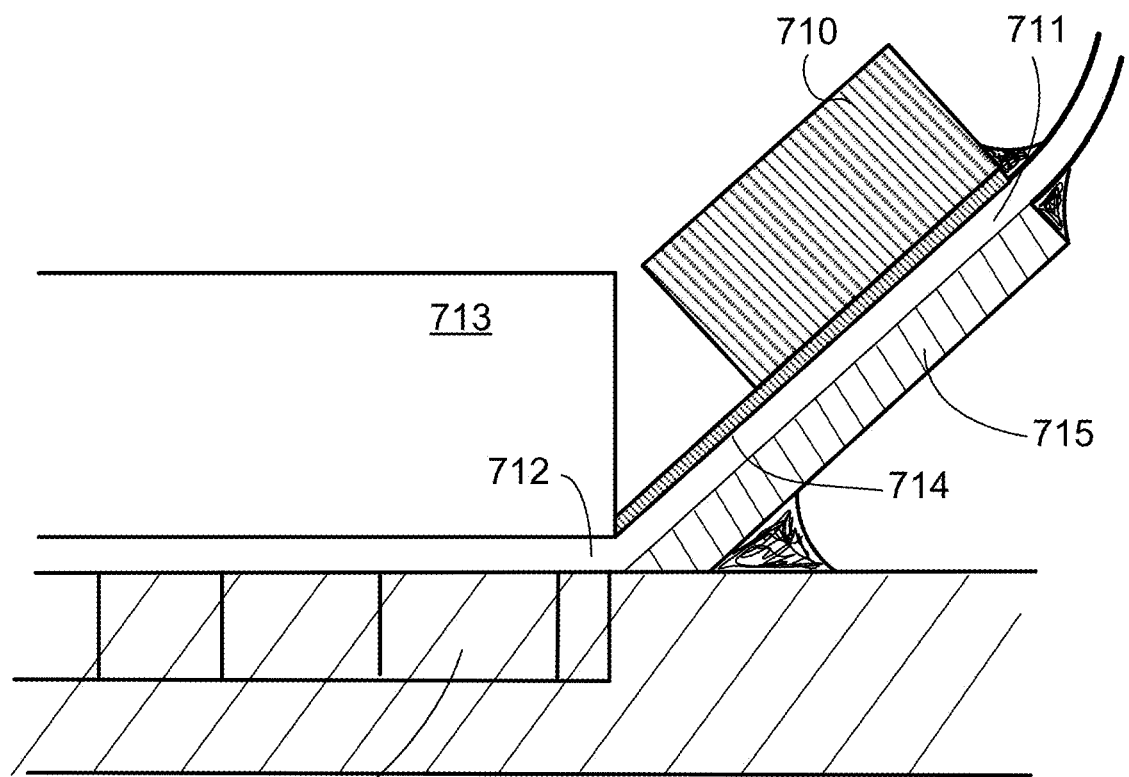

In some cases the redistribution of sample units within the sample can be for the purpose of driving (that is, focusing) the sample units toward and against the sensor surface. In some implementations, the focusing of the sample units can be achieved using acousto-fluidic techniques. For example, piezoelectric driving elements could provide resonant vibration. In some cases, the piezoelectric element could be bonded to glass or other rigid transparent material as part of the chamber lid. A central aperture in the piezoelectric element could allow light to pass. Alternatively, in the case of flowing samples as illustrated in FIG. 47, laminar Hele-Shaw flow (i.e., with very thin height 711 compared to width) can be established in a chamber 712 initially established between an acoustic carrier 714 and reflector 715 upstream of the image sensor and maintained across the sensor. The piezoelectric element 710 is bonded to the carrier, constituting the roof of this flow chamber a small distance upstream of the sensor. The piezoelectric or other vibrational element can be operated, for example in a quarter wave mode selected relative to the distance to the sensor surface, so as to set up a standing wave and a pressure gradient to drive the sample units to the bottom of the stream, a position that would be maintained as the laminar Hele-Shaw flow carries them under the chamber lid 713 and across the sensor surface 102. (See e.g., P. Glynne-Jones et al., Lab Chip 12 (2012) 1417; M. Hill et al., SPIE newsroom (2010) 10.1117/2.1201007.003170).

Much of the discussion to this point has been focused on biological, medical, or chemical samples. There is also a broad range of applications that relate to physical particles and sample units. These sample units can be of a wide variety of materials, sizes, shapes, optical properties, stability, numbers, density, and other properties and combinations of them that are susceptible to direct or indirect imaging, measurement, and analysis using the sensor system in a static mode or a flow mode. The samples can be liquids, solids, gases, gels, suspensions, emulsions, or any combination of them. The sample units can be particles, molecules, polymers, chemicals, granules, clusters, agglomerations, and appear in any other of a variety of forms. They can be transparent, opaque, translucent, and have a range of other optical properties. The imaging and analysis can be used for investigation, acquisition, testing, quality control, distribution, transportation, and a wide variety of other purposes and combinations of them.

By applying various forces to the particles under observation, numerous useful characteristics of the particles can be determined. Thus, for example, the buoyant density (and thus mass) of particles of measured size may be inferred from their movement in response to imposed force such as the acoustic force mentioned above, while the zeta potential of particles may be measured by noting their movement in response to an electric field imposed across the chamber transverse to the fluid flow.

Similarly, these devices can be applied to determine useful characteristics of molecules. Contact microscopy as described above can be used to carry out many familiar types of biochemical analysis on a micro scale. Thus, for example, acrylamide, agarose, or other kinds of gels can be cast on the surface of the image sensor, or pre-cast gels can be applied to that surface. When macromolecular samples such as proteins or nucleic acids are loaded at discrete sites on the gel, the molecular mass of the samples can be inferred from their migration in response to an electric field applied across the surface, visualized by application of various absorbance or fluorescence dyes. By virtue of being able to detect minute quantities and micrometer-scale migration, microscopic implementations can reduce run-time of such analyses from many minutes or hours to seconds or a few minutes and reduce required material, for gel electrophoresis, isoelectric focusing, and other similar analytic methods, as demonstrated by J. Zheng et al., [Anal. Chem. 71 (1999) 5003-5008, incorporated here by reference] using ordinary lens-based microscopy. Contact microscopic implementations, using the devices described above, will make these micro-scale analyses feasible at reduced cost and in locations and environments unsuitable for standard lens-based microscopes.

Fields in which applications may be particularly useful include mining, refining, milling, brewing, blending, mixing, spinning or drawing of fibers and thin sheets, coating, emulsifying, power, engines, motors, lubrication, plumbing, sewage, bioreactors, water supplies, air purification, air quality, and a range of others, and combinations of them. Because units of the sensor and the system can be inexpensive, portable, in some cases disposable, and easy to use, they can be replicated in large numbers and distributed and used widely in the field and in normally inaccessible places.

For example, in well drilling applications, the sensor units and the system can be used for at—bore analysis of input drilling fluids and output cuttings. The analyses can be performed more quickly, more easily, more frequently, and more broadly than current techniques. The size, shape, consistency, and color of sample units in input fluid used for drilling can be critical to the safety, effectiveness, and efficiency of drilling. Analysis of output cuttings provides key information about strata through which the drilling is proceeding. Quantitative analysis of the sample units, which is relatively easy with the system that we describe, is useful.

Identifying deterioration in expensive or critical equipment is generally more cost effective than allowing the equipment to fail, and our systems can be useful for mechanical condition monitoring by wear debris analysis. For example, as illustrated in FIG. 48, changes in the sizes or shapes or both of wear particles can be indicative of impending catastrophic failure in rotary parts of equipment such as an aircraft engine 722, other forms of motor, centrifugal pump or gearbox. In such cases, wear debris in lubricant can be tracked and analyzed in real time by putting a sensor unit 720 of the system in a recirculation path of a lubricant line 721 or in a shunt of such a path. Images can be captured and analyzed by the system remotely from the sensor, continually or periodically, to detect the presence of statistically significant appearance of new particle shapes. Advantageously, this morphometric approach can be applied to ceramic and other non-ferrous components as well as to ferrous ones, and may be more sensitive than vibrational analysis methods.

In some examples, distribution of sample units in a flow can be measured and analyzed, such as in a slurry, or in a food product, or in drilling. Evenness of dispersion of the sample units can be checked.

Contact microscopy has been described up to this point in terms of a pixelated sensor that captures light with respect to sample units that are in contact with or very near to the sensor surface. Additional modes of contact microscopy or combinations of them are also possible. For example as illustrated in FIG. 49, each element 730 of a dense array 731 of small light sources could provide sequential illumination and the sensor could be a single high-sensitivity light sensor such as a photomultiplier tube (PMT) sensor 732, photodiode or other photodetector, or a multiplicity of such detectors. In operation, a sample is put into contact with the array of light sources. The light sources in the array are individually controlled and in some modes are individually illuminated 733 one after another. Light that is transmitted through the sample, or is scattered, or is generated by fluorescence of the sample, is detected and measured by the sensor. An image can then be developed from the succession of measurements. In some implementations, the display array can be a micro OLED display (for example, the 4.7 µm-pixel display available from MicroOLED, Grenoble, France, although custom developed higher resolution pixel displays with a pixel size smaller than 2.0 µm should be possible and would provide higher resolution images). When organic LEDs are used there can be a transparent electrode layer between the sample and the light emitting portions of pixels represented by the LEDs.

A variety of illumination regimes would be possible, including groups of light sources illuminated at the same time, repetitive illumination, patterns and sequences of illumination. In some implementations, custom arrays of light sources may be especially effective. For example arrays configured in a curved or contoured, rather than plane, surface may be useful to conform to particular non-planar specimens. In some regimes it may be possible and useful to use both a dense array of light sources and a dense array of sensors. Among other advantages of this approach, light source elements such as LEDs can have fewer components than sensor elements such as CMOS pixels, so that with silicon wafer fabrication technology of any given feature size, light source pixels can be made smaller than sensor pixels. This can result in higher resolution contact microscopic images. Additionally, multispectral transmitted-light or fluorescence imaging can be simply achieved by placing interchangeable or variable spectral filters 734, tunable grating, prisms, lenses and other optical elements between the specimen and the detector, and using broad-spectrum (e.g., white) emitting light elements for transmitted light, or short-wave (e.g., UV) emitting elements for fluorescence, imaging.

When a dense array of light sources is used and the sample is placed at the surface of the light source array, many of the same applications, features, operating approaches, and other aspects of the system described here will also apply. We use the term sensor device broadly in our discussion to refer not only to sensor arrays but also to illumination arrays, and to combinations of them. Indeed, as LEDs can also be operated as photodiodes, in principle a suitable configured array could be operated alternately in light-sensing or light-emitting mode or a combination of the two at one time.

The contact optical microscope systems that we have described have many advantages in terms of cost, convenience and portability that (as we have explained) open large fields of use and applications, and make possible individual and repetitive uses that would not normally be available using conventional microscopy. In addition because large numbers of the sensor devices can be produced inexpensively and because large numbers of pixels or illumination sources are available at one place, massively parallel uses of the pixels and illumination sources as well as massively parallel uses of large numbers of the sensor units or illumination units are more practical than would be the case with conventional microscopy. We have already discussed some massively parallel applications. In some instances of massively parallel processing, a number of different operations among the many that we have described can be done in parallel either within a single sensor or across multiple sensors. The different operations being done in parallel need not have any relationship to one another other than that they are both of interest for a given sample, or use similar technology with respect to the samples, or are otherwise convenient or useful to do together.

Other examples of massively parallel operations include high throughput screening of compounds for drug discovery, using multiple sensor devices in parallel. This screening could be done using the sensor devices for Fluorescence Correlation Spectroscopy as described earlier, or could be done with higher amounts of a bound reagent (such as an enzyme or antibodies or other) per pixel of the sensor. The signal from bound fluorescent ligands can then be monitored at different ligand concentrations. Massively parallel implementation, with different reagents in varying concentrations at discrete positions on each image sensor array could permit, for example, rapid identification of targets of drugs with unknown mechanisms of action, and information regarding binding affinity. As with fluorescence immunoassays, the operations can be done with analyte displacing bound fluorescent ligands from the target antibodies.

A wide range of products can be manufactured and delivered based on the architecture and principles that we have discussed. The products could include sensor units, sensor units plus readout units, sensor units plus headboards, sample chambers, chamber lids, sensor units plus pipettes, sensor units plus pumps, system devices, handheld devices, plugins and attachments to other equipment, pipettes, pre-loaded pipettes, image processors, software, light sources, sample chambers plus light sources plus sensors plus headboards plus electronics in complete devices, and combinations of two or more of these as well as other components.

In considering the wide range of operations performed by the sensors and systems and the broad spectrum of applications, it may be useful to recognize that some relate to imaging, some to analysis, and some to a combination of analysis and imaging.

Other implementations, features, and aspects are also within the scope of the following claims and other claims.

The invention claimed is:

1. A microscope apparatus comprising:
a surface configured to receive a whole blood sample of a person or animal, the whole blood sample comprising blood cells of two or more types;
a two-dimensional array of light-sensitive elements that are configured and arranged to be sensitive to light at the surface;
a movable lid that defines a top of a sample space in which the whole blood sample is arranged on the surface, wherein the movable lid comprises projections extending from a lower surface of the movable lid, the projections defining a height of the sample space; and
a device comprising a memory and one or more microprocessors, wherein the device is configured to:
capture at least one image of the whole blood sample using the two-dimensional array of light-sensitive elements, and
generate a blood count of blood cells in the whole blood sample using the at least one image.

2. The microscope apparatus of claim 1, wherein the lid is configured to define a precisely-specified volume of the whole blood sample at the surface.

3. The microscope apparatus of claim 1, wherein the projections comprise molded polymeric projections.

4. The microscope apparatus of claim 1, comprising beads of a uniform size within the whole blood sample or attached to the lower surface of the lid, the beads defining the height of the sample space.

5. The microscope apparatus of claim 1, wherein the device is configured to generate the blood count based on different respective cytoplasm colors of blood cells of each of two or more types in the whole blood sample.

6. The microscope apparatus of claim 1, wherein the device is configured to generate the blood count based on whether blood cells of each of two or more types in the whole blood sample include a nucleus.

7. The microscope apparatus of claim 1, wherein the projections are configured such that the height of the sample space is in a range from 10 μm to 100 μm.

8. The microscope apparatus of claim 1, wherein the surface is within a near-field distance of the two-dimensional array of light-sensitive elements.

9. The microscope apparatus of claim 1, wherein the surface comprises a coating comprising a molecular layer configured to enhance changes in a shape of the blood cells.

10. The microscope apparatus of claim 1, wherein the projections are configured such that the whole blood sample has a microliter-scale volume.

11. The microscope apparatus of claim 1, wherein the device is configured to derive morphometric information about the blood cells at a resolution of 5 μm or less based on the at least one image, wherein the morphometric information includes a shape of the blood cells of each of the two or more types, wherein generating the blood count comprises differentiating between blood cells of each of two or more types based on the shape of the blood cells of each of the two or more types.

12. The microscope apparatus of claim 1, wherein the projections comprise a silicone polymer.

13. The microscope apparatus of claim 1, wherein the projections are configured to contact the surface configured to receive the whole blood sample.

14. The microscope apparatus of claim 1, wherein the projections are molded in the lower surface of the lid.

15. The microscope apparatus of claim 1, wherein the projections are included in a layer attached to the lower surface of the lid.

16. The microscope apparatus of claim 15, wherein the projections are embossed or cast.

17. A blood count method comprising:
arranging a whole blood sample of a person or animal on a surface;
forming a sample space for the whole blood sample using a movable lid that defines a top of the sample space, wherein the movable lid comprises projections extending from a lower surface of the movable lid, the projections defining a height of the sample space;
capturing at least one image of the whole blood sample using a two-dimensional array of light-sensitive elements that are configured and arranged to be sensitive to light at the surface; and
generating a blood count of blood cells in the whole blood sample using the at least one image.

18. The blood count method of claim 17, comprising forming a precisely-specified volume of the whole blood sample at the surface based on the height of the sample space.

19. The blood count method of claim 17, comprising generating the blood count based on at least one of:
different respective cytoplasm colors of blood cells of each of two or more types in the whole blood sample, or
whether the blood cells of the each of the two or more types include a nucleus.

20. The blood count method of claim 17, comprising capturing the at least one image while the surface is within a near-field distance of the two-dimensional array of light-sensitive elements.

21. The blood count method of claim 17, comprising setting a height of the whole blood sample to be between 10 82 m and 100 μm.

22. The blood count method of claim 17, wherein the whole blood sample has a microliter-scale volume.

23. The blood count method of claim 17, comprising inspecting the whole blood sample using a scanning probe microscope based on information derived from the at least one image.

24. The blood count method of claim 17, comprising:
based on the at least one image, deriving morphometric information about the blood cells at a resolution of 5 μm or less, wherein the morphometric information includes a shape of blood cells of each of two or more types in the whole blood sample,
wherein generating the blood count comprises differentiating between blood cells of each of two or more types based on the shape of the blood cells of each of the two or more types.

* * * * *

UNITED STATES PATENT AND TRADEMARK OFFICE
CERTIFICATE OF CORRECTION

| | | |
|---|---|---|
| PATENT NO. | : 12,388,957 B2 | Page 1 of 1 |
| APPLICATION NO. | : 18/662064 | |
| DATED | : August 12, 2025 | |
| INVENTOR(S) | : Alan Marc Fine, Hershel Macaulay and Laurent Kreplak | |

It is certified that error appears in the above-identified patent and that said Letters Patent is hereby corrected as shown below:

In the Claims

Claim 21: In Column 58, Line 14, delete "82 m" and insert -- µm --.

Signed and Sealed this
Twenty-first Day of October, 2025

John A. Squires
*Director of the United States Patent and Trademark Office*